US008128533B2

(12) United States Patent
Nakagawa et al.

(10) Patent No.: US 8,128,533 B2
(45) Date of Patent: Mar. 6, 2012

(54) EXERCISE ASSISTING METHOD, EXERCISE APPLIANCE, AND INFORMATION PROCESSOR

(75) Inventors: Katsuya Nakagawa, Shiga (JP); Hiromu Ueshima, Shiga (JP); Hiroyuki Aimoto, Shiga (JP); Keiichi Yasumura, Shiga (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 205 days.

(21) Appl. No.: 12/096,793

(22) PCT Filed: Dec. 11, 2006

(86) PCT No.: PCT/JP2006/325133
§ 371 (c)(1),
(2), (4) Date: Apr. 10, 2009

(87) PCT Pub. No.: WO2007/069752
PCT Pub. Date: Jun. 21, 2007

(65) Prior Publication Data
US 2010/0048357 A1 Feb. 25, 2010

(30) Foreign Application Priority Data

Dec. 12, 2005 (JP) ................. 2005-358262
Feb. 13, 2006 (JP) ................. 2006-034635
Apr. 19, 2006 (JP) ................. 2006-115251

(51) Int. Cl.
*A63B 71/00* (2006.01)
*A63B 69/00* (2006.01)
(52) U.S. Cl. ................. 482/8; 482/1; 434/247
(58) Field of Classification Search .................. 482/1, 8, 482/9, 901, 902; 463/1; 600/595; 434/247, 434/250, 255, 257; 73/865.4, 488; 348/77, 348/154, 155
See application file for complete search history.

(56) References Cited

U.S. PATENT DOCUMENTS

| 4,233,845 | A | * | 11/1980 | Pratt, Jr. ................. 73/865.4 |
| 5,229,756 | A | * | 7/1993 | Kosugi et al. ................. 345/156 |
| 5,423,554 | A | * | 6/1995 | Davis ................. 463/4 |
| 5,574,669 | A | * | 11/1996 | Marshall ................. 702/149 |
| 6,144,366 | A | | 11/2000 | Numazaki et al. |
| 6,227,974 | B1 | * | 5/2001 | Eilat et al. ................. 463/40 |
| 6,430,997 | B1 | * | 8/2002 | French et al. ................. 73/379.04 |

(Continued)

FOREIGN PATENT DOCUMENTS
JP 11-128394 A 5/1999
(Continued)

OTHER PUBLICATIONS

International Search Report, Feb. 21, 2007, from International Phase of the instant application.

(Continued)

*Primary Examiner* — Loan Thanh
*Assistant Examiner* — Sundhara Ganesan
(74) *Attorney, Agent, or Firm* — Jackson Patent Law Office

(57) ABSTRACT

Each time stepping motion of a player by a stepper 1 is detected, one firework object 214 appears on a television monitor 100 and then disappears. Each a predetermined number of times of the stepping motion of the player is detected, a more spectacular firework object than that of one step is displayed. If the player performs the stepping motion by frequency as a quota shown in a quota display section 212, this screen is finished.

24 Claims, 47 Drawing Sheets

U.S. PATENT DOCUMENTS

| | | | |
|---|---|---|---|
| 6,539,336 B1* | 3/2003 | Vock et al. | 702/182 |
| 6,607,436 B1* | 8/2003 | Ueshima et al. | 463/3 |
| 6,685,480 B2* | 2/2004 | Nishimoto et al. | 434/247 |
| 6,929,543 B1* | 8/2005 | Ueshima et al. | 463/7 |
| 7,815,507 B2* | 10/2010 | Parrott et al. | 463/36 |
| 2002/0055383 A1* | 5/2002 | Onda et al. | 463/36 |
| 2003/0202189 A1* | 10/2003 | Tamiya et al. | 356/494 |
| 2004/0005924 A1* | 1/2004 | Watabe et al. | 463/36 |
| 2004/0046737 A1* | 3/2004 | Numazaki et al. | 345/156 |
| 2004/0135990 A1* | 7/2004 | Ohtomo et al. | 356/4.01 |
| 2004/0171460 A1* | 9/2004 | Park | 482/8 |
| 2004/0245430 A1* | 12/2004 | Konishi | 250/201.2 |
| 2004/0246498 A1* | 12/2004 | Kumagai et al. | 356/614 |
| 2005/0239548 A1* | 10/2005 | Ueshima et al. | 463/36 |
| 2006/0001731 A1* | 1/2006 | Nakamura et al. | 347/225 |
| 2006/0140485 A1* | 6/2006 | Hing et al. | 382/219 |

FOREIGN PATENT DOCUMENTS

| | | |
|---|---|---|
| JP | 2000-140187 A | 5/2000 |
| JP | 2000-245967 A | 9/2000 |
| JP | 2001-070641 A | 3/2001 |
| JP | 3113950 U | 9/2005 |

OTHER PUBLICATIONS

English Translation of the Written Opinion of the International Search Authority, Jun. 12, 2008, from International Phase of the instant application.

English Translation of International Preliminary Report on Patentability Chapter I, Jun. 18, 2008, from International Phase of the instant application.

Yusuke Nakazato et al., "A Quantitative Evaluation of Wearable AR System Using Invisible Markers in Real Environments", Technical Report of IEICE, vol. 104, No. 524, pp. 7-12, Dec. 10, 2004.

* cited by examiner

FIG. 2
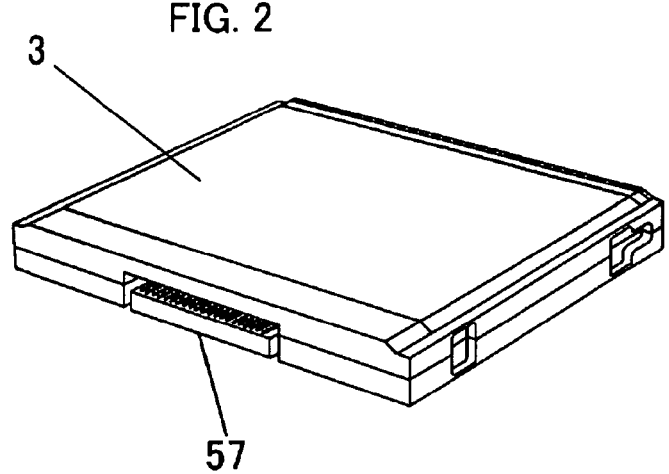
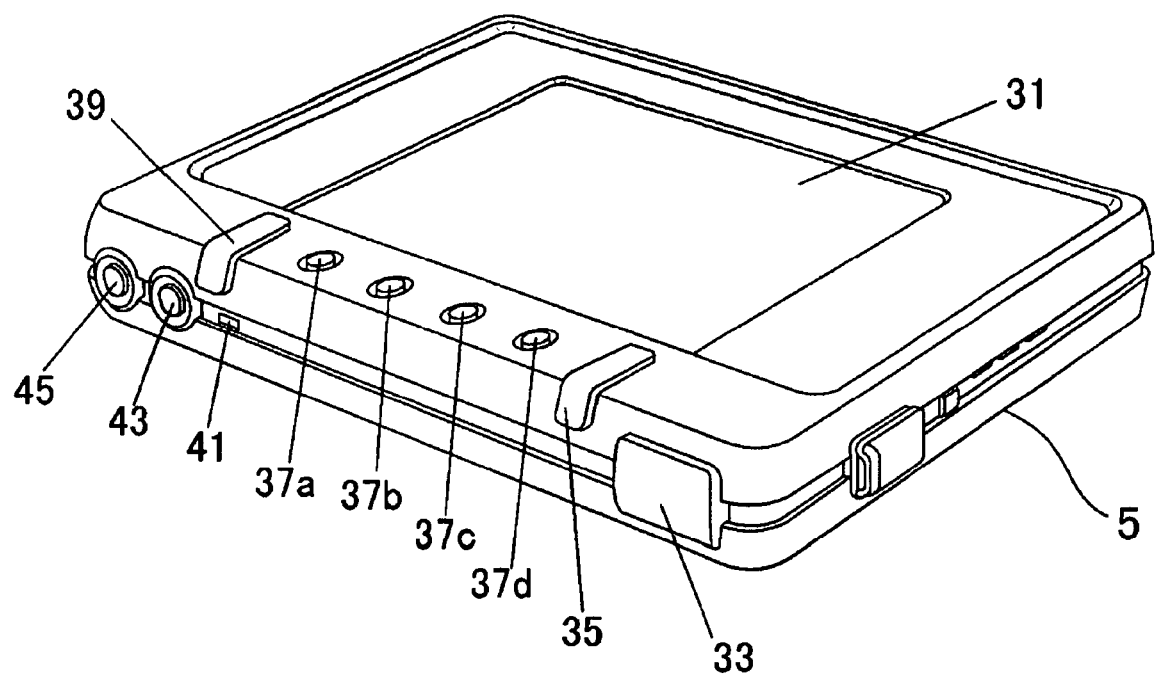

FIG. 29

Marie
Sep. 15th

Current Graph kcal
99
90
80
70
60
50
40
30
20
10

15 16 17 18 19 20 21 22 23 24 25 26 27 min.

50
40
30
20
10

Sep.
15th

Exercise Time  10 min. and 46 sec.
Calorie Consumption  48.24 kcal

⊠ TBD   ⬦ TBD   ⬦ Select   STEP   Next 100
322
320
324

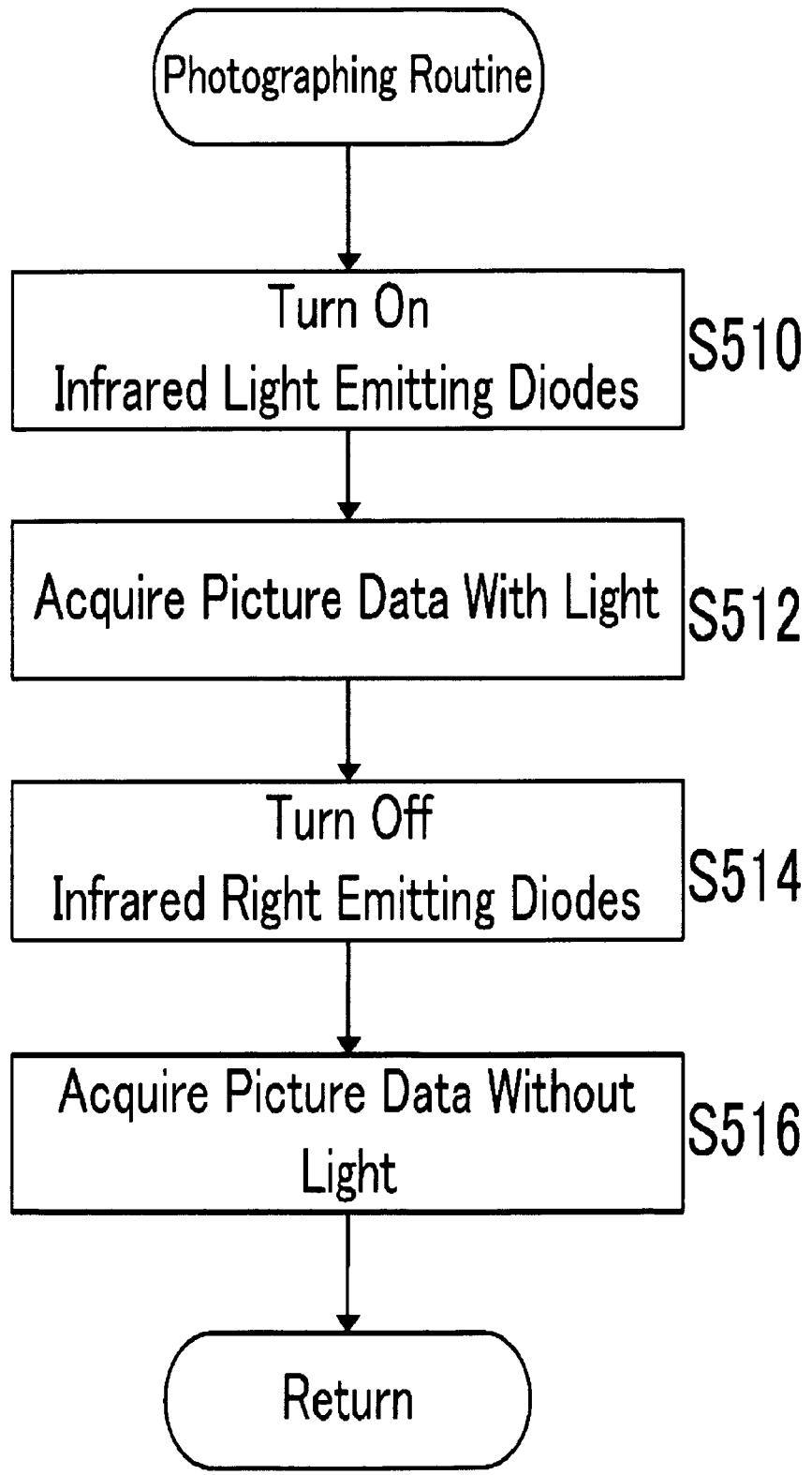

EXERCISE ASSISTING METHOD, EXERCISE APPLIANCE, AND INFORMATION PROCESSOR

TECHNICAL FIELD

The present invention relates to an exercise assistance method and the related arts for displaying a video image on a display device to assist exercise of a player which uses an exercise machine.

Further, the present invention relates to an information processing apparatus and the related arts for executing information processing based on a result of detecting movement of an object to be detected.

BACKGROUND ART

The Patent Document 1 (Japanese Patent Published Application No. 2003-205051) discloses an exercise assistance apparatus which is provided with a cycling machine having a rotation sensor for detecting movement of pedals. The exercise assistance apparatus is provided with a monitor for displaying images, a means for storing image data to express a traveling road and opponent characters, an exercise machine control means for performing variable control for load status of an electromagnetic clutch of the cycling machine, a means for sequentially updating and controlling traveling positions of the opponent characters on the traveling road, a means for calculating a virtual self position of a player on the traveling road from detection content of the rotation sensor and load status controlled by the exercise machine control means, and an image display means for displaying the traveling road and the opponent characters on the monitor, and displaying degrees of difficulty to pass the opponent characters.

In the exercise assistance apparatus, the monitor displays a scenery image (a background image) as a background on a screen, which contains a road character corresponding to the traveling road (a portion of an orbital road), together with the opponent characters each of which rides a bicycle on the road character with a camera viewpoint as an eye of the player.

Then, when the player pedals, a scene moves as if the player traveled by a bicycle. That is, since it is difficult to really travel by a bicycle indoors due to restriction on space, the exercise similar to the travel by the bicycle is played by pedaling the cycling machine which stays one place. However, since it can not provide fun only by itself, by generating the images as if the player traveled by the bicycle, the fun is provided for the player and whereby the exercise is assisted.

In this way, the conventional exercise assistance apparatus generates the images as if the player traveled by the bicycle, and whereby the player is given feeling as if he/she traveled really by the bicycle despite pedaling the cycling machine which stays one place. That is, the scene of the travel by the bicycle is generated in a virtual space, and whereby the exercise by the cycling machine which simulates a bicycle in a real space, i.e., a simulation of riding the bicycle is close to a real action.

However, although technology has progressed, a gap between the real space and the virtual space is large. Thus, the player may often feel odd. Though the images to which the load status is reflected are generated so as to decrease feeling odd as described above, it causes increase of processing of a computer.

This is true also in the case where the motion (e.g., walking or running) corresponding to the motion (e.g., stepping) of the player in the real space is reflected to a character in the virtual space.

Accordingly, the conventional technique is not necessarily sufficient to achieve the expected purpose which is assistance of exercise.

It is therefore an object of the present invention to provide an exercise assistance method and the related techniques thereof capable of assisting exercise effectively while decreasing processing.

By the way, there have heretofore been various exercise machines such as a stepper, a cycling machine, and so on. As shown in FIG. 47, in the Patent Document 2 (Japanese Patent Published Application No. Hei 6-91018), a stepper is provided with a left pedal 500L and a right pedal 500R on which a user places a left foot and a right foot respectively, and makes the user exercise by alternately pressing down on them with the left foot and the right foot. In other words, the user performs reciprocating motion using the feet, and the pedals 500L and 500R of the stepper also make the same reciprocating motion. Also, the cycling machine has the user pedal to exercise him. In other words, the user performs circular motion (a type of recurrence motion) using the feet, and the pedals of the cycling machine also make the same circular motion.

The recurrence motion such as the circular motion and so on, and the reciprocating motion can be said as periodic motion. Since such periodic motion is monotonous, it is necessary to make appreciable effort so as to continually perform it over long periods. For this reason, in the Patent Document 1, the cycling machine is linked to the monitor via a dedicated computer, the computer displays the images corresponding to the movement of pedals on the monitor, and whereby the Patent Document 1 provides the exercise assistance apparatus capable of assisting the user so that he/she can continually get exercise. Since the images corresponding to the movement of the cycling machine are displayed on the monitor, the cycling machine can be said as a machine which gives input to the computer by the periodic motion.

In the Patent Document 1, the exercise assistance apparatus is provided with the cycling machine and the monitor, which are designed as dedicated articles respectively and linked each other via the dedicated computer. Therefore, since it is not possible to use a cycling machine and a monitor which the user already owns, he/she needs to newly purchase all the articles. This imposes great economic burden on the use, and further causes a decline of buying motive because the user may own a plurality of devices which are similar to one another It is therefore an another object of the present invention to provide an information processing apparatus and the related techniques thereof capable of inputting by periodic motion while reducing economic burden on a user.

DISCLOSURE OF THE INVENTION

In accordance with a first aspect of the present invention, an exercise assistance method for displaying an image on a display device based on movement information of a exercise machine which enables a player to make simulation action under a load to assist exercise of the player, comprising the steps of: acquiring the movement information of the exercise machine; and performing processing of displaying representation which is unrelated to the simulation action based on the movement information as acquired.

In accordance with this configuration, the player can look at the various kind of the representation depending on his/her own simulation action. In this case, the representation is not such representation as the feeling which the player obtains from the simulation action and the virtual world approaches the feeling of the actual action in the actual world by using images which a computer generates so as to realistically represent actuality or controlling the loaded condition in accordance with highly physics operation, but the representation which is unrelated to the actual action in the actual world, so that it is possible to prevent the player from feeling odd on the ground of a gap between the real space and the virtual space.

As the result, the player can purely feel amusement with interactive element, such as occurrence and change of something in the virtual space in response to the own simulation action, and therefore it is possible to ease or reduce tiredness and monotony which is caused by repetition of the action. For this reason, this enables the player to get exercise continually.

Also, since a large amount of computer processing is not required, it is possible to reduce the processing amount of the computer.

In this exercise assistance method, wherein, the step of performing the processing of displaying includes: performing an appearance process and/or a change process of a predetermined image based on the movement information each time predetermined movement of the exercise machine is detected.

In accordance with this configuration, each time the player performs the action, the representation of some sort is displayed, and therefore it is possible to prevent the player from wearying even if the monotonous action is repeated.

In this exercise assistance method, wherein, the step of performing the processing of displaying further includes: performing processing of displaying predetermined first representation when a predetermined first number of times of the predetermined movement of the exercise machine is detected.

In accordance with this configuration, if the player performs the predetermined number of times of the simulation action, the player can enjoy the predetermined representation. Further, such predetermined representation enables the player to obtain a criterion and the like, such as the continuing state of the certain action and degree of attainment of the aim as set. In addition, the criterion includes not only the insipid criterion such as the mere display of actual numerical values but also the representation such as virtual images and sound. As the result, the player can viscerally recognize the extent to which the player has gotten exercise even if the player concentrates on exercise.

In this exercise assistance method, wherein, the predetermined first representation is accomplished by an appearance process and/or a change process of a different image from the predetermined image.

In accordance with this configuration, if the player performs the predetermined number of times of the simulation action, the player can enjoy the certain representation, and therefore it is possible to prevent the player from wearying even if the monotonous action is repeated.

Also, in this exercise assistance method, wherein, the predetermined first representation may be accomplished by an appearance process of the predetermined image with different representation from representation based on the appearance process and/or a change process with different representation from representation based on the change process.

In accordance with this configuration, the change of the circumstance and condition in the virtual space in response to the action of the player becomes more varied, and therefore it is possible to prevent the player from wearying even if the monotonous action is repeated.

Further, in this exercise assistance method, wherein, the step of performing the processing of displaying further may include: displaying a portion of a specific image each time the predetermined movement of the exercise machine is detected, wherein the predetermined first representation is accomplished by completing the specific image when the predetermined first number of times of the predetermined movement of the exercise machine is detected.

In accordance with this configuration, if the player repeats the action, since the specific image appears by a gradual process on the display section, the player can obtain the feeling that a thing is completed in the virtual space by his/her effort. As the result, it is possible to assist the player which wants to keep the motivation for exercising.

In the above exercise assistance method, wherein, the step of performing the processing of displaying further includes: performing processing of displaying predetermined second representation after elapse of a predetermined time period when the predetermined movement of the exercise machine is not detected within the predetermined time period or a number of times of detecting does not exceed a predetermined second number of times within the predetermined time.

In accordance with this configuration, if the player neglects the exercise for the predetermined time period and after that resumes the exercise, it is possible to display the representation for having the player reflect on his/her idleness, such as a penalty of some sort, conversely it is also possible to recognize that the player starts to get exercise again to display the representation for cheering. As the result, it is possible to give the motivation for continuously daily getting exercise to the player, or the motivation for resuming the exercise even if the player discontinues the exercise once.

The above exercise assistance method further comprising: indicating timing of driving the exercise machine to the player by the display device, wherein, the step of performing the processing of displaying includes: performing processing of displaying certain representation when driving of the exercise machine in the indicated timing is detected based on the movement information.

In accordance with this configuration, the player can exercise to rhythm instead of merely repeating the action. As the result, the player can get exercise in a more joyful way.

In this case, the timing is indicated in synchronism with music. In accordance with this configuration, since the player can exercise in synchronization with the music, the player can get exercise while enjoying.

The above exercise assistance method further comprising: detecting a speed of predetermined movement of the exercise machine based on the movement information, wherein, the step of performing the processing of displaying includes: each time the predetermined movement of the exercise machine is detected, performing an appearance process and/or a change process of an image in accordance with the speed on that occasion.

In accordance with this configuration, if the player quickly performs the action, the representation, in which the circumstance and condition in the virtual space change depending on the quickness, can be displayed. Accordingly, the player can exercise while enjoying even if he/she exercises heavily with the quick motion, and have the different amusement from the standard by controlling the overall pacing of the motion.

In accordance with a second aspect of the present invention, an exercise machine comprising: a moving unit operable to allow a player to make action under a load; and a detection unit operable to detect movement of the moving unit, wherein the moving unit repeats alternately a rotation in a clockwise direction and a rotation in a counter clockwise direction in accordance with movement of weight as applied by the player. In accordance with this configuration, the exercise machine can detect the velocity as well as the number of times of the action of the player.

In this exercise machine, wherein, the detection unit outputs a detection signal to a processing device which generates a video signal for assisting exercise of the player. In accordance with this configuration, the exercise machine can detect the number of times of the action of the player and the velocity to output the image for assisting the exercise in accordance therewith.

In this case, the detection unit includes: a rotary encoder operable to detect rotation movement of the moving part.

In accordance with a third aspect of the present invention, an information processing apparatus comprising: a detection unit operable to detect periodic movement of an object to be detected in a noncontact state; an analysis unit operable to analyze the periodic movement of the object to be detected based on a result of detection by the detection unit; and a processing unit operable to execute information processing in accordance with a result of analysis by the analysis unit.

In accordance with this configuration, since the information processing is executed in accordance with the periodic movement of the object to be detected, it is possible to provide the various computer programs whose inputs are the periodic movement of the object to be detected. In this case, since the computer program can be made for each kind of the periodic movement as the input, if the object to be detected makes the periodic movement which is included within targeted scope of the computer program, the object is not necessarily dedicated. As the result, for example, in the case where the object to be detected is an article, the user of the information processing apparatus need not newly prepare and purchase a dedicated article, and therefore it is possible to reduce economic burden on the user. For example, in the case where the object to be detected is a region of a body, it is possible to input only by periodically moving the region.

Also, since the periodic movement, i.e., the regular movement is detected and analyzed, in comparison with detection and analysis of arbitrary movement which is not regular, it is possible to reduce the processing amount by hardware and/or software, and costs thereof, and further establish high-speed processing. That is, it is possible to establish the information processing apparatus using the hardware and software performances of which are relatively low.

Incidentally, the periodic movement includes recurrence movement such as circular movement of the region of the body and the machine, and reciprocating movement.

In this information processing apparatus, wherein, the detection unit includes an imaging unit operable to photograph the object to be detected, wherein the analysis unit analyzes the periodic movement of the object based on an image of the object obtained by the imaging unit. In accordance with this configuration, it is possible to easily detect the object to be detected.

In this information processing apparatus, wherein, the detection unit further includes a light emitting unit operable to intermittently emit light, wherein the imaging unit photographs a retroreflective member attached to the object when the light emitting unit emits the light, and photographs the retroreflective member when the light emitting unit does not emit the light, and wherein the analysis unit analyzes the periodic movement of the object based on a difference between a picture obtained when the light is emitted and a picture obtained when the light is not emitted.

In accordance with this configuration, since the retroreflective member is photographed, the image of the object to be detected appears more clearly in the picture as obtained. In addition, the analysis is performed based on the difference. Accordingly, it is possible to eliminate, as much as possible, noise of light other than the light reflected from the retroreflective member. As the result, it is possible to detect the object to be detected with a high degree of accuracy.

Incidentally, the retroreflective member may be three-dimensional or two-dimensional.

In the above information processing apparatus, wherein, the processing unit displays a video image on a display device in accordance with a result of analysis by the analysis unit. In accordance with this configuration, since the image is displayed in accordance with the periodic movement of the object to be detected, it is possible to provide the interactive computer program whose input is the periodic movement of the object to be detected.

In the above information processing apparatus, wherein, the periodic movement of the object is reciprocating movement. In accordance with this configuration, since the information processing is executed in accordance with the reciprocating movement of the object to be detected, it is possible to provide the various computer programs whose inputs are the reciprocating movement of the object to be detected.

In the above information processing apparatus, wherein, the periodic movement of the object may be recurrence movement. In accordance with this configuration, since the information processing is executed in accordance with the recurrence movement of the object to be detected, it is possible to provide the various computer programs whose inputs are the recurrence movement of the object to be detected.

In the above information processing apparatus, wherein, the object is a machine which is driven by a person.

In accordance with this configuration, since the information processing is executed in accordance with the periodic movement of the machine driven by the person, it is possible to provide the various computer programs whose inputs are the periodic movement of the machine. In this case, since the computer program can be made for each kind of the periodic movement as the input, if the machine driven by the person performs the periodic movement which is included within targeted scope of the computer program, the machine is not necessarily dedicated. As the result, the user of the information processing apparatus need not newly prepare and purchase a dedicated machine, can use the machine which the user already owns, and therefore it is possible to reduce burden on a user.

Even where the periodic movement is analyzed by photographing the retroreflective member, the user is required only to attach the retroreflective member to the machine which he/she already owns, and therefore it is possible to reduce the burden in comparison with the case of preparing or purchasing a dedicated machine newly.

In the above information processing apparatus, wherein, the object may be a region of a body of a person.

In accordance with this configuration, since the information processing is executed in accordance with the periodic movement of the region of the body, it is possible to provide the various computer programs whose inputs are the periodic movement of the region of the body. In this case, since the computer program can be made for each kind of the periodic movement as the input, the user of the information processing apparatus can perform the input only by performing the periodic movement which is included within targeted scope of the computer program using the region of the body.

Even where the periodic movement is analyzed by photographing the retroreflective member, the user is required only to wear the retroreflective member on the region of the body or hold the retroreflective member by the region, and therefore it is possible to easily and simply use the information processing apparatus.

BRIEF DESCRIPTION OF DRAWINGS

The novel features of the present invention are set forth in the appended any one of claims. The invention itself, however, as well as other features and advantages thereof, will be best understood by reference to the detailed description of specific embodiments which follows, when read in conjunction with the accompanying drawings, wherein:

FIG. 2 is a perspective view for showing an adapter 5 and a cartridge 3 of FIG. 1.

FIG. 29 is a view for showing still further example of a screen displayed on the television monitor 100 of FIG. 1.

FIG. 45 is a flowchart for showing the photographing process which is one of the processes of the application program of step S3 of FIG. 30.

BEST MODE FOR CARRYING OUT THE INVENTION

First Embodiment

Figure 1:
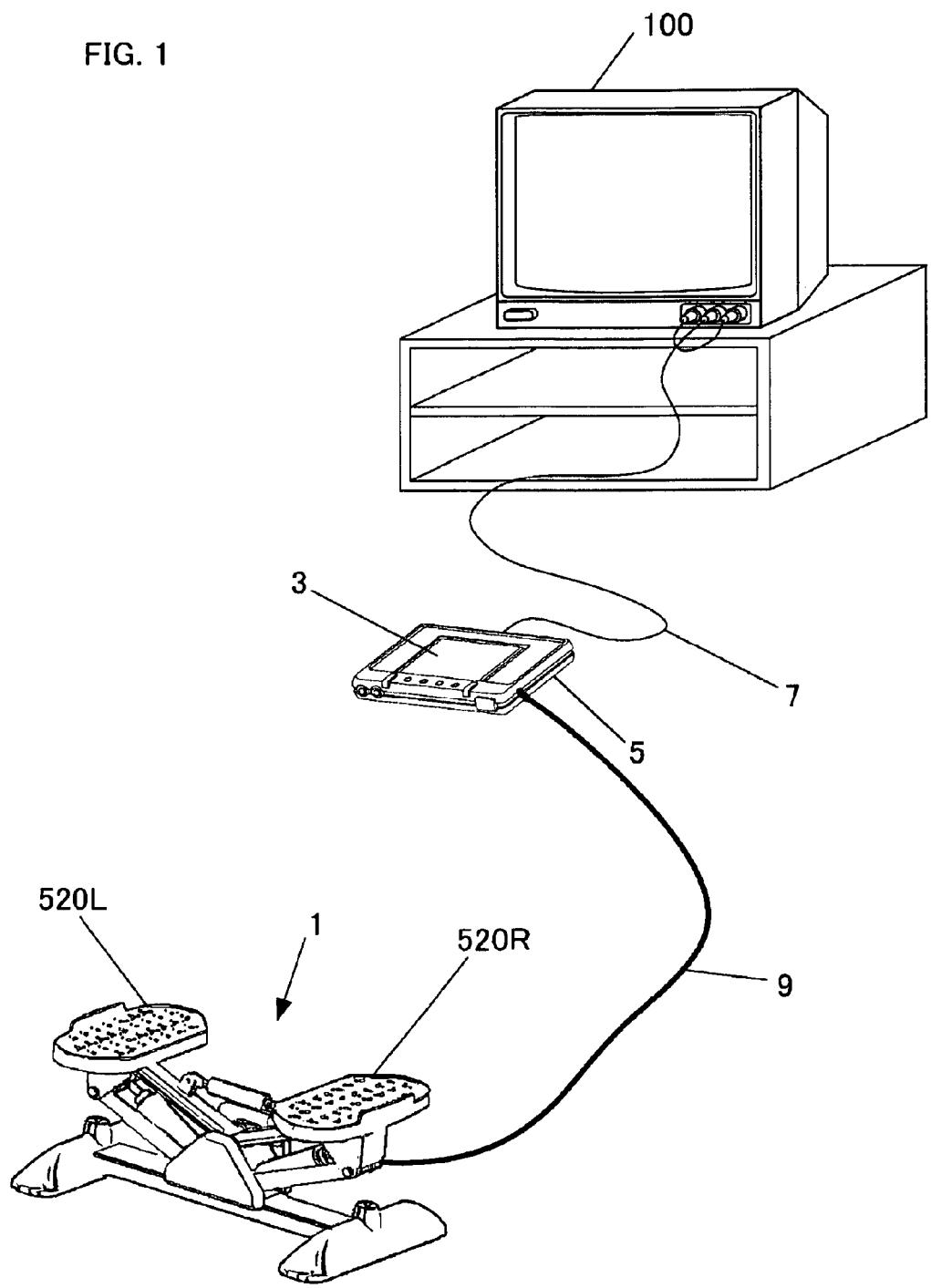
FIG. 1 is a view showing the overall configuration of an exercise assistance system (an information processing system) in accordance with an embodiment of the present invention.

FIG. 1 is a view showing the overall configuration of an exercise assistance system (an information processing system) in accordance with a first embodiment of the present invention. As shown in FIG. 1, the exercise assistance system includes a stepper 1, a cartridge 3, an adapter 5, and a television monitor 100. The cartridge 3 is inserted into the adaptor 3. Also, the adaptor 5 is connected with the television monitor 100 by an AV cable 7.

FIG. 2 is a perspective view for showing the adapter 5 and the cartridge 3 of FIG. 1. As shown in FIG. 2, the adapter 5 has a flat rectangular parallelepiped shape with an upper face, a lower face, a right and a left side face, and a front and a back face. The adapter 5 is provided with a power supply switch 45, a reset switch 43 and a power lamp 41 on the front face in the left hand side, and an infrared filter 33 on the front face in the right hand side. This infrared filter 33 is a filter capable of cutting light rays except infrared rays and selectively transmitting infrared rays, and an infrared sensor (constituting an IR receiver circuit as described below) is located behind of this infrared filter 33. In addition, arrow keys 37a to 37d are provided on the upper face of the adapter 5 in the vicinity of the front edge thereof. Furthermore, there are provided a cancel key 39 in the left hand side of the arrow key 37a and an enter key 35 in the right hand side of the arrow key 37d.

An opening is formed on the upper face in the middle position of the upper surface of the adapter 5 while a top plate 31 is disposed therein so that its upper face is approximately flush with the upper face of the adapter 5. Inside the adapter 5, there is an elevator mechanism which supports and urges upward the top plate 31 so that the upper face of the top plate 31 is located at the height as described above. The top plate 31 is supported to move up and down in the opening by this elevator mechanism.

The cartridge 3 has a flat rectangular parallelepiped shape, and incorporates a multimedia processor 91, a memory 93, and so on as described below. The cartridge 3 is provided with a connector 57 including terminals t1 to t24 as described below in the front thereof. The cartridge 3 can be connected to the adapter 5, by placing and pushing down the cartridge 3 on this top plate 31, and sliding the cartridge 3 toward the front face (see FIG. 1). In this way, the connector 57 of the cartridge 3 is electrically connected with a connector 32 of the adapter 5 as described below.

Figure 3:
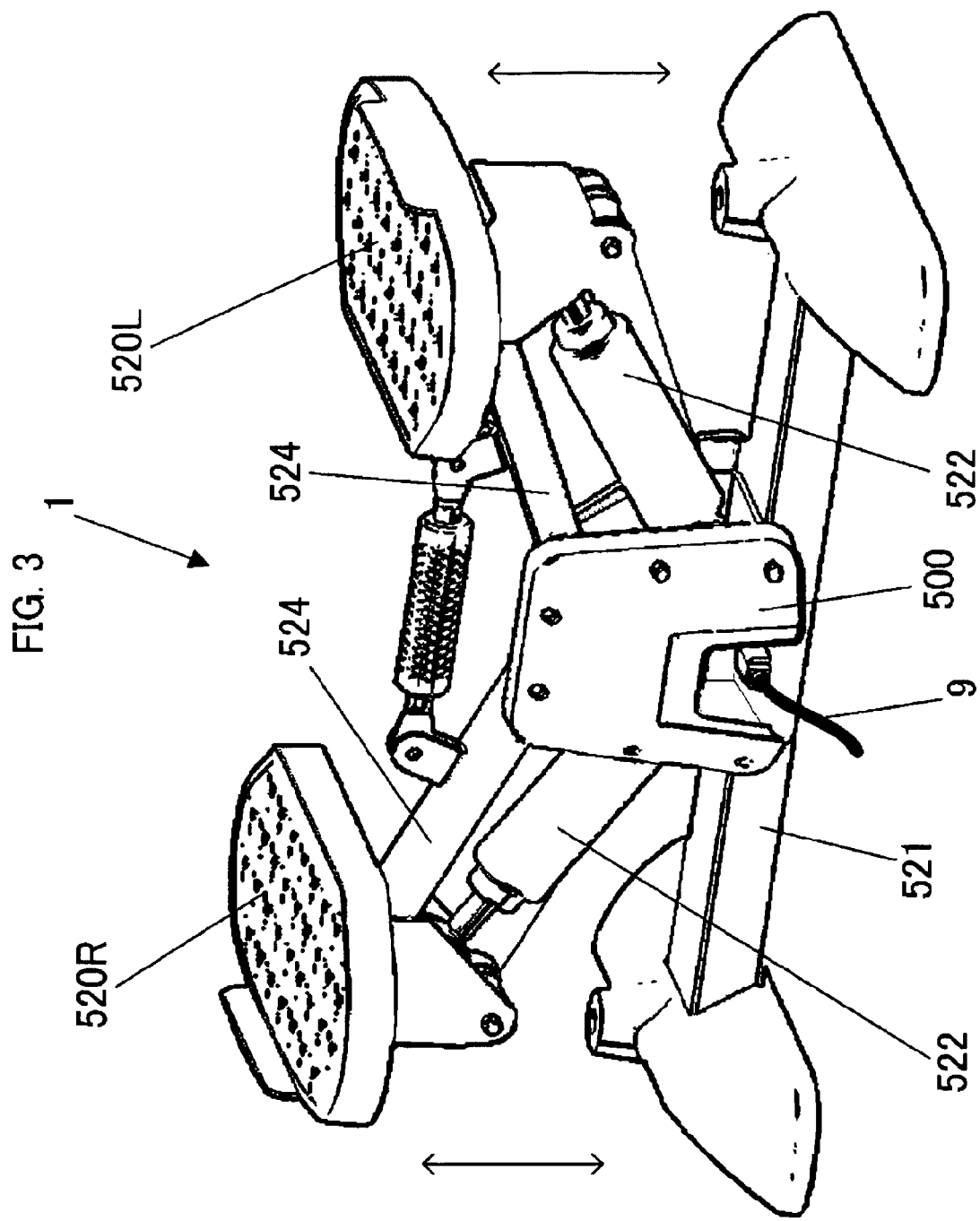
FIG. 3 is an explanatory view for showing the external configuration of a stepper 1.

FIG. 3 is a perspective view for showing the stepper 1. As shown in FIG. 3, the stepper 1 includes a detection unit 500, a pedal 520L for placing a left foot, a pedal 520R for placing a right foot, a base member 521 having an H-shape, a set of cylinders 522, and a set of support members 524.

One end of each of two support members 524 is rotatably coupled to a corresponding one of axes (not shown) provided in the vicinity of the center of the base member 521. The other end of each of two support members 524 is coupled to the corresponding one of the pedals 520L and 520R. One end of each of two cylinders 522 is rotatably coupled to a corresponding one of axes (not shown) provided in the vicinity of the center of the base member 521. The other end of each of two cylinders 522 is coupled to the corresponding one of the pedals 520L and 520R.

A player places a left foot and a right foot on the pedals 520L and 520R respectively, then weights (presses down on) them alternately with the left foot and the right foot, and whereby the left pedal 520L and the right pedal 520R move up and down alternately. In this case, since the cylinders 522 apply loads, the player can get a stepping exercise (a type of periodic motion) under loads.

The stepper 1 is provided with the detection unit 500 on the central portion of the base member 521 in the front face side thereof (in the side which faces the television monitor 100 of FIG. 1).

Figure 4:
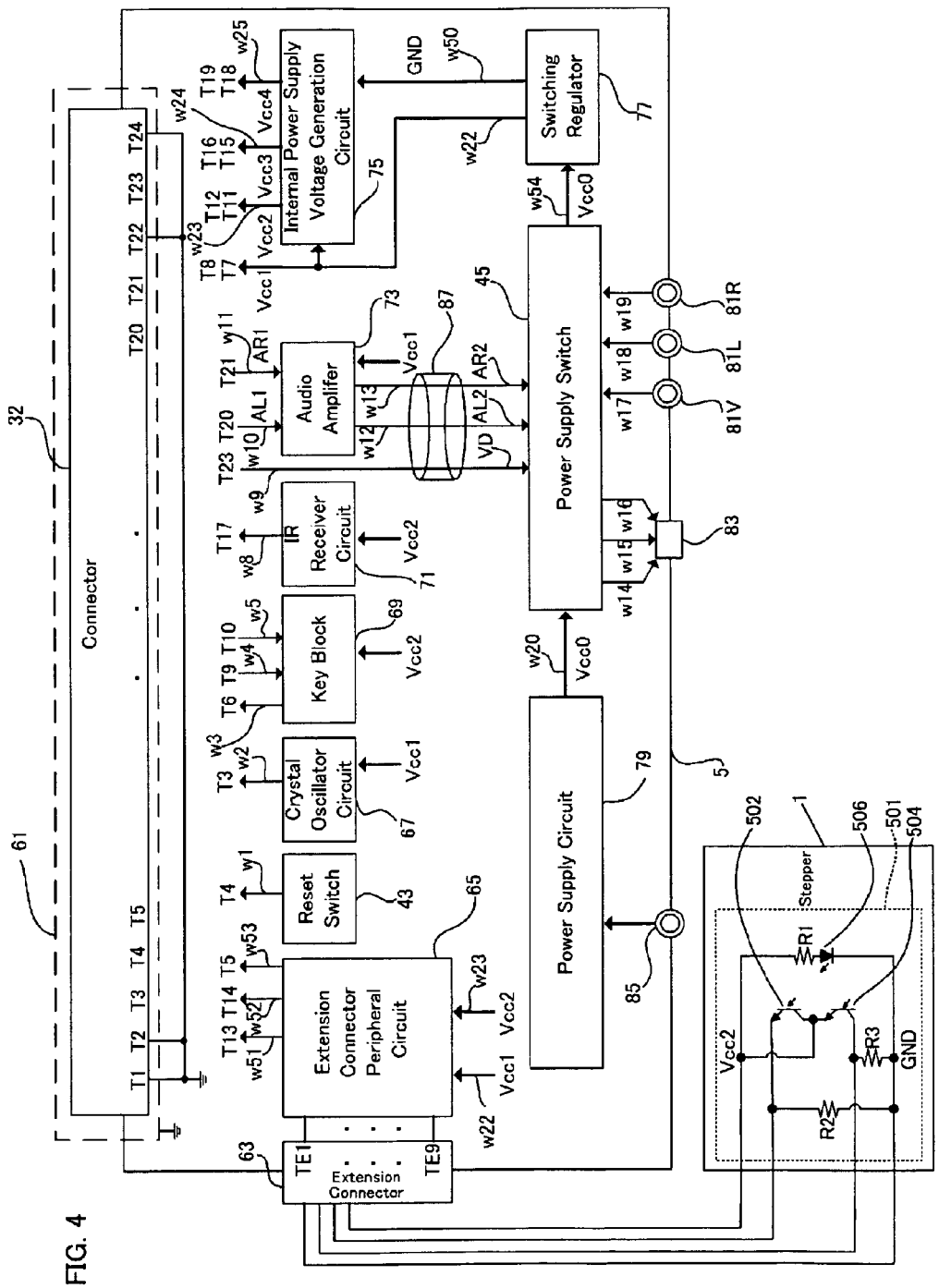
FIG. 4 is a block diagram for showing the internal configurations of the adaptor 5 and a detection unit 500 of the stepper 1.

FIG. 4 is a block diagram for showing the internal configurations of the adaptor 5 and the detection unit 500. As shown in FIG. 4, this adapter 5 includes the connector 32, an extension connector 63, an extension connector peripheral circuit 65, the reset switch 43, a crystal oscillator circuit 67, a key block 69, the infrared signal receiver circuit (IR receiver circuit) 71, an audio amplifier 73, an internal power supply voltage generation circuit 75, a power supply circuit 79 comprising an AC/DC converter and the like, the power supply switch 45, a switching regulator 77, a power jack 85, an AV jack 83, a video jack 81V, an L channel audio jack 81L, and an R channel audio jack 81R. The connector 32 has 24 terminals T1 to T24 and is covered by the shield member 61 which is grounded. The terminals T1, T2, T22 and T24 of the connector 32 are grounded.

The AC voltage as supplied from the power cable 16 (not shown in the figure) is given to the power supply circuit 79 through the power jack 85. The power supply circuit 79 converts the AC voltage as given to a DC voltage, which is then output to a line w20 as a power supply voltage Vcc0. When turned on, the power supply switch 45 connects the line w20 and a line w54 to supply the switching regulator 77 with the power supply voltage Vcc0, and gives the AV jack 83 a video signal VD from a line w9 and audio signals AL2 and AR2 from the lines w12 and w13 respectively through the lines w14, w15 and w16. Accordingly, the video signal VD and the audio signals AL2 and AR2 are given to the television monitor 100 through the AV cable 9, while the television monitor 100 displays an video image and outputs sounds from a speaker (not shown in the figure) in accordance with these signals.

On the other hand, when turned off, the power switch 45 connects lines w17, w18 and w19 to lines w14, w15 and w16 respectively. By this configuration, a video signal as input from the video jack 81V, an L channel audio signal as input from the L channel audio jack 81L and an R channel audio signal as input from the L channel audio jack 81R are given to the AV jack 83. Accordingly, the video signal and the audio signals as input from the jacks 81V, 81L and 81R are transferred to the television monitor 100 from the AV jack 83 through the AV cable 9. As thus described, when the power supply switch 45 is turned off, it is possible to output the video signal and the audio signals as input from an external device through the jacks 81V, 81L and 81R to the television monitor 100.

When the power supply switch 45 is turned on, the switching regulator 77 receives the power supply voltage Vcc0 from the power supply circuit 79 through the line w54 and generates the ground potential GND and the power supply voltage Vcc1 on the lines w50 and w22 respectively. On the other hand, when the power supply switch 45 is turned off, since the power supply voltage Vcc0 is supplied, the switching regulator 77 does not generate the power supply voltage Vcc1.

The internal power supply voltage generation circuit 75 generates the power supply voltage Vcc2, Vcc3 and Vcc4 on the lines w23, w24 and w25 respectively, based on the ground potential GND and the power supply voltage Vcc1 as supplied from the switching regulator 77. The line w22 is connected to the terminals T7 and T8 of the connector 32; the line w23 is connected to the terminals T11 and T12 of the connector 32; the line w24 is connected to the terminals T15 and T16 of the connector 32; and the line w25 is connected to the terminals T18 and T19 of the connector 32. In this case, the respective power supply voltages are determined in order that Vcc0>Vcc1>Vcc2>Vcc3>Vcc4. Incidentally, when the power supply switch 45 is turned off, since the power supply voltage Vcc1 is not generated, the power supply voltages Vcc1, Vcc2, Vcc3 and Vcc4 are not supplied to the cartridge 3 through the connector 32.

The audio amplifier 73 amplifies the R channel audio signal AR1 as input through the line w11 which is connected to the terminal T21 and the L channel audio signal AL1 as input through the line w10 which is connected to the terminal T20, and outputs the R channel audio signal AR2 and L channel audio signal AL2 as amplified to the lines w13 and w12 respectively. The line w9 for inputting the video signal VD to the power supply switch 45 is connected to the terminal T23 of the connector 32. A cylindrical ferrite 87 covers the lines w9, w12 and w13 in order to prevent electromagnetic waves from leaking from these lines.

The IR (infrared ray) receiver circuit 71 including the above infrared sensor digital demodulates the digital modulated infrared signal as received, and outputs the digital demodulated signal to the line w8. The line w8 is connected to the terminal T17 of the connector 32.

The key block 69 includes the cancel key 39, the arrow keys 37a to 37d and the enter key 35, and a shift register. (not shown in the figure) The shift register converts parallel signals as inputted from the respective keys 39, 37a to 37d, 35 and a terminal TE7 as described below into serial signals, and outputs to the line w3. The line w3 is connected to the terminal T6 of the connector 32. Also, while a clock is input to the key block 69 through the line w5 connected to the terminal T10, a control signal is input to the key block 69 through the line w4 connected to the terminal T9.

The crystal oscillator circuit 67 oscillates a clock signal at a predetermined frequency, and supplies the clock signal to the line w2. The line w2 is connected to the terminal T3 of the connector 32.

The reset switch 43 outputs a reset signal, which is used for resetting the system, to the line w1. The line w1 is connected to the terminal T4 of the connector 32.

The extension connector 63 is provided with the first to ninth terminals (referred to as terminals TE1 to TE9 in the following description). The terminals TE2, TE4 and TE6 are respectively connected to the terminals T13, T14 and T15 through the extension connector peripheral circuit 65. Accordingly, it is possible to input a signal from an external device connected to the extension connector 63 and output a signal to the external device through the terminals TE2, TE4 and TE6. The terminals TE9 and TE8 are connected to the lines w4 and w5 respectively. Accordingly, the same clock signal can be supplied to the external device connected to the extension connector 63 through the terminal TE8 as supplied to the key block 69, and the same control signal can be supplied to the external device connected to the extension connector 63 through the terminal TE9 as supplied to the key block 69.

The power supply voltages Vcc1 and Vcc2 are respectively supplied to the terminals TE3 and TE5 through the extension connector peripheral circuit 65. Accordingly, it is possible to supply the power supply voltages Vcc1 and Vcc2 to the external device connected to the extension connector 63 through the terminals TE3 and TE5. The terminal TE1 is grounded. The terminal TE7 is connected to a predetermined input terminal of the shift register as described above which is included in the key block 69 through the extension connector peripheral circuit 65.

The detection unit 500 of the stepper 1 is connected to the extension connector 63 as an external device, and whereby the power is supplied to the detection unit 500 from the adapter 5. Also, the detection unit 500 incorporates a rotary encoder 501. The rotary encoder 501 includes a slit member 532 as described below, two photo-transisters 502 and 504 arranged along the rotation direction of the slit member 532, and a light emitting diode 506. The photo-transisters 502 and 504 receive light from the light emitting diode 506 through the slit member 532, and outputs pulse signals whose phases are different from each other to the extension connector 63 in response to the rotation of the slit member 532. That is, an output signal of the photo-transister 502 is given to the terminal TE2 of the extension connector 63, and an output signal of the photo-transister 504 is given to the terminal TE4.

Figure 5:
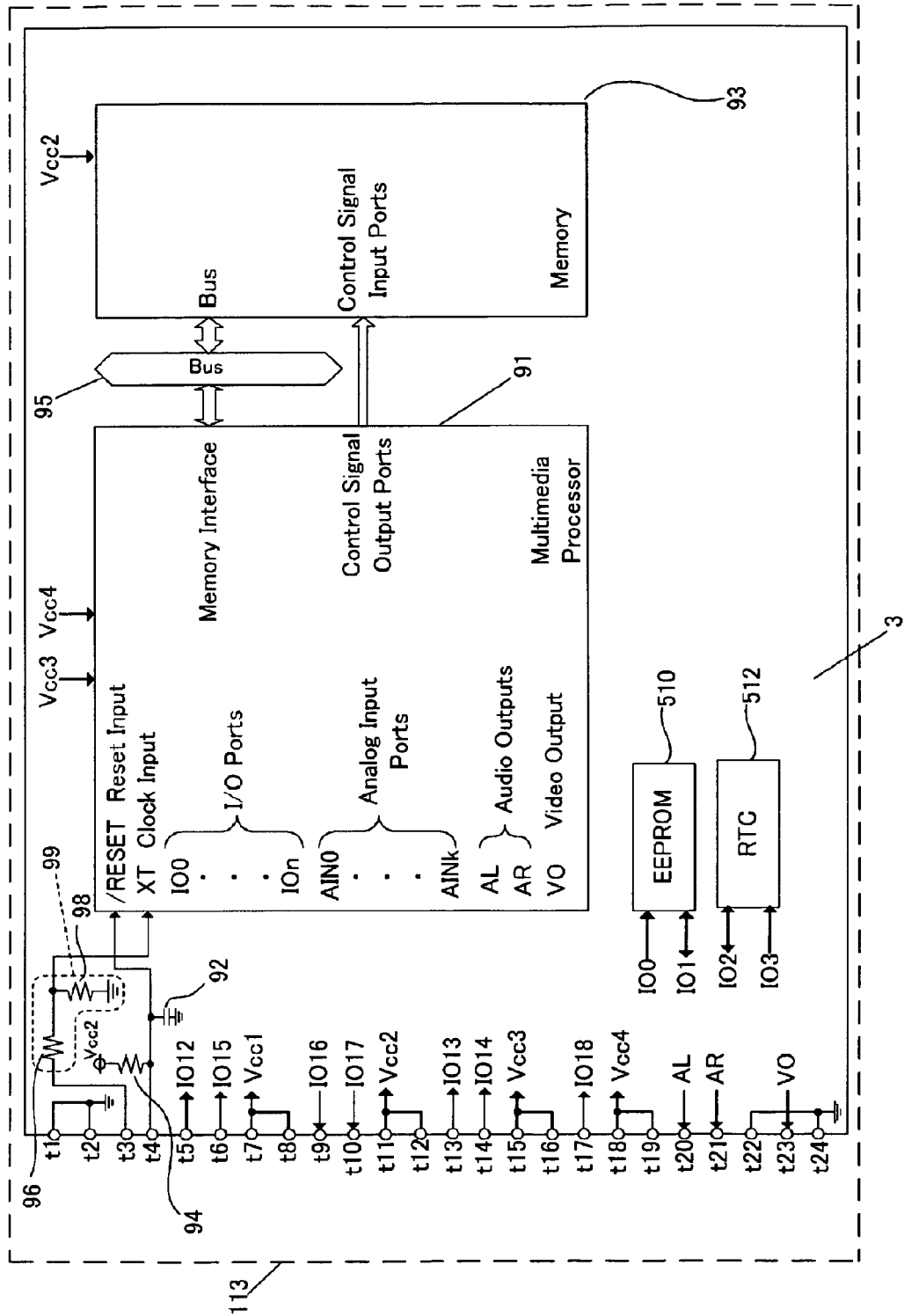
FIG. 5 is a block diagram for showing the internal configuration of the cartridge 3.

FIG. 5 is a block diagram for showing the internal configuration of the cartridge 3. As shown in FIG. 5, the cartridge 3 includes a multimedia processor 91, a memory 93, an EEPROM (Electrically Erasable Programmable Read Only Memory) 510, RTC (Real Time Clock) 512, terminals t1 to t24, a bus 95 (including an address bus and a data baus), and an amplitude setting circuit 99. The amplitude setting circuit 99 includes resistors 96 and 99.

The multi media processor 91 includes a reset input port /RESET for inputting a reset signal, a clock input port XT for inputting a clock signal SCLK2, an input/output ports (I/O ports) IO0 to IOn ("n" is a natural number, for example, n=23) for inputting/outputting data, analog input ports AIN0 to AINk ("k" is a natural number, for example, k=3), audio output ports AL and AR for outputting the audio signals AL1 and AR1, a video output port VO for outputting the video signal VD, control signal output ports for outputting control signals (for example, a chip enable signal, an output enable signal, a write enable signal), and a memory interface.

The memory 93 includes a bus (including a address bus and a data bus), and control signal input ports for inputting the control signals (for example, a chip enable signal, an output enable signal, a write enable signal). The memory 93 stores programs such as a program for controlling a screen of exercise assistance, image data, sound data and so on in advance. The memory 93 may be, for example, a ROM (read only memory), a flash memory, or any appropriate memory.

The control signal output ports of the multimedia processor 91 are connected to the control signal input ports of the memory 93. The memory interface of the multimedia processor 91 and the bus of the memory 93 are connected to the bus 95. In this case, the control signal output ports of the multimedia processor 91 include an OE output port for outputting an output enable signal, a CE output port for outputting a chip enable signal, a WE output port for outputting a write enable signal, and the like. Also, the control signal input ports of the memory 93 include an OE input port connected to the OE output port of the multimedia processor 91, a CE input port connected to the CE output port of the multimedia processor 91, a WE input port connected to the WE output port of the multimedia processor 91, and so forth.

When receiving the chip enable signal, the memory 93 responds to the signal as the destination thereof to output a data signal in accordance with an address signal and the output enable signal which are given substantially at the same time as the chip enable signal. The address signal is input to the memory 93 through the address bus of the bus 95 while the data signal is input to the multimedia processor 91 through the data bus of the bus 95. Also, when receiving the chip enable signal, the memory 93 responds to the signal as the destination thereof to write a data signal in accordance with an address signal and the write enable signal which are given substantially at the same time as the chip enable signal. The address signal is input to the memory 93 through the address bus of the bus 95 while the data signal is input to the memory 93 from the multimedia processor 91 through the data bus of the bus 95.

The EEPROM 510 is connected to the I/O ports IO0 and IO1 of the multimedia processor 91, and therefore through the I/O ports, the multimedia processor 91 supplies the clock signal to the EEPROM 510, reads data from the EEPROM 510, and writes data to the EEPROM 510. The RTC 512 counts time on the basis of a crystal oscillator (not shown in the figure), and generates time information to give it to the multimedia processor 91. The RTC 512 is connected to the I/O ports IO2 and IO3 of the multimedia processor 91, therefore through the I/O ports, is supplied the clock signal from the multimedia processor 91, and supplies the above time information to the multimedia processor 91.

When the cartridge 3 is installed into the adapter 5, the terminals t1 to t24 are connected to the terminals T1 to T24 of the connector 32 of the adapter 5 in a one-to-one correspondence. The terminals t1, t2, t22 and t24 are grounded. The terminal t3 is connected to the amplitude setting circuit 99. That is, one terminal of the resistor 96 of the amplitude setting circuit 99 is connected to the terminal t3 while the other terminal is connected to the clock input port XT of the multimedia processor 91 and one terminal of the resistor 98. The other terminal of the resistor 98 is grounded. In this way, the amplitude setting circuit 99 is a resistor divider.

The clock signal SCLK1 generated by oscillation of the crystal oscillator circuit 67 of the adapter 5 is input through the terminal t3 to the amplitude setting circuit 99 which then generates a clock signal SCLK2 having an amplitude smaller than the clock signal SCLK1 and outputs the clock signal SCLK2 to the clock input port XT. That is, the amplitude of the clock signal SCLK2 is set to a value which is determined by the ratio between the resistor 96 and the resistor 98.

The terminal t4 is connected to the reset input port /RESET of the multimedia processor 91. One terminal of the resistor 94 and one terminal of the capacitor 92 are connected to the line through which the reset input port /RESET is connected to the terminal t4. The other terminal of the resistor 94 is supplied with the power supply voltage Vcc2 while the other terminal of the capacitor 92 is grounded.

The terminals t5, t13, and t14 are connected respectively to the I/O ports IO12, IO13, and IO14 of the multimedia processor 91. Accordingly, the multimedia processor 91 can input signals from an external device connected to the extension connector 63 of FIG. 4 and outputs signals to the external device through the terminals t5, t13 and t14. Therefore, the signals outputted from photo-transisters 502 and 504 of the detection unit 500 of the stepper 1 are given to the I/O ports IO13 and IO14 of the multimedia processor 91 through the terminals t13 and t14.

The power supply voltage Vcc1 is supplied from the terminals t7 and t8. The power supply voltage Vcc2 is supplied from the terminals t11 and t12. The power supply voltage Vcc3 is supplied from the terminals t15 and t16. The power supply voltage Vcc4 is supplied from the terminals t18 and t19. The multimedia processor 91 is supplied with the power supply voltages Vcc3 and Vcc4.

The terminals t6, t9, t10 and t17 are connected respectively to the I/O ports IO15, IO16, IO17 and IO18 of the multimedia processor 91. Accordingly, the multimedia processor 91 can receive output signals from the key block 69 through the terminal t6. Also, the multimedia processor 91 can give control signals to an external device connected to the extension connector 63 and the key block 69 through the terminal t9. Further, the multimedia processor 91 can give clock signals to an external device connected to the extension connector 63 and the key block 69 through the terminal t10. Still further, the multimedia processor 91 can receive output signal from the IR receiver circuit 71 through the terminal t17.

The terminals t20 and t21 are connected respectively to the audio output ports AL and AR of the multimedia processor 91. The terminal t23 is connected to the video output port VO of the multimedia processor 91. Accordingly, the multimedia processor 91 can supply the audio amplifier 73 with the audio signals AL1 and AL2 through the terminals t20 and t21, and supply the power supply switch 45 of the adapter 5 with the video signal VD through the terminal t23.

The cartridge 3 is provided with a shield member 113. By virtue of the shield member 113, electromagnetic waves can be prevented, as much as possible, from leaking from the multimedia processor 91 and the like as external radiation.

The internal configuration of the multimedia processor 91 will be described simply. Although not shown in the figure, this multimedia processor 91 is provided with a central processing unit (referred to as the "CPU" in the following description), a graphics processing unit (referred to as the "GPU" in the following description), a sound processing unit (referred to as the "SPU" in the following description), a geometry engine (referred to as the "GE" in the following description), an external interface block, a main RAM, and an A/D converter (referred to as the "ADC" in the following description) and so forth.

The CPU performs various operations and controls the overall system in accordance with the programs stored in the memory 93. The CPU performs the process relating to graphics operations, which are performed by running the program stored in the memory 93, such as the calculation of the parameters required for the expansion, reduction, rotation and/or parallel displacement of the respective objects and the calculation of eye coordinates (camera coordinates) and a view vector. In this description, the term "object" is used to indicate a unit which is composed of one or more polygons or sprites and to which expansion, reduction, rotation and parallel displacement transformations are applied in an integral manner.

The GPU serves to generate a three-dimensional image composed of polygons and sprites on a real time base, and converts it into an analog composite video signal. The SPU generates PCM (pulse code modulation) wave data, amplitude data, and main volume data, and generates analog audio signals from them by analog multiplication. The GE performs geometry operations for displaying a three-dimensional image. Specifically, the GE executes arithmetic operations such as matrix multiplications, vector affine transformations, vector orthogonal transformations, perspective projection transformations, the calculations of vertex brightnesses/polygon brightnesses (vector inner products), and polygon back face culling processes (vector cross products).

The external interface block is an interface with peripheral devices, and includes programmable digital input/output (I/O) ports IO0 to IO23 of 24 channels. Also, it includes a counter as described below. The ADC is connected to analog input ports AIN0 to AIN3 of 4 channels and serves to convert an analog signal, which is input from an analog input device through the analog input port, into a digital signal. The main RAM is used by the CPU as a work area, a variable storing area, a virtual memory system management area and so forth.

The memory interface serves to read data from the memory 93 and write data to the memory 93, respectively through the bus 95. Also, the memory interface has the DMA function.

Figure 6:
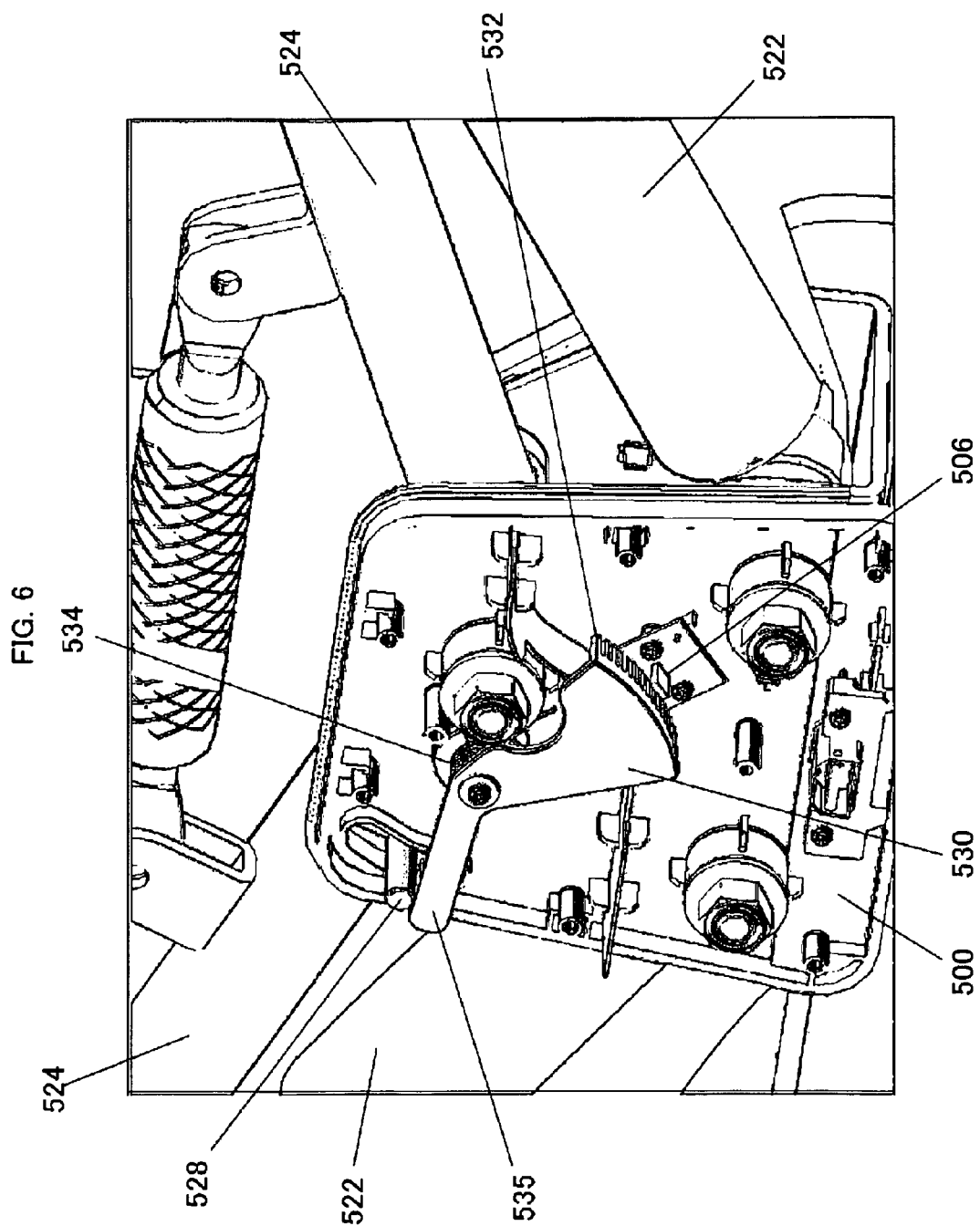
FIG. 6 is a view for showing the internal configuration of the detection unit 500 of the stepper 1.

FIG. 6 is a view for showing the internal configuration of the detection unit 500 of the stepper 1. As shown in FIG. 6, the detection unit 500 includes the light emitting diode 506, the photo-transisters 502 and 504 (not appeared in the figure), a rotation member 530 having the slit member 532 and an arm 535, and a spring 534.

A cylindrical convex member 528 protrudes from the support member 524 coupled to the pedal 520R, and comes in contact with the arm 535. When the pedal 520R moves downwardly, the convex member 528 depresses the arm 535, and thereby the rotation member 530 rotates in a counter clockwise direction of the FIG. 6. On the other hand, when the pedal 520R moves upwardly, the rotation member 530 rotates in a clockwise direction of the FIG. 6 by repulsion force of the spring 534.

Each time the player makes the stepping motion in a right-left alternate manner on the stepper 1, the rotation member 530 repeats alternately a rotation in the clockwise direction and a rotation in the counter clockwise direction. For this reason, each time the rotation direction of the rotation member 530 changes, output timing of two pulse signals from the photo-transisters 502 and 504, which receive light from the light emitting diode 506 through the slit member 532, becomes opposite. The multimedia processor 91 receives the two pulse signals through the external interface block, and counts up or counts down the above counter in accordance with the output timing of the two pulse signals to store a count value in a Vs register (not shown in the figure). It is possible to recognize speed of the step motion based on the count value. Also, it is possible to recognize the rotation direction of the rotation member 530 based on a sign of the count value.

Figure 7:
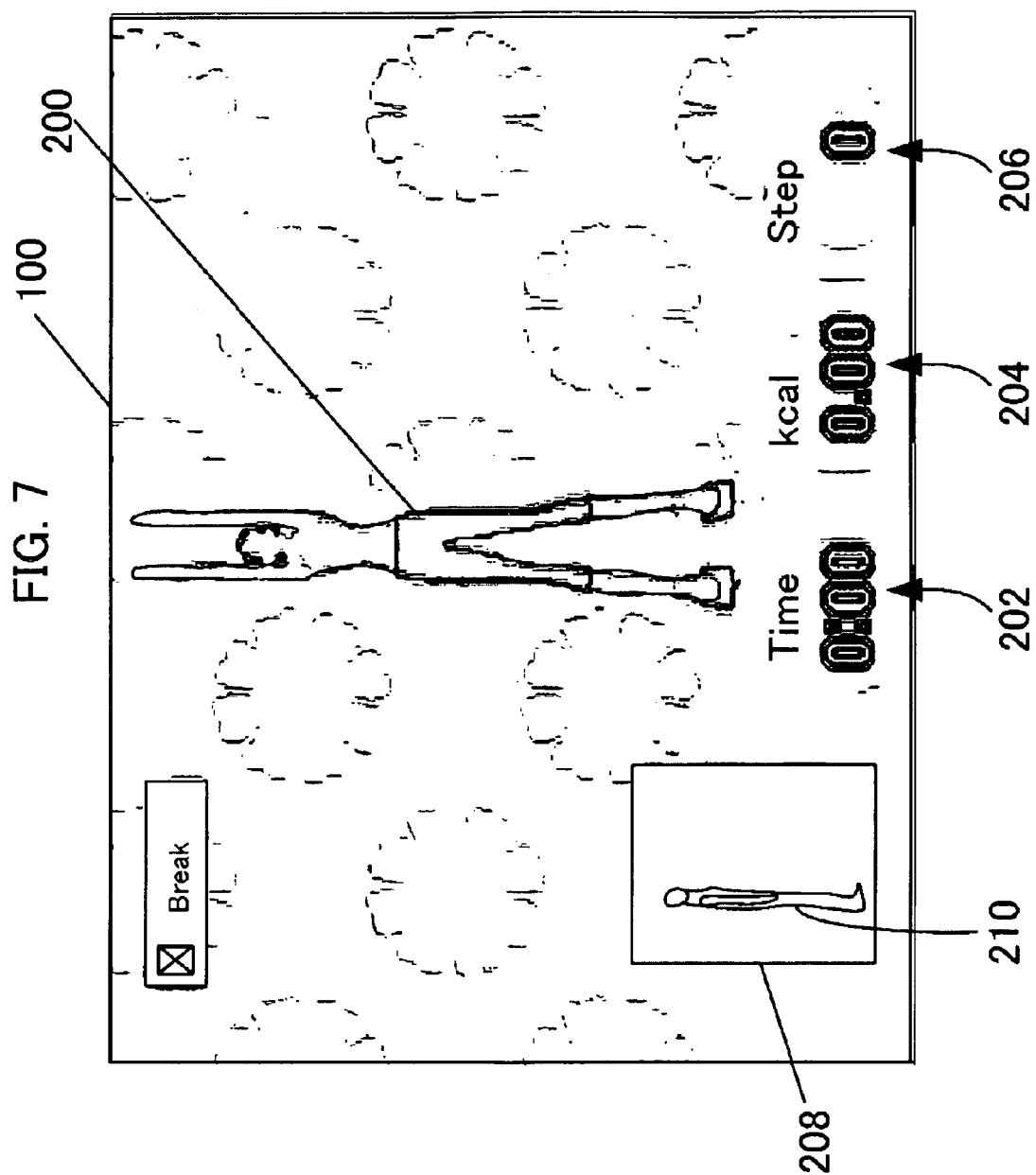
FIG. 7 is a view for showing an example of an exercise assistance screen displayed on a television monitor 100 of FIG. 1.

FIG. 7 is a view for showing an example of an exercise assistance screen displayed on the television monitor 100 of FIG. 1. Referring to FIG. 7, the exercise assistance screen includes a CPU character 200, a window 208, a time display section 202, a calorie consumption display section 204 and a step number display section 206. A player character 210 is displayed in the window 208.

Each time the stepping motion of the player is detected, the multimedia processor 91 moves legs of the player character 210 alternately so that the player character 210 walks or runs. As switching of the rotation direction of the rotation member 530 of FIG. 6 is faster, the movement of the legs of the player character is faster, while the switching is slower, the movement of the legs of the player character is slower.

The player character not only reflects the stepping motion of the player, although not shown in the figure, but the player character also emits light from regions (thighs, calves, and so forth) corresponding to regions of which the player uses muscles to make the player aware of usage of a muscle and burning of fat. In addition, a model of the motion of the upper half of the body as well as the stepping motion may be shown for the player which affords to get exercise of the upper half of the body.

Also, the multimedia processor 91 stores the number of times of the stepping motion of the player, and displays the total of the number of times of the stepping motion of the day in the step number display section 206. Further, the calorie consumption of the player is calculated based on the number of times of the stepping motion, the body height and weight inputted preliminarily by the player, and a formula for calculating the calorie consumption which is preliminarily stored, and is displayed in the calorie consumption display section 204. Still further, the multimedia processor 91 measures time when the player exercises using the stepper 1, and display the time in the time display section 202.

In the present exercise assistance system, the exercise menu to be performed in a day is predetermined (see FIG. 28 as described below), and a screen for warming up as the first exercise of the day is set. Also, a screen for cooling down as the last exercise of the day is set. The screen of FIG. 7 corresponds to these screens.

Accordingly, the multimedia processor 91 displays the video image, in which the CPU character 200 on the stepper object imitating the stepper 1 gets exercise such as warm-up and cool-down, on this screen. The player may emulate the motion of the CPU character 200 to exercise every part of the body and warm the body, perform only the stepping motion, or control his/her breathing without performing anything.

Figure 8:
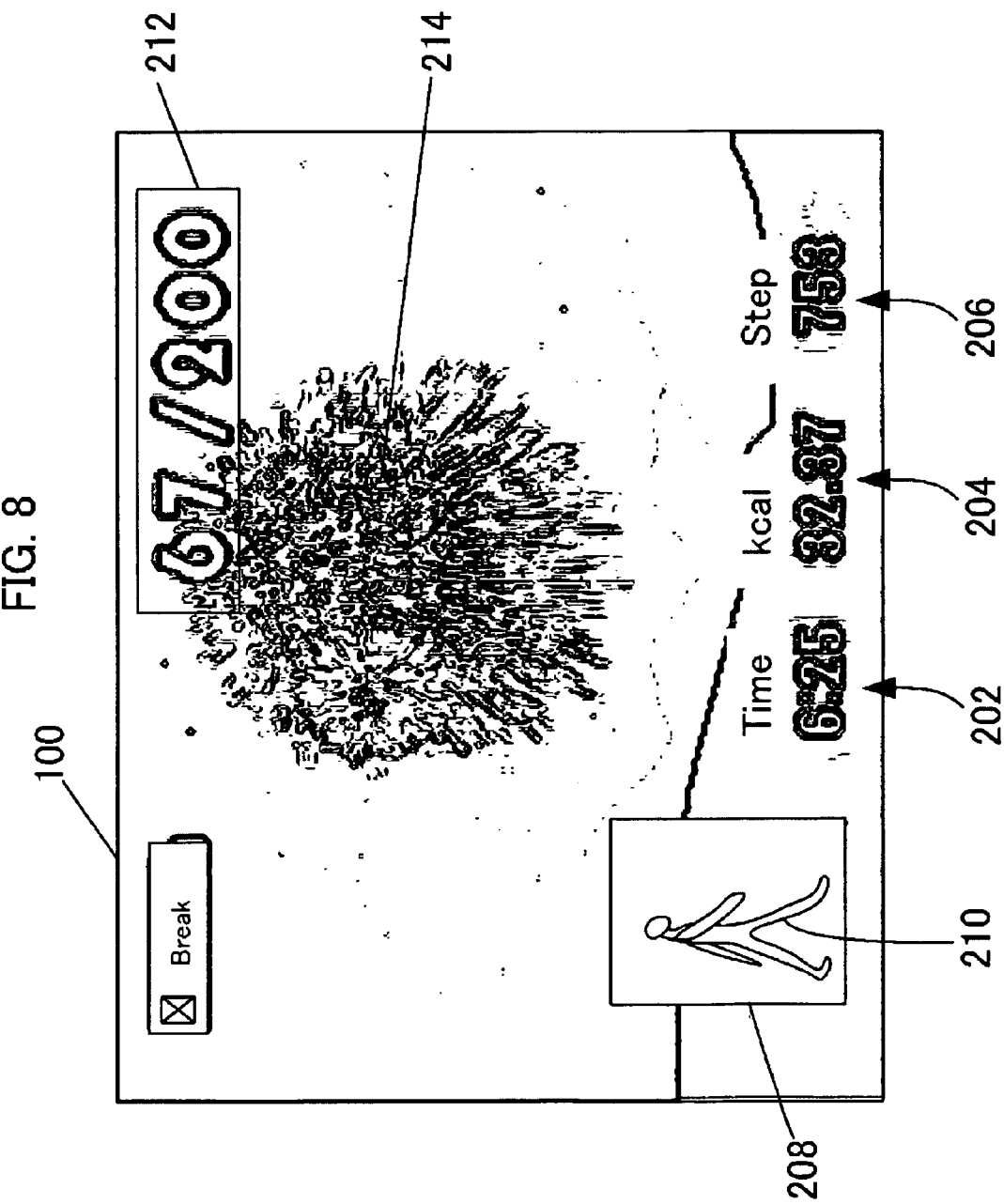
FIG. 8 is a view for showing another example of an exercise assistance screen displayed on the television monitor 100 of FIG. 1.

FIG. 8 is a view for showing another example of an exercise assistance screen displayed on the television monitor 100 of FIG. 1. As shown in FIG. 8, this exercise assistance screen includes a firework object 214, a quota display section 212, the window 208, the time display section 202, the calorie consumption display section 204, and the step number display section 206.

When this exercise starts, each time the stepping motion of the player is detected, the multimedia processor 91 performs the representation to cause the appearance of one firework object 214 followed by the disappearance thereof. Each time it is detected that the player carries out a predetermined number of times of the steps, the multimedia processor 91 displays a more spectacular firework object than that of the case of one step. The multimedia processor 91 concludes this screen when the player performs the steps by the frequency corresponding to the quota shown in the quota display section 212 (while the numeric characters "67/200" are displayed in the figure, it represents that 67 times of the steps among 200 times as the quota are done).

Figure 9:
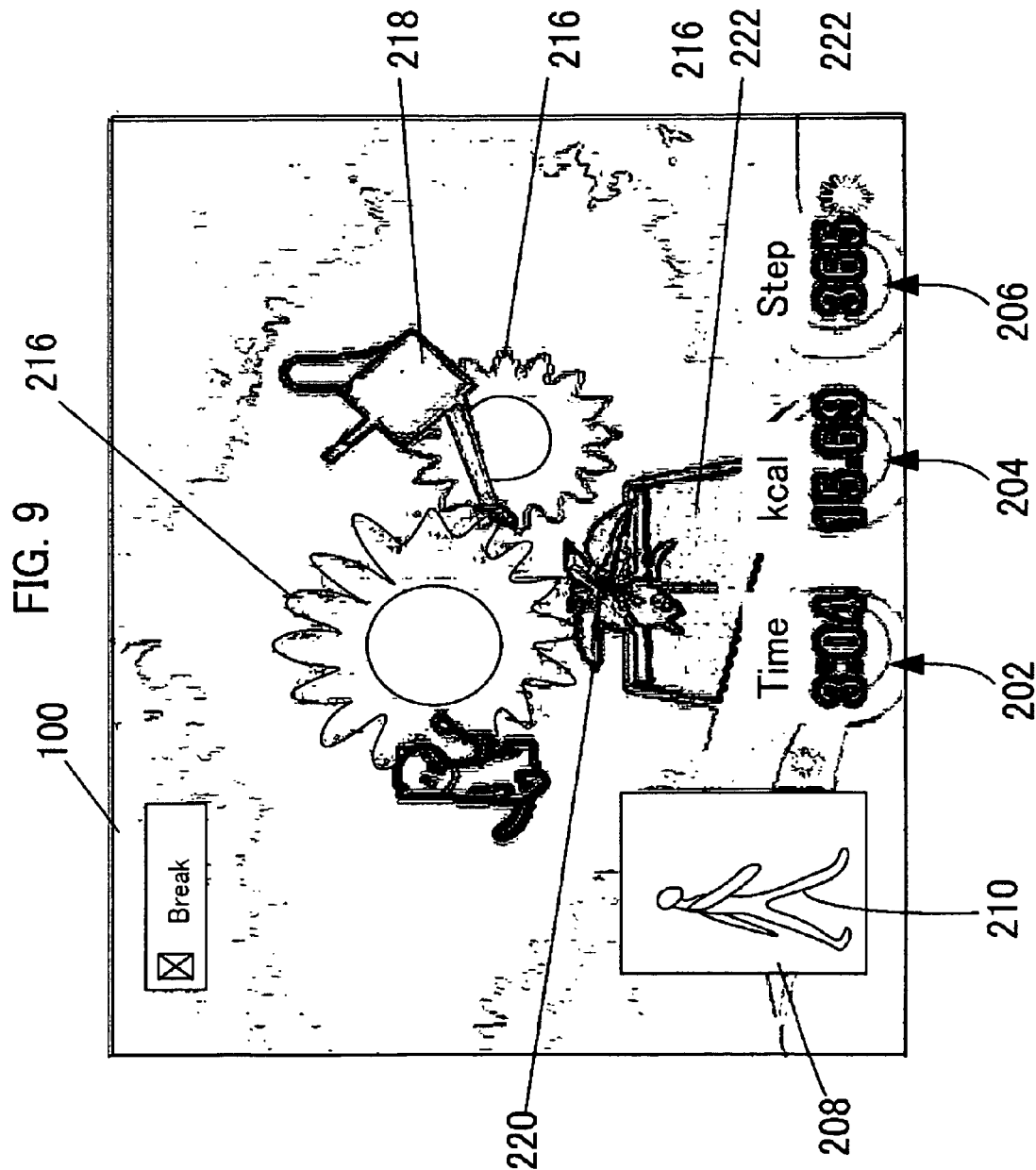
FIG. 9 is a view for showing further example of an exercise assistance screen displayed on the television monitor 100 of FIG. 1.

FIG. 9 is a view for showing further example of an exercise assistance screen displayed on the television monitor 100 of FIG. 1. As shown in FIG. 9, this exercise assistance screen includes a flower object 216, a watering pot object 218, plant objects 220, a flower bed object 222, the window 208, the time display section 202, the calorie consumption display object 204, and the step number display section 206.

Each time the stepping motion of the player is detected, the multimedia processor 91 performs the representation to cause the appearance of the flower object 216 on the background displayed on the television monitor 100 followed by the disappearance of the flower object 216, and simultaneously perfumes the representation in which the watering pot object 218 supplies water to the flower bed object 222 in the center area of the screen. When it is detected that the player performs a predetermined number of times of the steps, the multimedia processor 91 displays a word "To Be Continued", and concludes the screen of the day. At this time, the multimedia processor 91 stores the number of times of the steps performed by the player in accordance with this screen.

The plant object 220 which has grown by one stage is displayed on the next exercise assistance screen. Then, when the exercise of 6 days is performed in accordance with this exercise assistance screen, the plant object 220, whose flower has opened, is displayed. The multimedia processor 91 determines in a random manner which of a plurality of types of flowers which are prepared is opened.

In this way, before displaying this exercise assistance screen, the multimedia processor 91 reads out the number of times of the steps performed by the player in accordance with this screen, controls growth state in accordance with the number of the times as read, and then displays the plant object 220 on the flower bed object 222. In the case where the player does not get the stepping exercise of a day, the plant object 220 is not displayed while only the flower bed object 222 is displayed.

Since the exercise assistance screen shown in FIG. 9 simulates cultivation of a flower, if the player continues the exercise over predetermined days, the plant grows gradually and has the flower finally.

Figure 10:
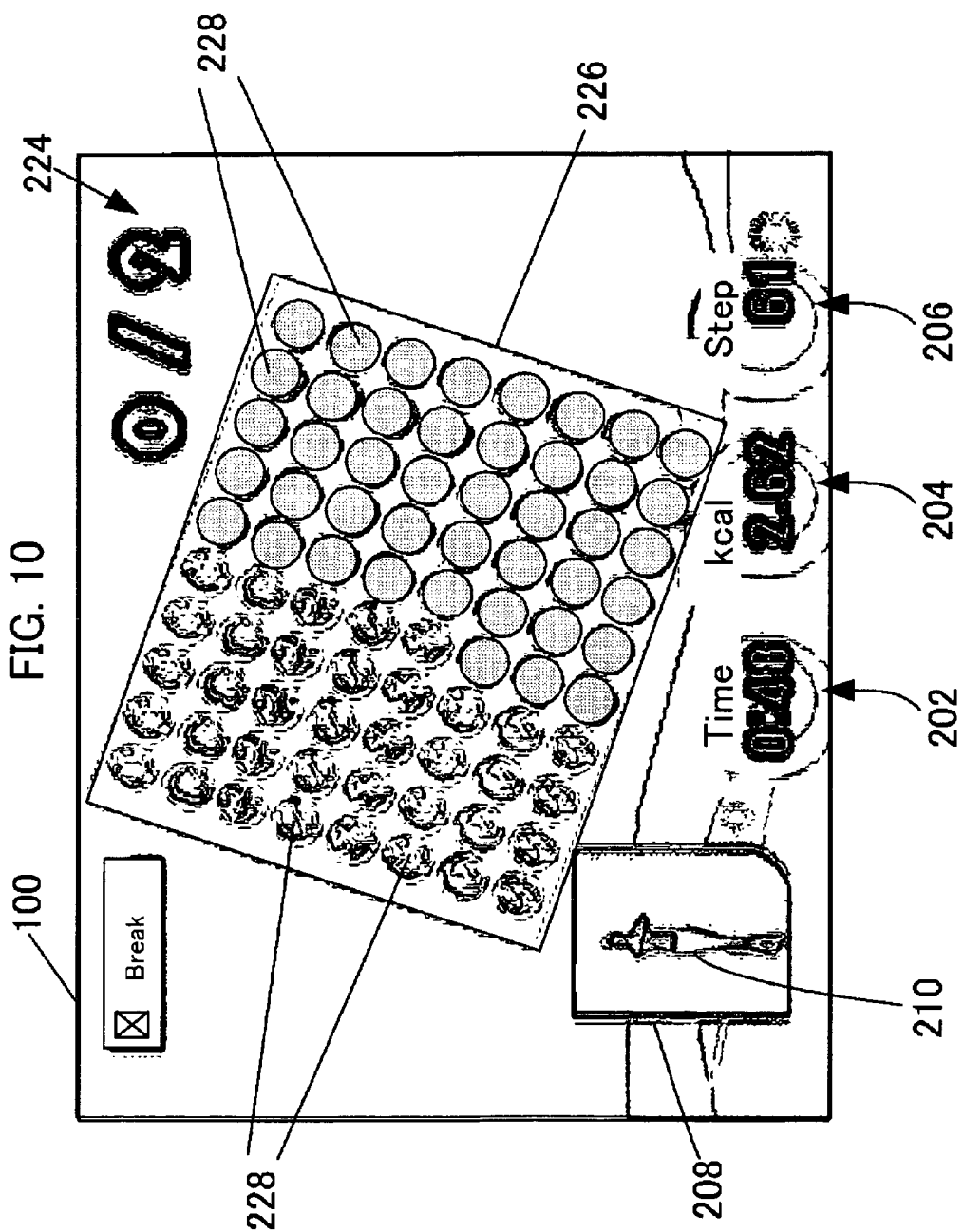
FIG. 10 is a view for showing still further example of an exercise assistance screen displayed on the television monitor 100 of FIG. 1.

FIG. 10 is a view for showing still further example of an exercise assistance screen displayed on the television monitor 100 of FIG. 1. As shown in FIG. 10, this exercise assistance screen includes a quota display section 224, a bubble wrap object 226, the window 208, the time display section 202, the calorie consumption display object 204, and the step number display section 206.

Each time the stepping motion of the player is detected, the multimedia processor 91 performs the representation to cause the burst of a bubble object 228 of the bubble wrap object 226. If all the bubble objects 228 are burst, the new bubble wrap object 226 is displayed. If all the bubble objects 228 included in the instructed number of the bubble wrap objects 226 in the quota display section 212 ("2" in the figure) are burst, this screen is concluded.

In this way, since this exercise assistance screen simulates such behavior as to burst bubbles of a bubble wrap, which is often performed for killing time, each time the player performs the stepping motion, the bubble bursts.

Figure 11:
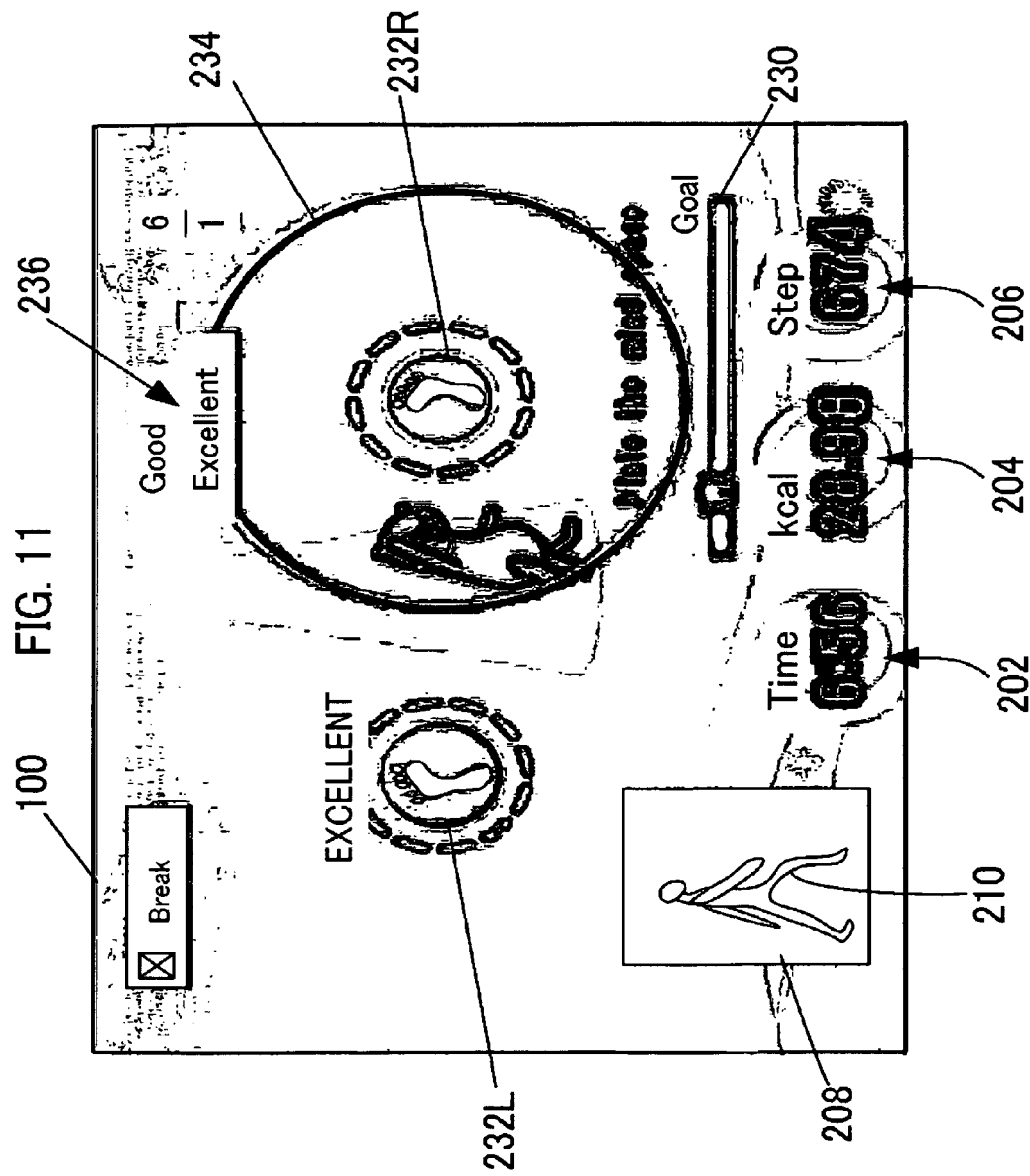
FIG. 11 is a view for showing still further example of an exercise assistance screen displayed on the television monitor 100 of FIG. 1.

FIG. 11 is a view for showing still further example of an exercise assistance screen displayed on the television monitor 100 of FIG. 1. As shown in FIG. 11, this exercise assistance screen includes a progress display section 230, reference circles 232L and 232R, a timing instructing circle 234, an evaluation display section 236, the window 208, the time display section 202, the calorie consumption display object 204, and the step number display section 206.

The reference circle 232L corresponds to the left foot of the player while the reference circle 232R corresponds to the right foot of the player. Then, the timing for pressing down with the left foot is instructed by the timing instructing circle 234 including the reference circle 232L while the timing for pressing down with the right foot is instructed by the timing instructing circle 234 including the reference circle 232R. The specific description is as follows.

The timing instructing circle 234, whose diameter is larger than that of the reference circles 232L and 232R, shrinks gradually so as to overlap with the reference circle 232 or 232R. The appearance of the timing instructing circle 234 and time when the timing instructing circle 234 overlaps with the reference circle 232L or 232R are predetermined in accordance with music.

When it is detected that the player performs the stepping motion with the left foot just as the timing instructing circle 234 overlaps with the reference circle 232L, or when it is detected that the player performs the stepping motion with the right foot just as the timing instructing circle 234 overlaps with the reference circle 232R, the multimedia processor 91 displays the word "EXCELLENT" on the screen. When it is detected that the player performs the stepping motion in timing as deviated somewhat, the multimedia processor 91 displays the word "GOOD" on the screen. At the same time, the value of the section of the "EXCELLENT" or "GOOD" in the evaluation display section 236 is counted up.

A symbol (a face symbol of a character in the figure) moves from the left end to the right end of a crossbar in the progress display section 230, and whereby it indicates the extent to which music progresses now and how soon the music ends. When the player is given the evaluation of "EXCELLENT", the multimedia processor 91 has the character object located in the center of the screen dance the randomly selected one among some predetermined dancing actions. When the one music ends, this screen ends.

Figure 12:
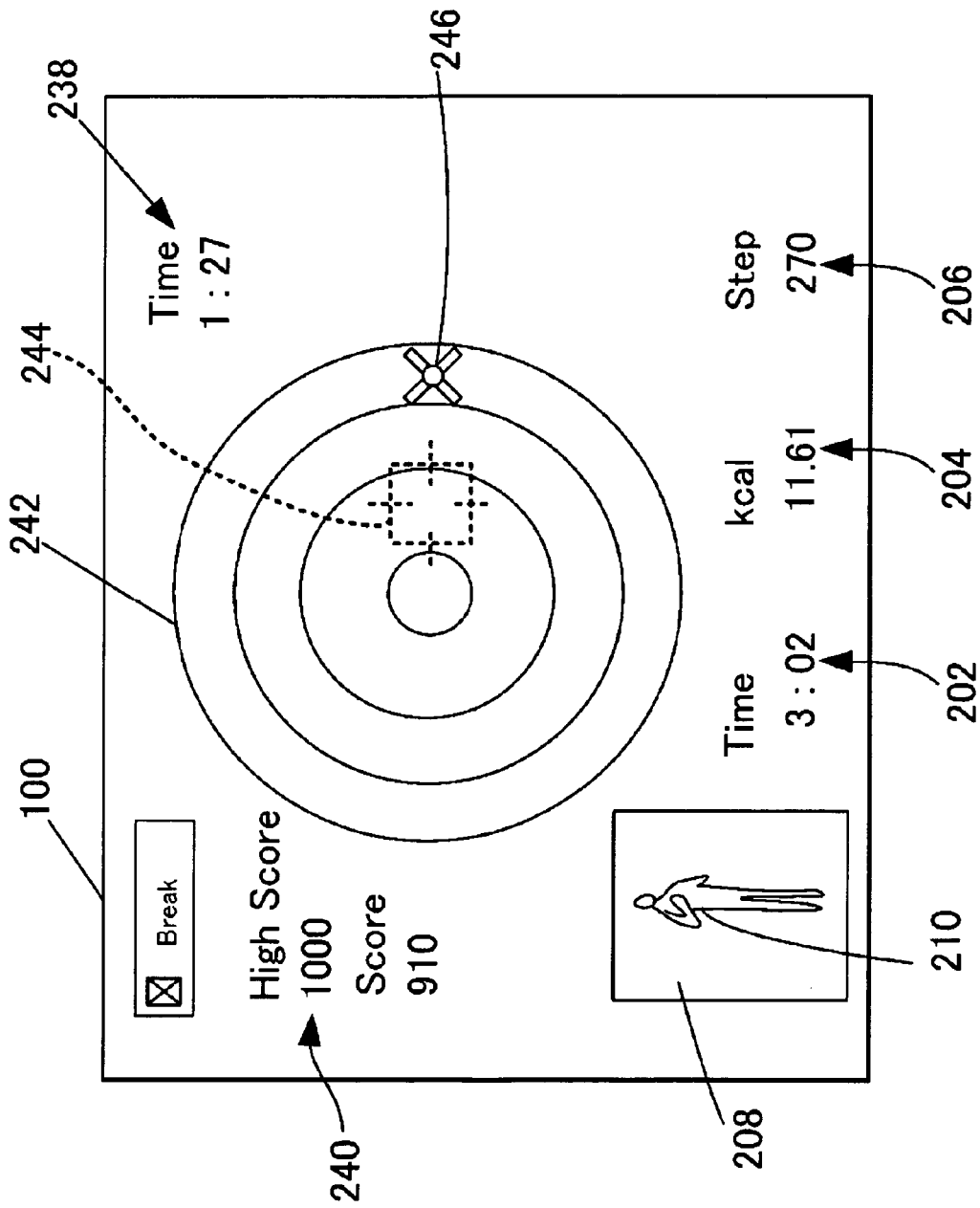
FIG. 12 is a view for showing still further example of an exercise assistance screen displayed on the television monitor 100 of FIG. 1.

As described above, this exercise assistance screen has the player get the stepping exercise while enjoying the music and more enjoying by introducing game elements FIG. 12 is a view for showing still further example of an exercise assistance screen displayed on the television monitor 100 of FIG. 1. As shown in FIG. 12, this exercise assistance screen includes a target object 242, a target cursor 244, an arrow object 246, a score display section 240, a remaining time display section 238, the window 208, the time display section 202, the calorie consumption display object 204, and the step number display section 206.

When this screen is started, the multimedia processor 91 displays the representation where the target cursor 244 moves horizontally. Each time the stepping motion of the player is detected, the multimedia processor 91 shoots the arrow object 246 toward the target object 242 in the screen. The arrow object 246 is displayed so as to stick in the position of the target cursor 244 just as the stepping motion is performed. As the position where the arrow object 246 sticks is closer to the center of the target object 242, a point is higher, and then the point is added to the score in the score display section 240. A new record is stored and displayed in a section in the figure where the word "High Score" is displayed. When a predetermined time passes, the multimedia processor 91 ends this screen. The remaining time is displayed in the remaining time display section 238.

As described above, this exercise assistance screen simulates darts, and the stepping motion in timely manner enable the arrow object 246 to stick in the center of the target object 242.

Figure 13:
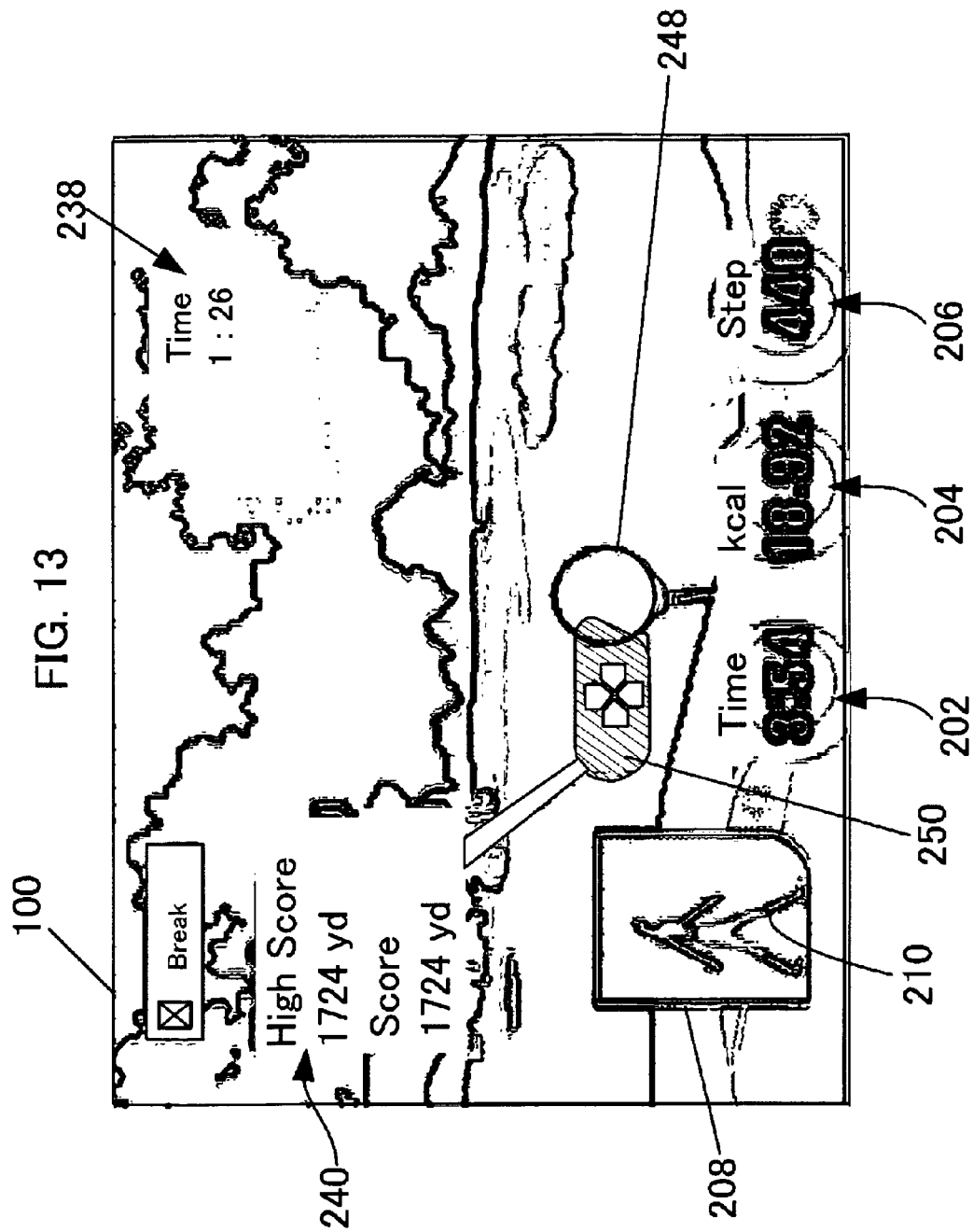
FIG. 13 is a view for showing still further example of an exercise assistance screen displayed on the television monitor 100 of FIG. 1.

FIG. 13 is a view for showing still further example of an exercise assistance screen displayed on the television monitor 100 of FIG. 1. As shown in FIG. 13, this exercise assistance screen includes a golf ball object 248, a golf club object 250, the score display section 240, the remaining time display section 238, the window 208, the time display section 202, the calorie consumption display object 204, and the step number display section 206.

The golf club object 250 moves horizontally, and the golf ball object 248 remains stationary. When the player performs the stepping motion, the multimedia processor 91 displays the representation where the club object 250 is swung and the golf ball object 248 flies. As the center of the golf club object 250 is closer to the center of the golf ball object 248, a point is higher because a carry of the ball is longer, and then the point is added to the score in the score display section 240. A new record is stored and displayed in a section in the figure where the word "High Score" is displayed. When a predetermined time passes, the multimedia processor 91 ends this screen. As described above, this exercise assistance screen simulates tee shot of golf.

Figure 14:
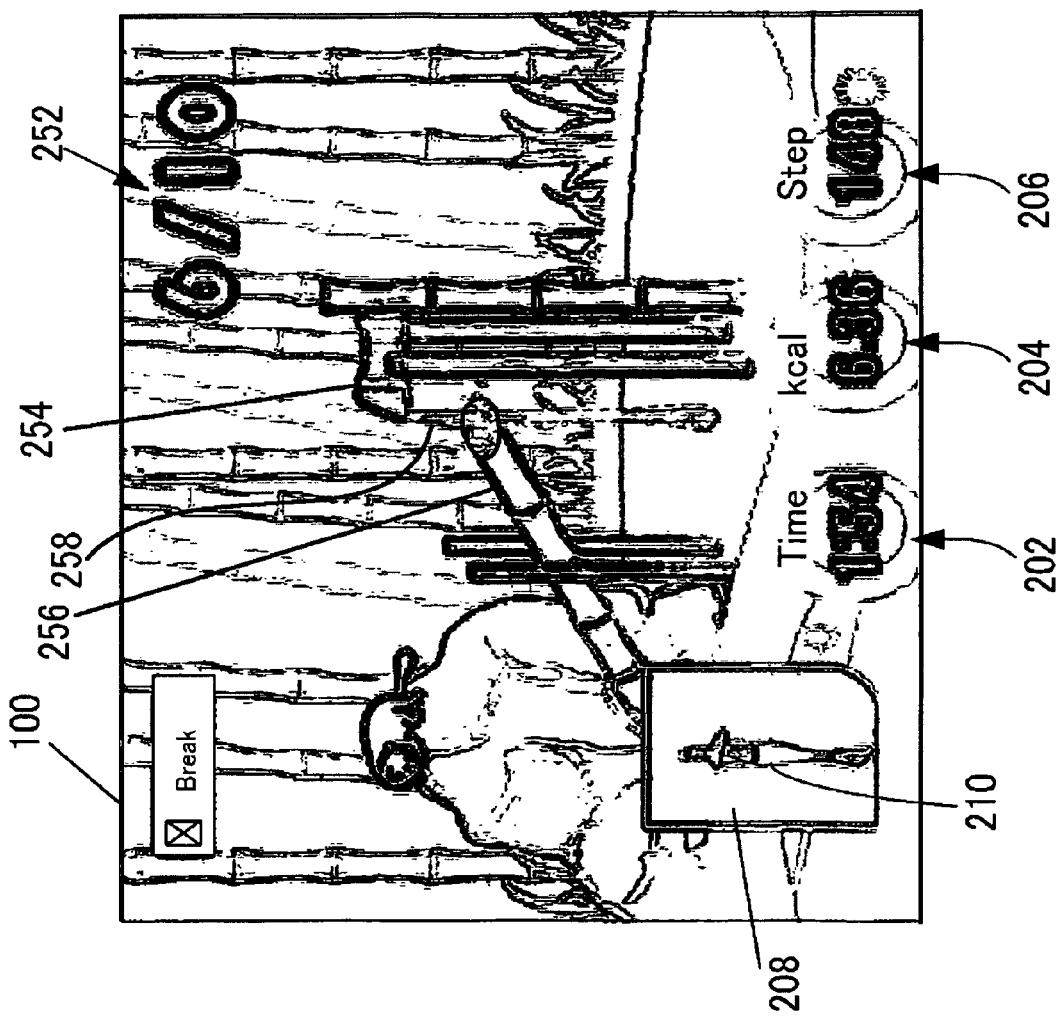
FIG. 14 is a view for showing still further example of an exercise assistance screen displayed on the television monitor 100 of FIG. 1.

FIG. 14 is a view for showing still further example of an exercise assistance screen displayed on the television monitor 100 of FIG. 1. As shown in FIG. 14, this exercise assistance screen includes a quota display section 252, a water outlet object 254, a "Shishi-odosh" object 256, a water object 258, the window 208, the time display section 202, the calorie consumption display object 204, and the step number display section 206.

When the stepping motion of the player is detected, the multimedia processor 91 displays the representation where the water object 258 flows out of the water outlet object 254 and is accumulated in the "Shishi-odosh" object 256. When it is detected that the player carries out a predetermined number of times of the steps, the "Shishi-odosh" object 256 tilts to reverberate the sound characteristic of Japanese "Shishi-odosh" as if a bamboo cylinder hit a stone, and the quota performance, which is shown in the quota display section 252, is updated (while the numeric characters "6/10" are displayed in the figure, it represents that 6 times among 10 times as the quota is done).

When it is detected that the player carries out a predetermined number of times of the steps as the quota, the multimedia processor 91 ends this screen. As described above, this exercise assistance screen simulates the Japanese "Shishi-odoshi", the water is disembogued into the "Shishi-odoshi" in response to the stepping motion of the player, and the sound is outputted after disemboguing the water for a certain time.

Figure 15:
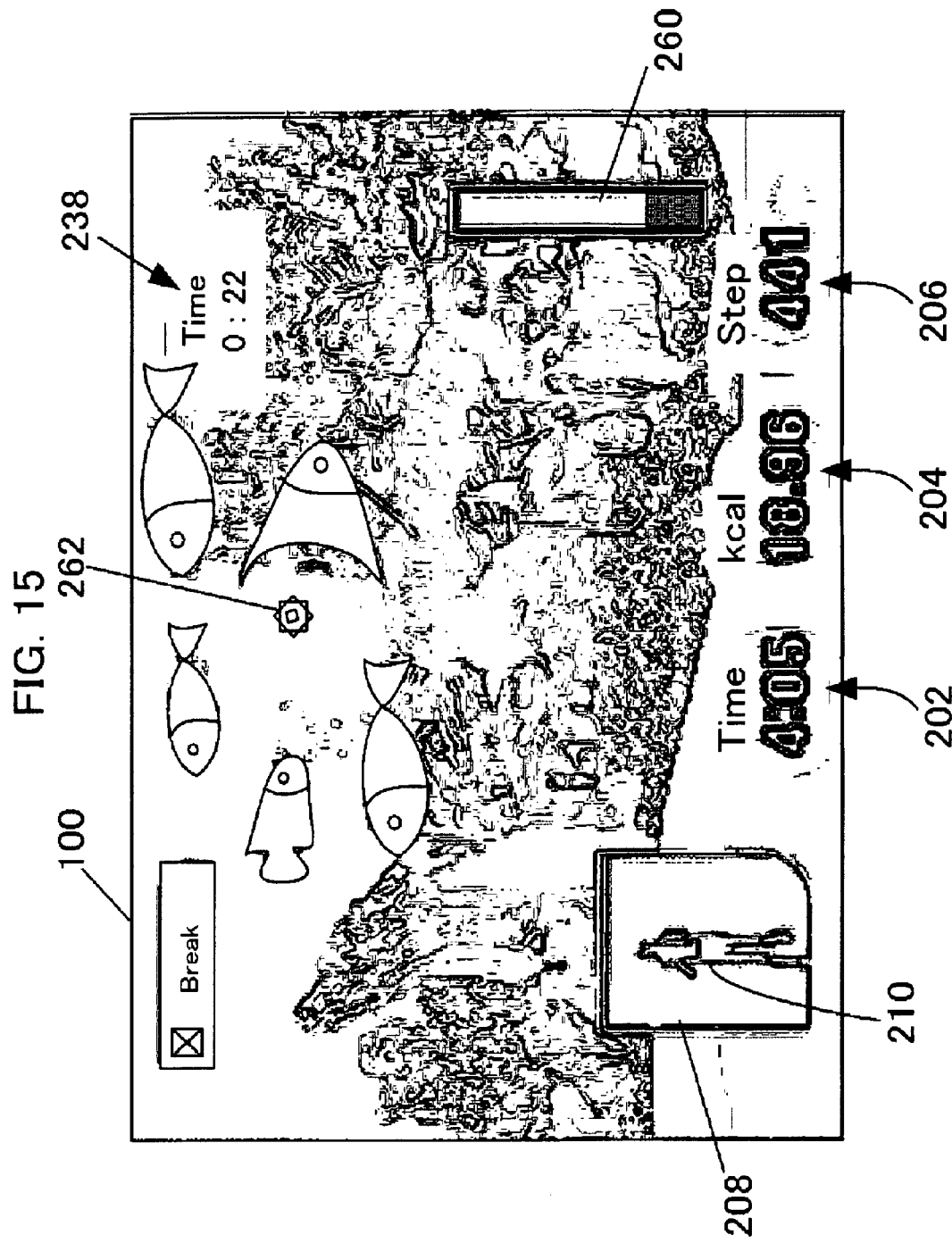
FIG. 15 is a view for showing still further example of an exercise assistance screen displayed on the television monitor 100 of FIG. 1.

FIG. 15 is a view for showing still further example of an exercise assistance screen displayed on the television monitor 100 of FIG. 1. As shown in FIG. 15, this exercise assistance screen includes the remaining time display section 238, a bait object 262, an exercise volume display section 260, the window 208, the time display section 202, the calorie consumption display object 204, and the step number display section 206.

When the stepping motion of the player is detected, the multimedia processor 91 displays the representation on the screen, where air is sent a fish tank, the bait object 262 is dropped into the fish tank, and the exercise volume indicated by the bar 260 increases. Also, when it is detected that the player carries out a predetermined number of times of the steps, the multimedia processor 91 performs the representation where the bar 260 extends until the maximum length and after that returns to zero, and the number of the fish objects to be displayed in the fish tank increases.

Further, when a predetermined time is passed, the multimedia processor 91 ends this screen of the day. At this time, the multimedia processor 91 records the number of the fish objects displayed in the fish tank and a date when the player exercises based on this screen, and reduces the number of the fish objects as recorded by one if the stepping motion of the player is not detected for three days and counting after recording. When the screen is displayed next time, the fish objects whose number is computed by the above processing are displayed. In other words, if the player continually performs the stepping exercise in accordance with this screen, the player can keep many fishes in the fish tank on the screen. That is, it is possible to give the purpose of keeping many fishes to have the player exercise continually.

As described above, this screen simulates an aquarium, as the player exercises zealously every day, the fish increases, while the fishes decrease if days when the exercise is not performed continue over several days.

Figure 16:
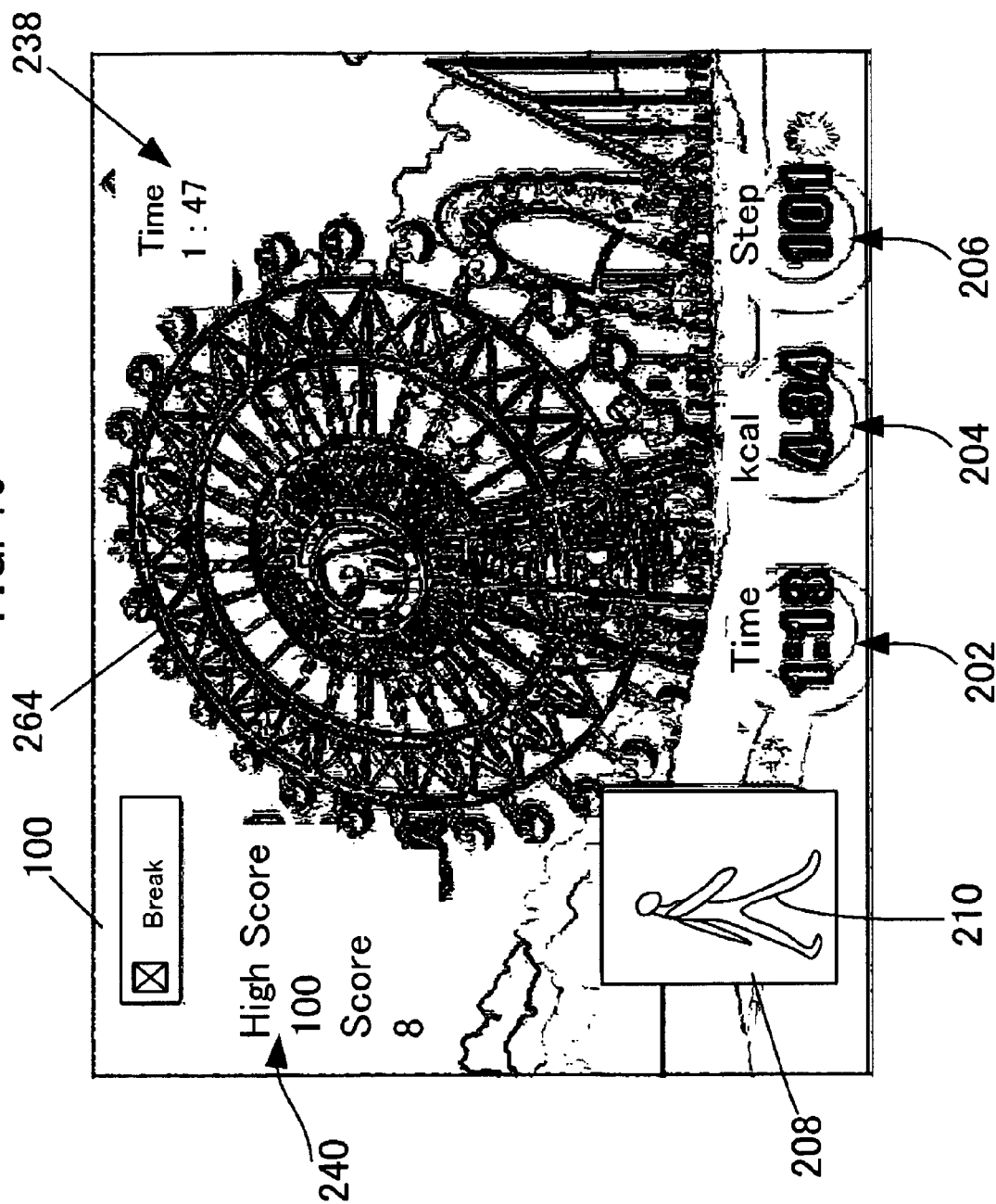
FIG. 16 is a view for showing still further example of an exercise assistance screen displayed on the television monitor 100 of FIG. 1.

FIG. 16 is a view for showing still further example of an exercise assistance screen displayed on the television monitor 100 of FIG. 1. As shown in FIG. 16, this exercise assistance screen includes the remaining time display section 238, the score display section 240, a Ferris wheel object 264, the window 208, the time display section 202, the calorie consumption display object 204, and the step number display section 206.

When the stepping motion of the player is detected, the multimedia processor 91 increases the rotational speed of the Ferris wheel object 264. When the Ferris wheel object 264 rotates, the point is added, and then the current score and the best record in the past screen are displayed in the score display section 240. If certain points or more are obtained, the electric spectaculars of the Ferris wheel object 264 glitter to uplift feeling of the player. When the value of the remaining time display section 238 becomes zero, this screen is finished.

In this way, this exercise assistance screen simulates a Ferris wheel, as the player performs the stepping motion more quickly, the Ferris wheel rotates faster, and therefore it enables more persons to ride the Ferris wheel.

Figure 17:
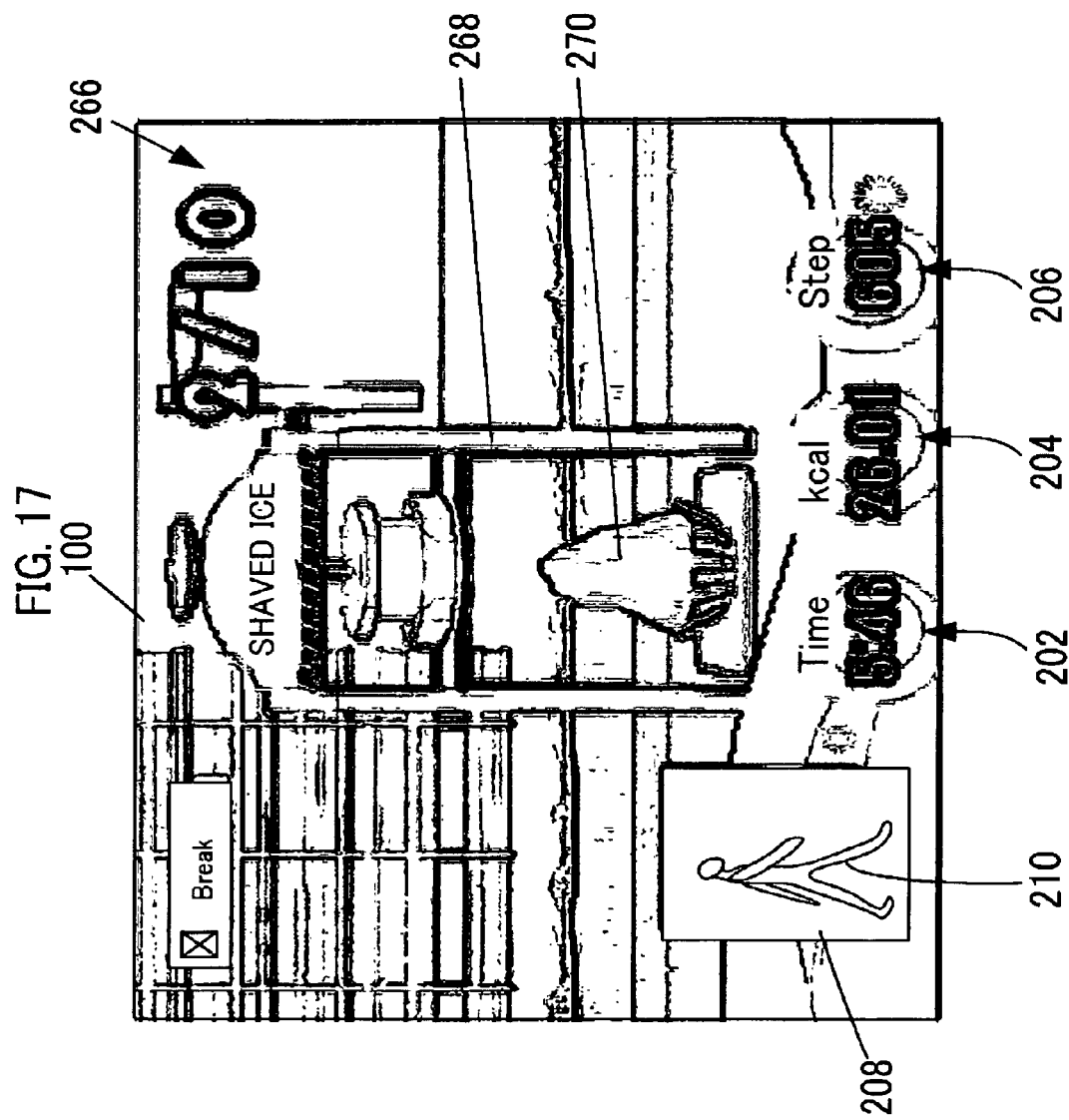
FIG. 17 is a view for showing still further example of an exercise assistance screen displayed on the television monitor 100 of FIG. 1.

FIG. 17 is a view for showing still further example of an exercise assistance screen displayed on the television monitor 100 of FIG. 1. As shown in FIG. 17, this exercise assistance screen includes a quota display section 266, a shaved ice machine object 268, a shaved ice object 270, the window 208, the time display section 202, the calorie consumption display object 204, and the step number display section 206.

When the stepping motion of the player is detected, the multimedia processor 91 performs the representation where the shaved ice machine object 268 operates to make the shaved ice object 270 of the ice as shaved. In addition, if a predetermined number of times of steps or more are detected, the shaved ice object 270 is finished up, and the numeral of the quota display section 266 is changed (while the numeric characters "2/10" are displayed in the figure, it represents that 2 bowls of 10 bowls are finished up). If the quota is achieved, this screen is finished.

In this way, this exercise assistance screen simulates a shaved ice machine, when the player carries out the stepping motion, the shaved ice machine object 268 operates to make the shaved ice.

Figure 18:
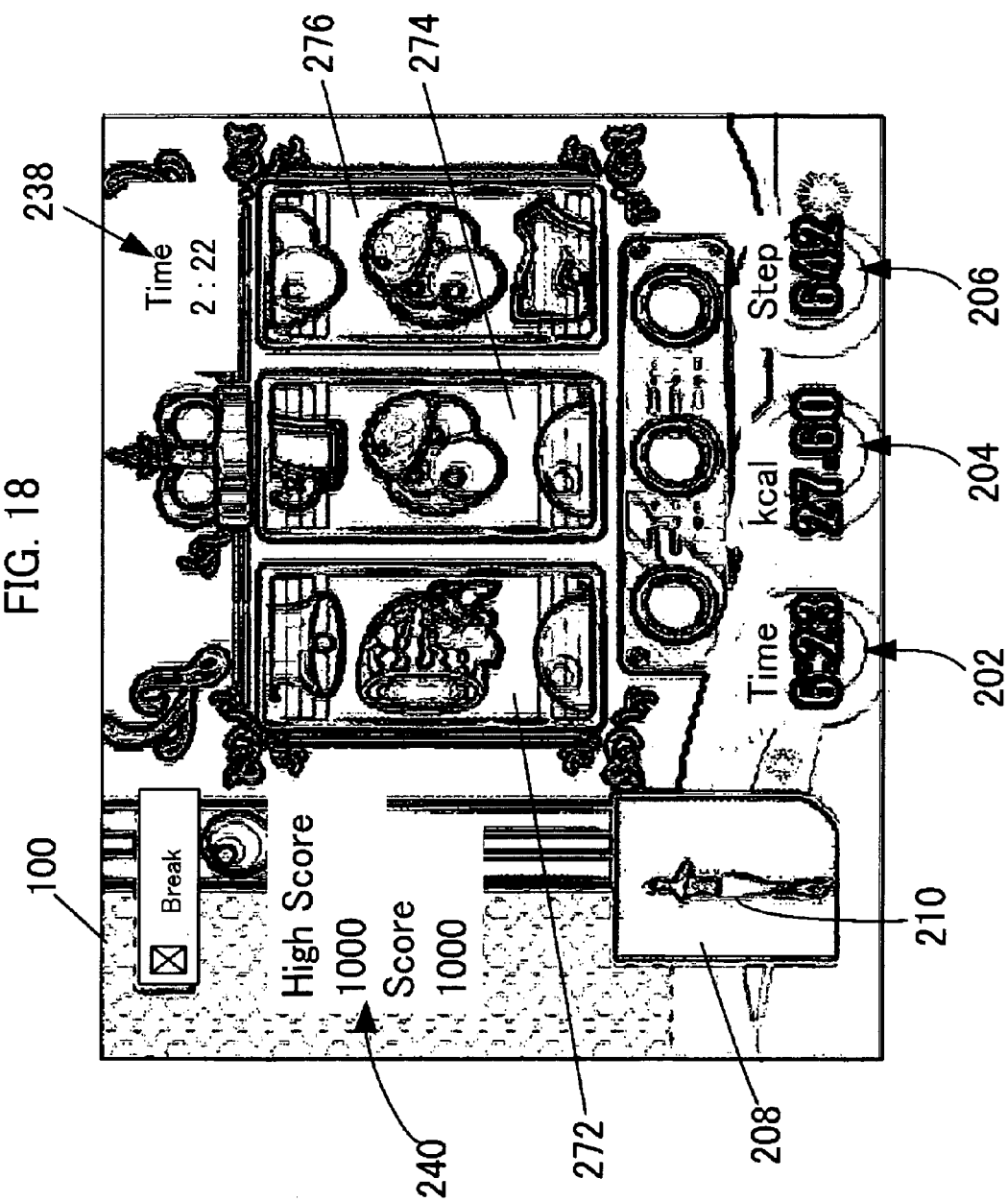
FIG. 18 is a view for showing still further example of an exercise assistance screen displayed on the television monitor 100 of FIG. 1.

FIG. 18 is a view for showing still further example of an exercise assistance screen displayed on the television monitor 100 of FIG. 1. As shown in FIG. 18, this exercise assistance screen includes the remaining time display section 238, the score display section 240, drum objects 272, 274 and 276, the window 208, the time display section 202, the calorie consumption display object 204, and the step number display section 206.

When this screen is started and the first step of the player is detected, the multimedia processor 91 displays the representation where the lever is pressed down and the drum objects 272, 274 and 276 starts to rotate. Further, if the second, the third and the fourth steps of the player are detected, the drum objects 272, 274 and 276 stop rotating respectively. When the same symbols are lined up in the slot machine, the representation, where coins are discharged and the point is added, is displayed. When the value of the remaining time display section 238 becomes zero, this screen is finished.

In this way, this exercise assistance screen simulates a slot machine, when the player performs the stepping motion, the slot machine operates, and the point is obtained if the same symbols are lined up.

Figure 19:
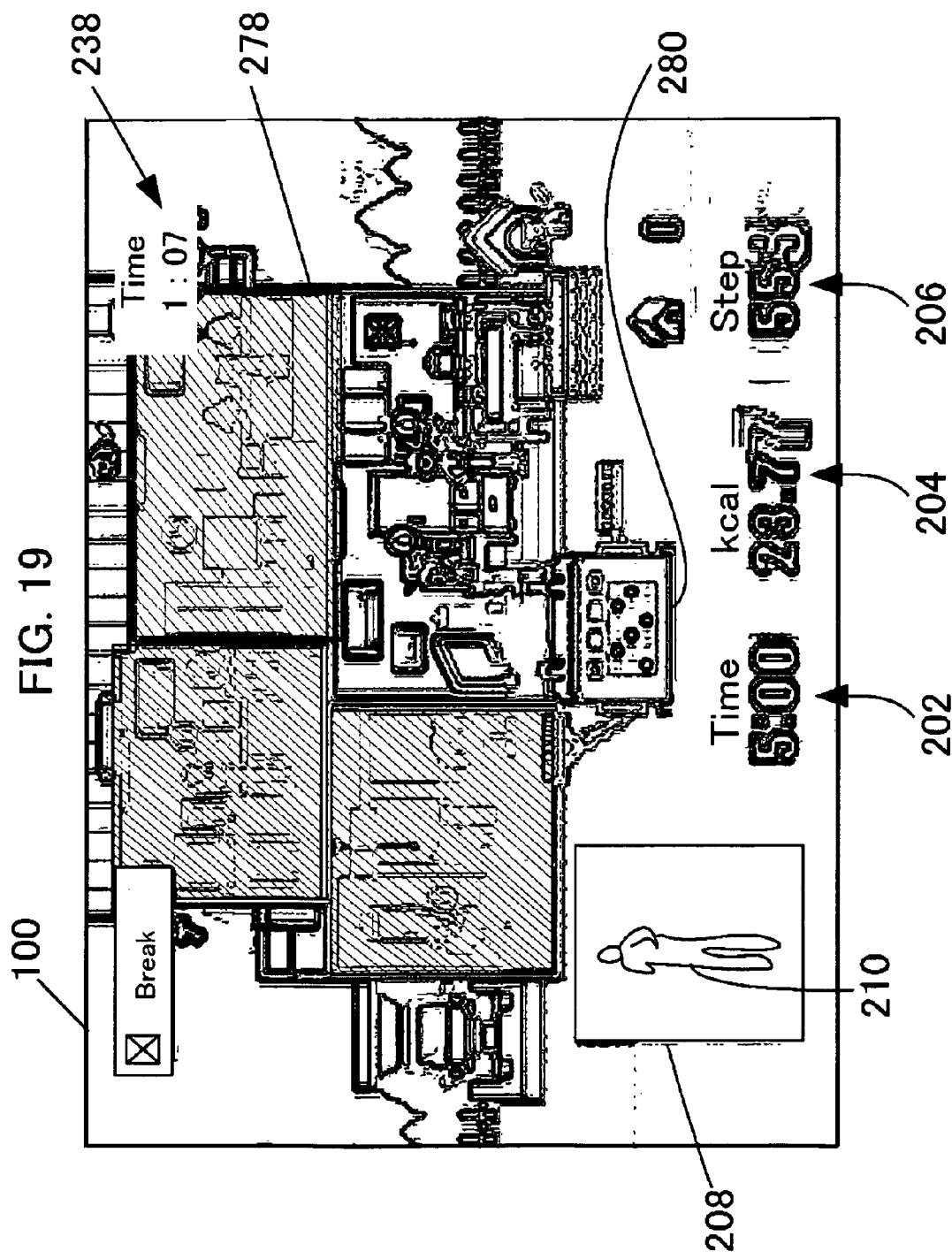
FIG. 19 is a view for showing still further example of an exercise assistance screen displayed on the television monitor 100 of FIG. 1.

FIG. 19 is a view for showing still further example of an exercise assistance screen displayed on the television monitor 100 of FIG. 1. As shown in FIG. 19, this exercise assistance screen includes a dynamo object 280, a hose object 278, the remaining time display section 238, the window 208, the time display section 202, the calorie consumption display object 204, and the step number display section 206.

When this screen is started and the stepping motion of the player is detected, the multimedia processor 91 displays the representation where the dynamo object 280 having the shape similar to the stepper 1 operates. Further, when a predetermined number of times of steps or more is detected, the home electric appliances inside the house object 278 operate to illuminate the room. If all the rooms are illuminated, the house object 278 is cleared, and then electric power is generated in a new house object 278. When the value of the remaining time display section 238 becomes zero, this screen is finished.

In this way, this exercise assistance screen simulates a dynamo, when the player performs the stepping motion, the dynamo operates to supply electric power with the house, the house is illuminated, and therefore it is possible to see and enjoy the livelihood of the inhabitant.

Figure 20:
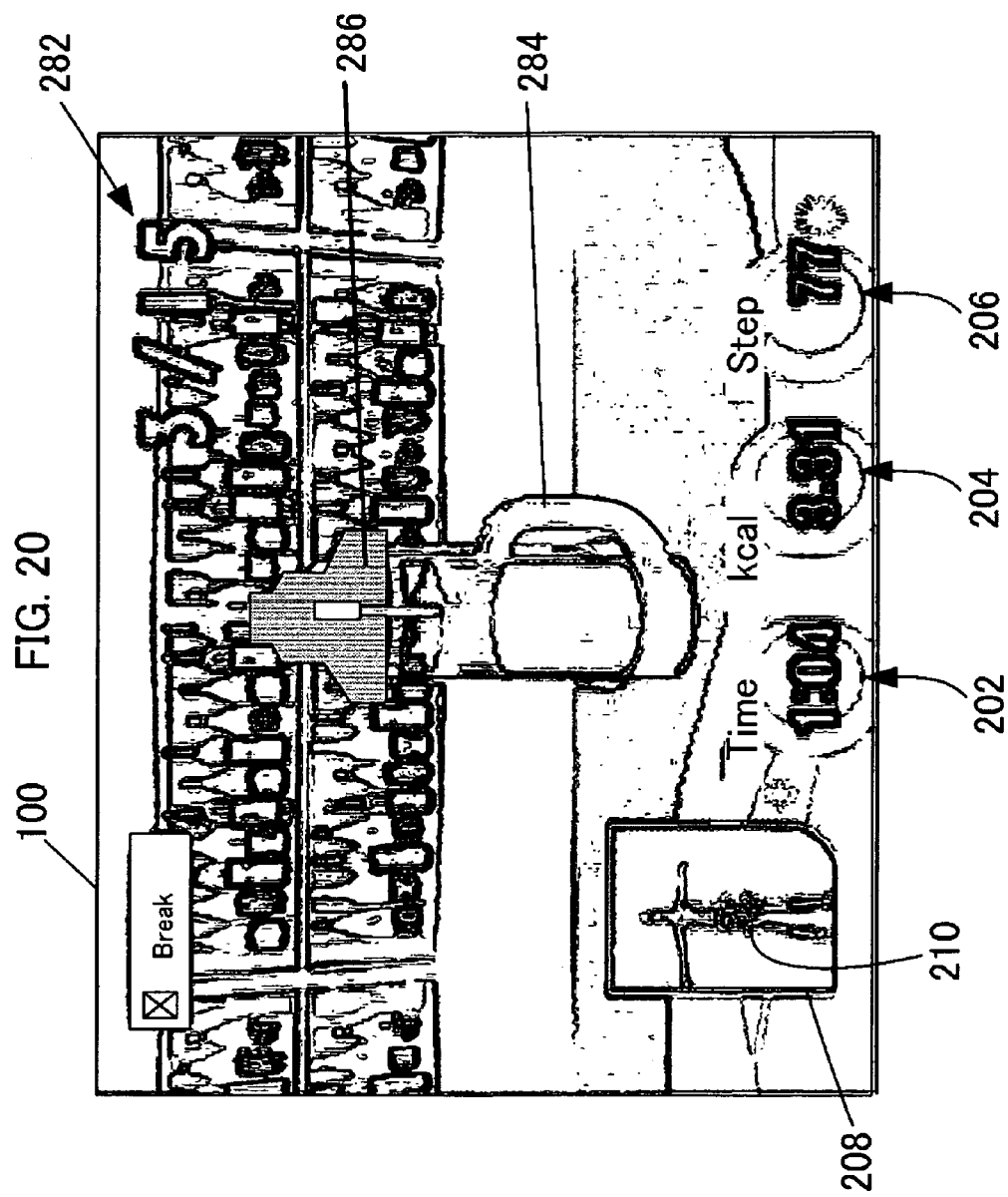
FIG. 20 is a view for showing still further example of an exercise assistance screen displayed on the television monitor 100 of FIG. 1.

FIG. 20 is a view for showing still further example of an exercise assistance screen displayed on the television monitor 100 of FIG. 1. As shown in FIG. 20, this exercise assistance screen includes a beer server object 286, a beer jug object 284, a quota display section 282, the window 208, the time display section 202, the calorie consumption display object 204, and the step number display section 206.

When this screen is started and the stepping motion of the player is detected, the multimedia processor 91 displays the representation where the beer server object 286 pours a certain amount of beer into the beer jug object 284. If the jug object 284 is filled with the beer, the character proposes a toast, the value of the quota display section 282 is changed, and then the next jug object 284 is displayed. If the beer is poured by the amount corresponding to the quota, this screen is finished.

In this way, this exercise assistance screen simulates a beer server, when the player performs the stepping motion, the beer is poured.

Figure 21:
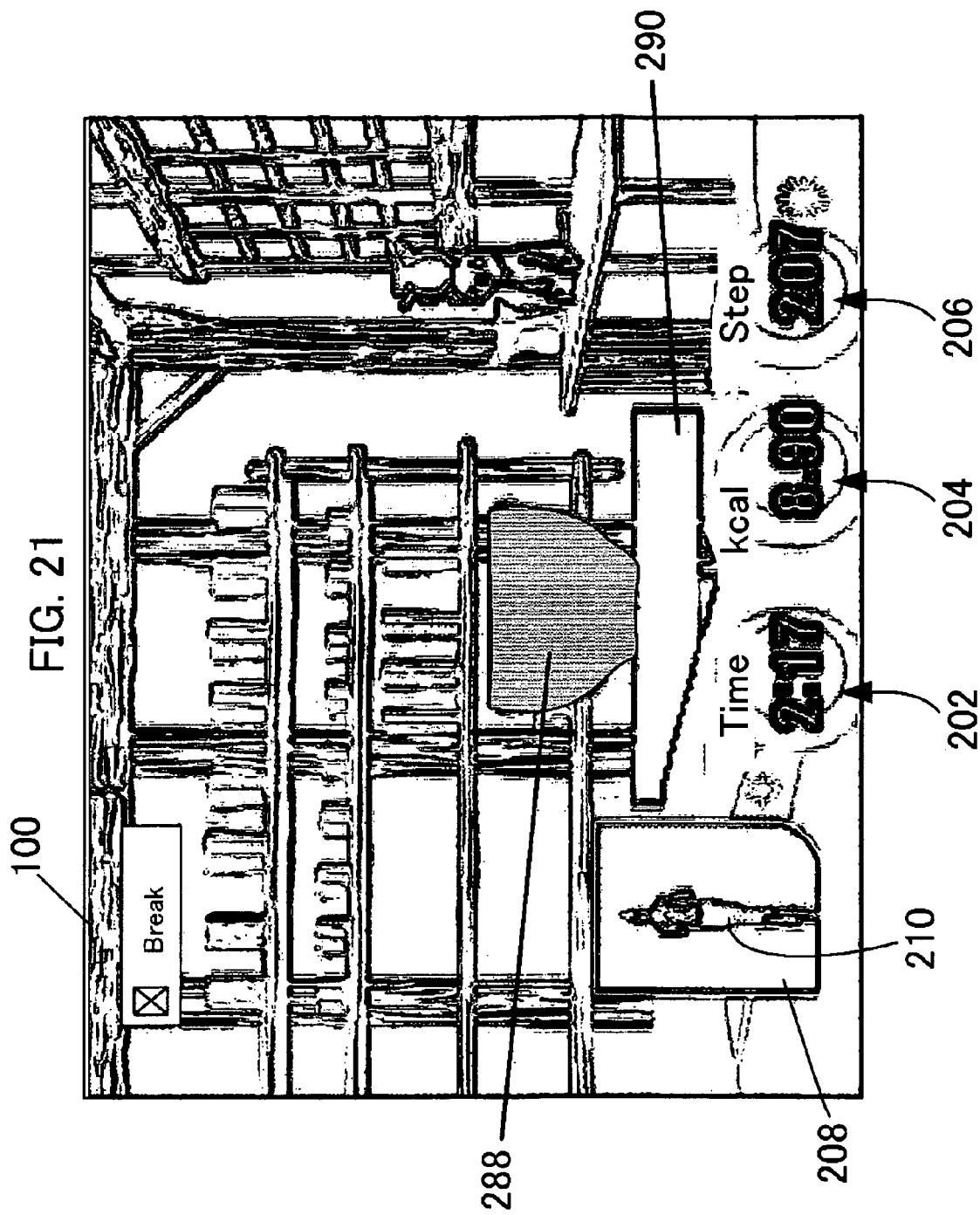
FIG. 21 is a view for showing still further example of an exercise assistance screen displayed on the television monitor 100 of FIG. 1.

FIG. 21 is a view for showing still further example of an exercise assistance screen displayed on the television monitor 100 of FIG. 1. As shown in FIG. 21, this exercise assistance screen includes a clay object 288, a potter's wheel object 290, the window 208, the time display section 202, the calorie consumption display object 204, and the step number display section 206.

When this screen is started and the stepping motion of the player is detected, the multimedia processor 91 displays the representation where the potter's wheel object 290 turns. Further, if a predetermined number of the steps of the player is detected, the representation, where the clay object is formed into the shape of a crock from the bottom side as if ceramics art were actually carried out, is displayed. In this way, if the player carries out the predetermined number of times of the steps, the crock is completed and then this screen is finished.

There is a sequel to this screen. The multimedia processor 91 records that the player clears this screen, and has the player exercise in accordance with the sequel screen in the menu from the next day. The sequel screen will be described referring to FIG. 22.

As described above, this exercise assistance screen simulates a potter's wheel of ceramics art, when the player performs the stepping motion, the potter's wheel turns and the clay is formed into the shape of the crock.

Figure 22:
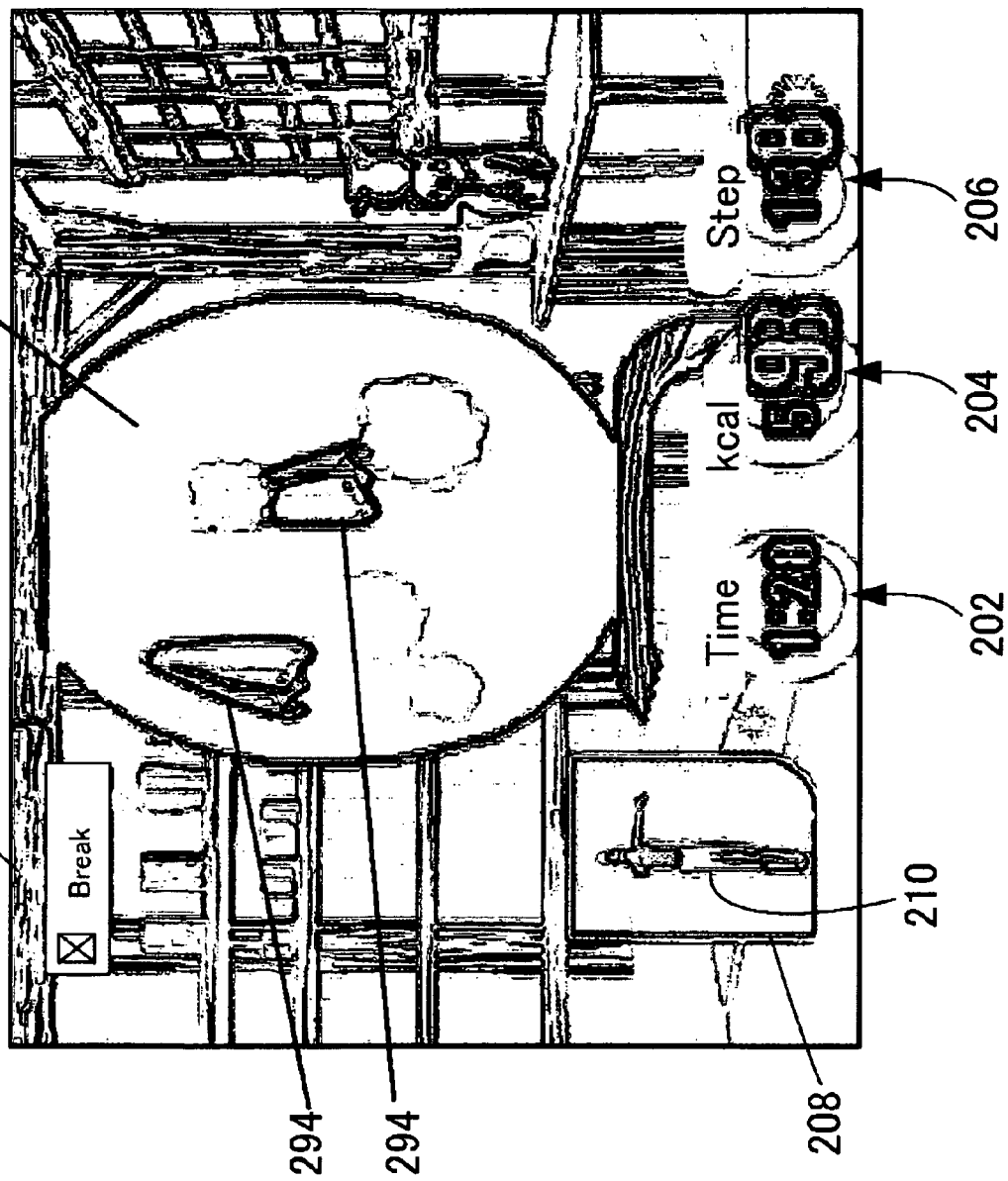
FIG. 22 is a view for showing still further example of an exercise assistance screen displayed on the television monitor 100 of FIG. 1.

FIG. 22 is a view for showing still further example of an exercise assistance screen displayed on the television monitor 100 of FIG. 1. As shown in FIG. 22, this exercise assistance screen includes a pottery object 292, a dish towel objects 294, the window 208, the time display section 202, the calorie consumption display object 204, and the step number display section 206.

When this screen is started and the stepping motion of the player is detected, the multimedia processor 91 displays the representation where the dish towel objects 294 move to remove soot from the pottery object 292. Further, if a predetermined number of steps of the player or more is detected, the representation, where the soot is completely removed and the pottery object 292 is completed, is displayed. The pottery to be completed is determined in a random manner, the evaluation is shown by arranging three words which consist of an adverb, an adjective and a noun such as "very", "good" and "crock" as selected in a random manner, and then this screen is finished.

Since it is not known what pottery is completed until the end of this screen, the purpose, which is to look at the completed pottery, is given to the player from the start of the screen of FIG. 21 until the end of the screen of FIG. 22, and therefore it is possible to assist the player to exercise continually.

As described above, this exercise assistance screen is the sequel to the exercise assistance screen of FIG. 21, and the soot of the baked pottery is removed to complete the pottery on the screen.

Figure 23:
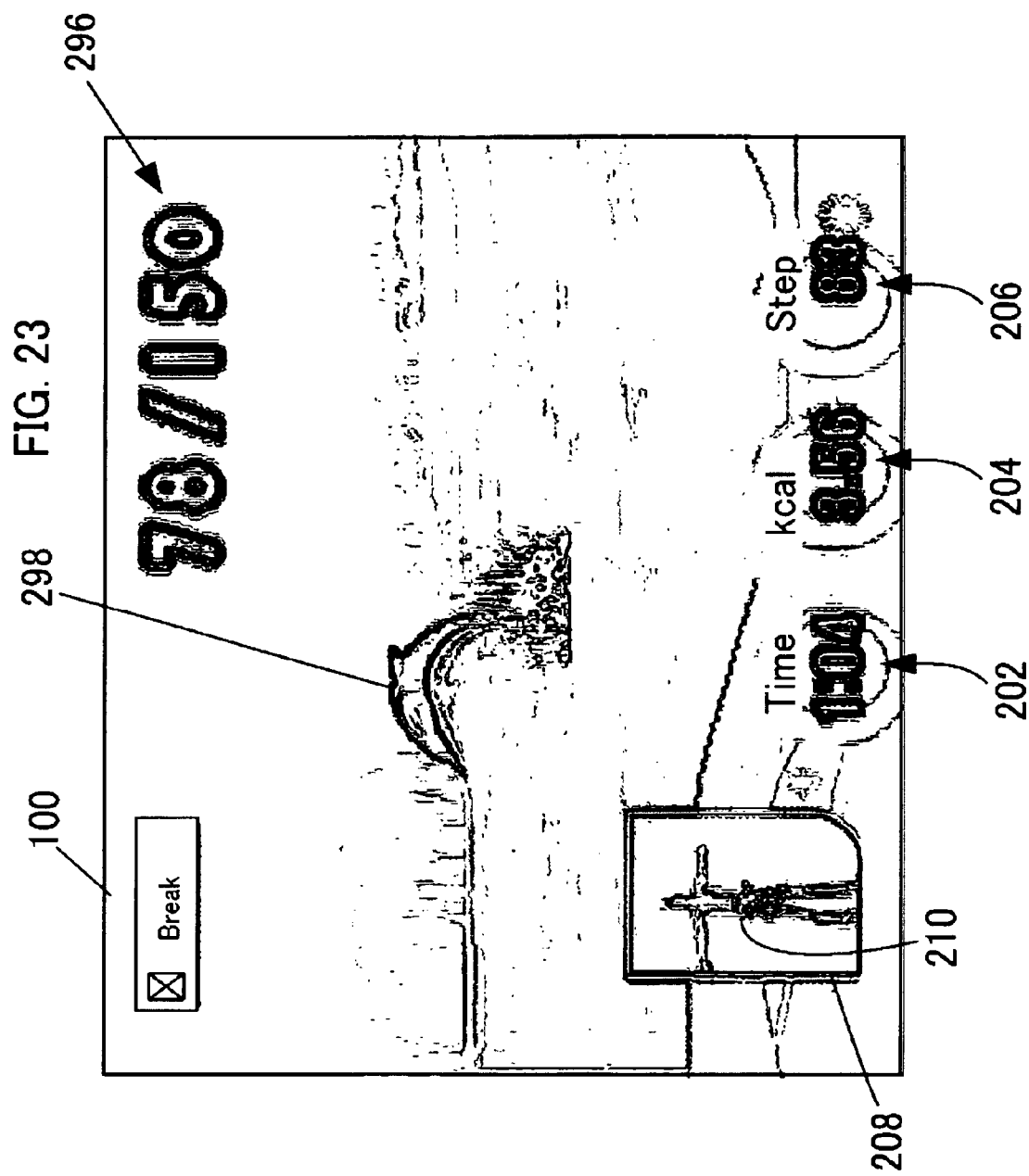
FIG. 23 is a view for showing still further example of an exercise assistance screen displayed on the television monitor 100 of FIG. 1.

FIG. 23 is a view for showing still further example of an exercise assistance screen displayed on the television monitor 100 of FIG. 1. As shown in FIG. 23, this exercise assistance screen includes a creature object 298, a quota display section 296, the window 208, the time display section 202, the calorie consumption display object 204, and the step number display section 206.

When this screen is started and the stepping motion of the player is detected, the multimedia processor 91 displays the representation where the creature object 298 jumps up from a sea surface, and changes the value of the quota display section 296 (while the numeric characters "78/150" are displayed in the figure, it represents that 78 times among 150 times of the steps as the quota is done). Then, when a predetermined number of times of the steps is detected, the representation, where a whale appears in the background in addition to the creature object 298, is displayed. If it is detected that the player carries out a predetermined number of times of the steps as the quota, the multimedia processor 91 ends this screen. In this way, in this exercise assistance screen, each time the player performs the stepping motion, a creature such as a dolphin and a fish appear from the sea.

Figure 24:
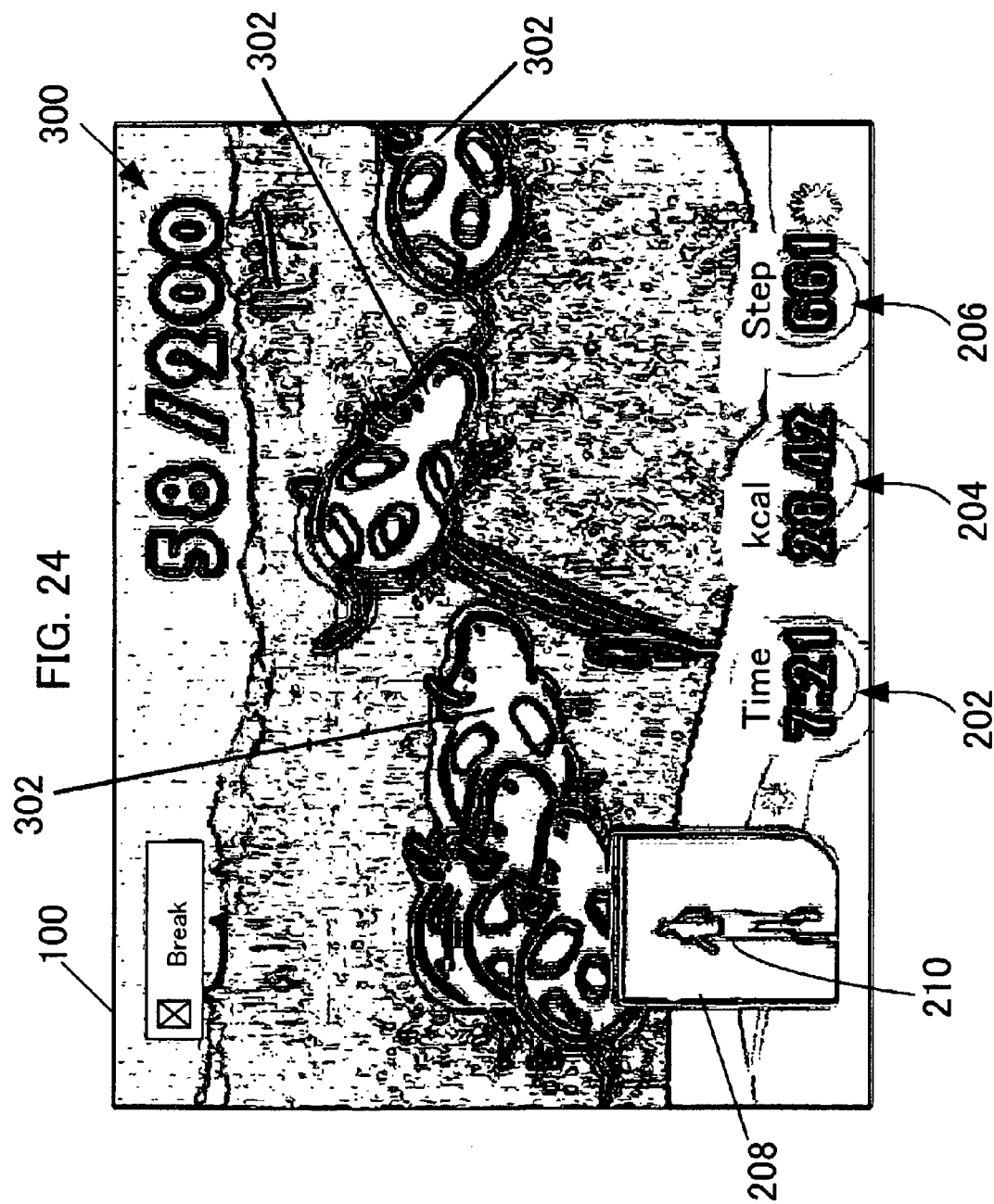
FIG. 24 is a view for showing still further example of an exercise assistance screen displayed on the television monitor 100 of FIG. 1.

FIG. 24 is a view for showing still further example of an exercise assistance screen displayed on the television monitor 100 of FIG. 1. As shown in FIG. 24, this exercise assistance screen includes creature objects 302, a quota display section 300, the window 208, the time display section 202, the calorie consumption display object 204, and the step number display section 206.

When this screen is started and the stepping motion of the player is detected, the multimedia processor 91 displays the representation where one creature object 302 in the left area of the screen jumps a barrier, and changes the value of the quota display section 300 (while the numeric characters "58/300" are displayed in the figure, it represents that 58 times among 300 times of the steps as the quota is done). If it is detected that the player carries out a predetermined number of times of the steps as the quota, the multimedia processor 91 ends this screen. In this way, this exercise assistance screen simulates a stock farm, each time the player performs the stepping motion, a domestic animal such as a sheep jumps a barrier.

Figure 25:
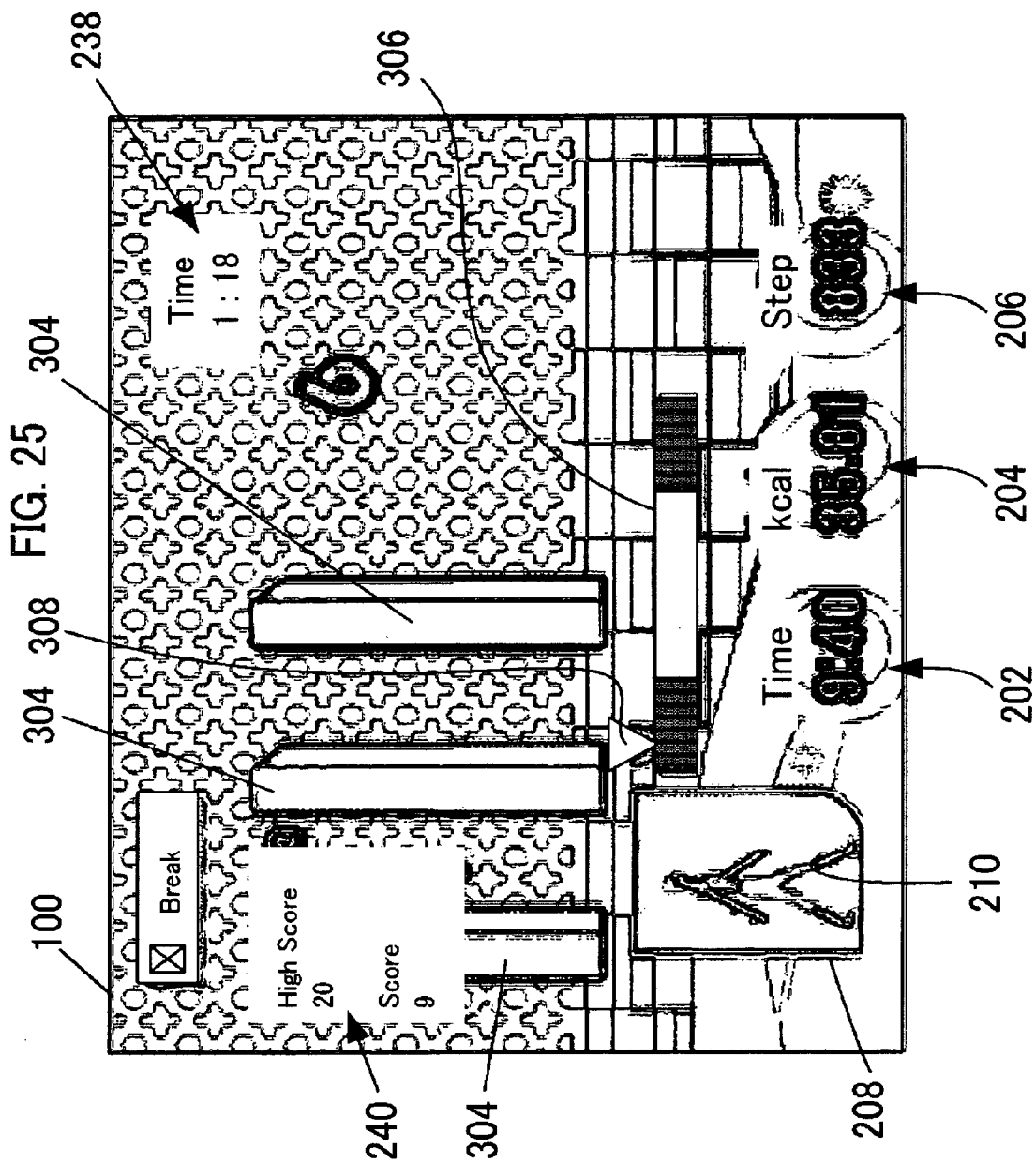
FIG. 25 is a view for showing still further example of an exercise assistance screen displayed on the television monitor 100 of FIG. 1.

FIG. 25 is a view for showing still further example of an exercise assistance screen displayed on the television monitor 100 of FIG. 1. As shown in FIG. 24, this exercise assistance screen includes a domino objects 304, a timing display section 306, a cursor 308, the remaining time display section 238, the score display section 240, the window 208, the time display section 202, the calorie consumption display object 204, and the step number display section 206.

When this screen is started and the stepping motion of the player is detected, the multimedia processor 91 generates and displays one domino object 304. The cursor moves horizontally on the timing display section 306, when the cursor 308 is positioned on a white area in the vicinity of the center of the timing display section 306, the domino does not topple, and the next domino is arranged. When the cursor 308 is positioned on one of black areas in both ends of the timing display section 306, the domino 304 topples, and the past arranged domino objects also topple. The number of the arranged dominos is a score, and the score is recorded and is displayed on the record display section 240. If the value of the remaining display section 238 becomes zero, this screen is finished.

In this way, this exercise assistance screen simulates a domino, each time the player performs the stepping motion in timely manner, the domino is arranged, if the player misses the appropriate timing, the past arranged dominos all topple.

Figure 26:
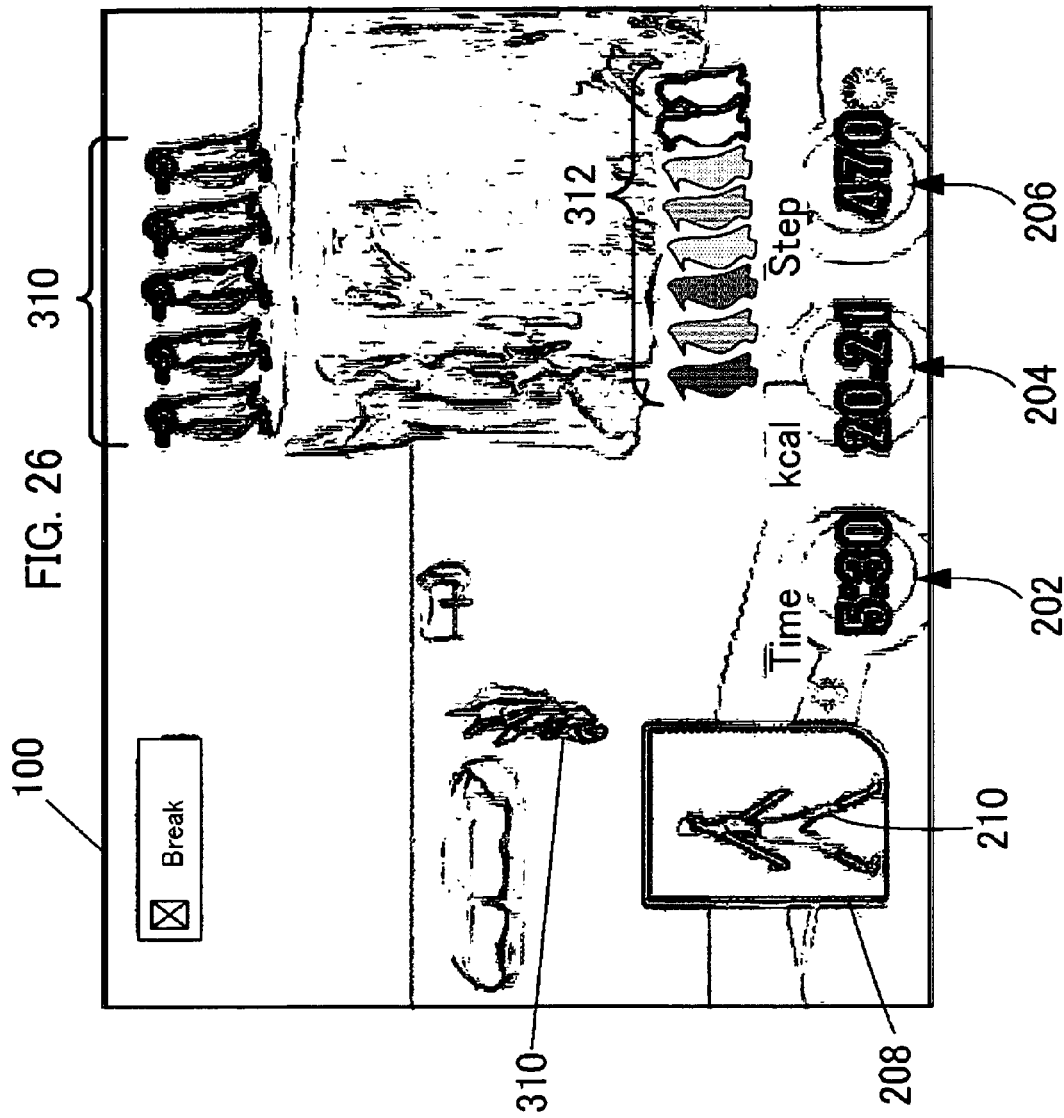
FIG. 26 is a view for showing still further example of an exercise assistance screen displayed on the television monitor 100 of FIG. 1.

FIG. 26 is a view for showing still further example of an exercise assistance screen displayed on the television monitor 100 of FIG. 1. As shown in FIG. 26, this exercise assistance screen includes penguin objects 310, a score display section 240, the window 208, the time display section 202, the calorie consumption display object 204, and the step number display section 206.

When this screen is started and the stepping motion of the player is detected, the multimedia processor 91 displays the representation where one object 310 of the penguin objects 310 dives into a sea. If all the penguins on a cliff dive, the color of the quota display section 312 is changed and new penguin objects with the different color line up on the cliff, each time the stepping motion of the player is detected, the penguin object dives into the sea one by one. The representation, where a sea lion object and so on dives into the sea, is displayed in a random manner. If it is detected that the player carries out a predetermined number of times of the steps as the quota, the multimedia processor 91 ends this screen.

In this way, this exercise assistance screen simulates diving of penguins, each time the player performs the stepping motion, the penguin dives into the sea.

Figure 27:
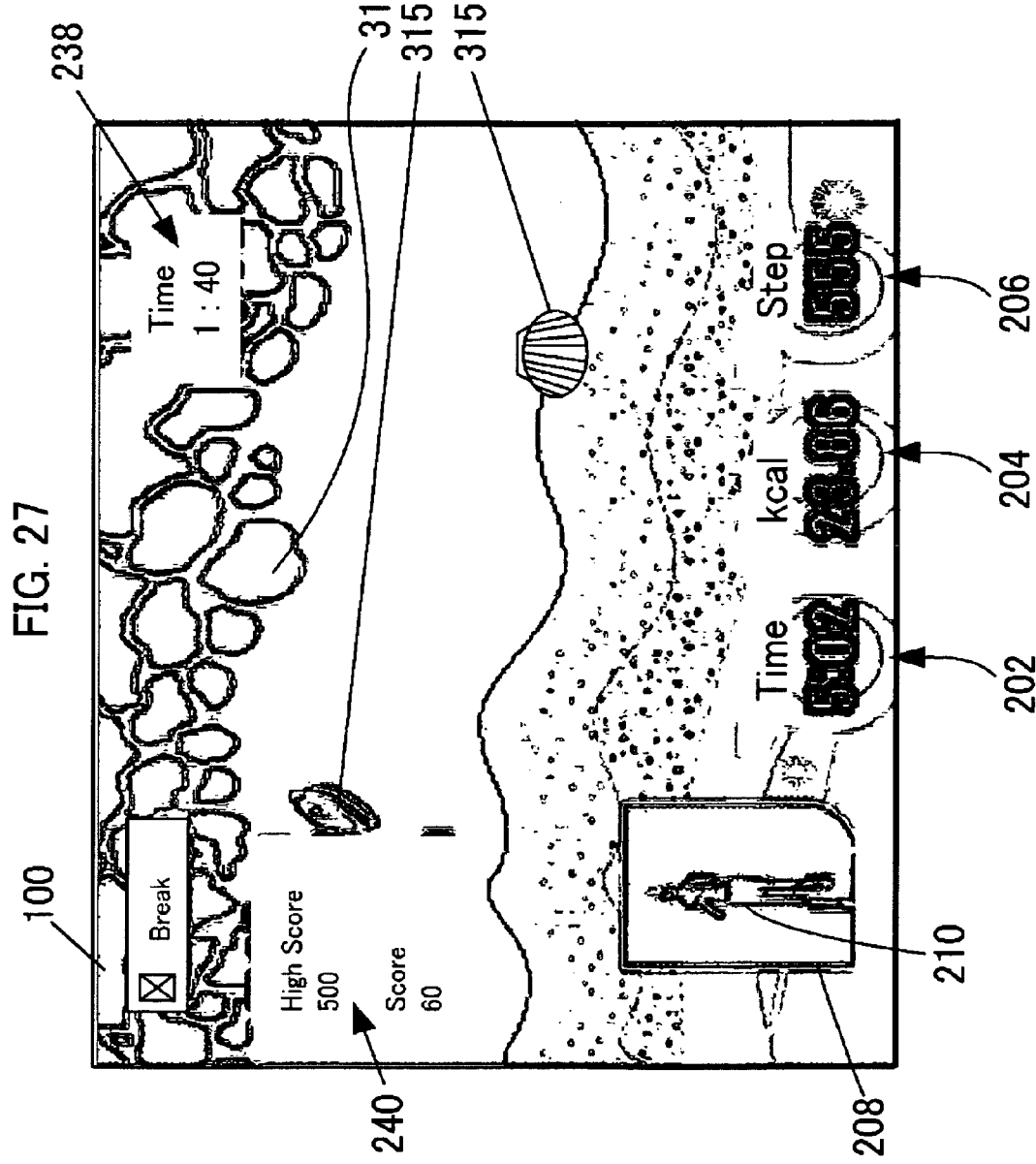
FIG. 27 is a view for showing still further example of an exercise assistance screen displayed on the television monitor 100 of FIG. 1.

FIG. 27 is a view for showing still further example of an exercise assistance screen displayed on the television monitor 100 of FIG. 1. As shown in FIG. 27, this exercise assistance screen includes a wavelet object 314, wreckage objects 315, the remaining time display section 238, the score display section 240, the window 208, the time display section 202, the calorie consumption display object 204, and the step number display section 206.

When this screen is started and the stepping motion of the player is detected, the multimedia processor 91 displays the representation, where the wavelet object 314 laps onto a beach. Further, if a predetermined number of steps of the player or more is detected, the wavelet object 314 covers the sand beach followed by returning to the sea and then the wreckage objects 315 appear on the sand beach. A point is assigned to each wreckage object 315. As the result, the point is added and the result thereof is displayed on the score display section 240. That is, as the player performs more the steps in a limited time, he/she can get a higher score. If the value of the remaining display section 238 becomes zero, this screen is finished.

In this way, this exercise assistance screen simulates a wavelet of a beach, each the player performs the stepping motion, the wavelet laps and shells and so on appear.

Figure 28:
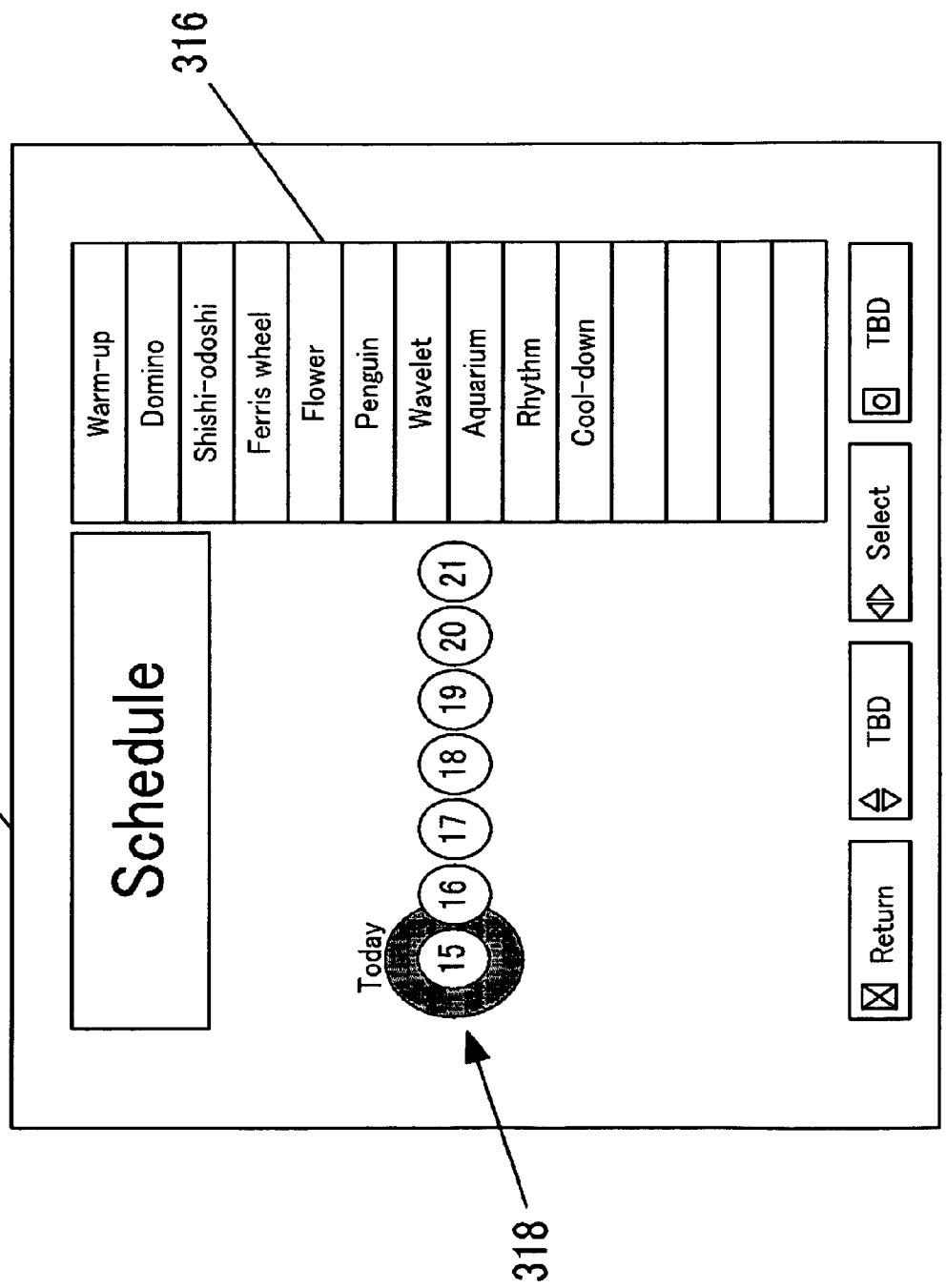
FIG. 28 is a view for showing still further example of a screen displayed on the television monitor 100 of FIG. 1.

FIG. 28 is a view for showing still further example of a screen displayed on the television monitor 100 of FIG. 1. The screen of FIG. 28 represents a menu which shows items to be carried out by the player in a day. This screen includes a date display section 318 and a menu display section 316.

In the present embodiment, the menu in a day is predetermined, the item as described referring to FIG. 7 (exercise such as warm-up and cool-down) is certainly inserted into the beginning and the end, and some items of the items as described referring to FIGS. 8 to 27 are included in the menu. When the player moves the cursor to the day desiring the reference of the menu in the date display section 318, the menu of the day is displayed on the menu display section 316.

FIG. 29 is a view for showing still further example of a screen displayed on the television monitor 100 of FIG. 1. The screen of FIG. 29 displays histories of the calorie consumption and the exercise time of the player, and is used for reviewing the past achievement or creating an exercise plan in the future by the player. As shown in FIG. 29, this screen includes a calorie consumption display bar 320 which indicates the calorie consumption in a day, an exercise time display bar 322 which indicates the exercise time in a day, and a current day result display section 324 which indicates the calorie consumption and the exercise time of the day.

Next, the process performed by the multimedia processor 91 will be explained with reference to a flow chart.

Figure 30:
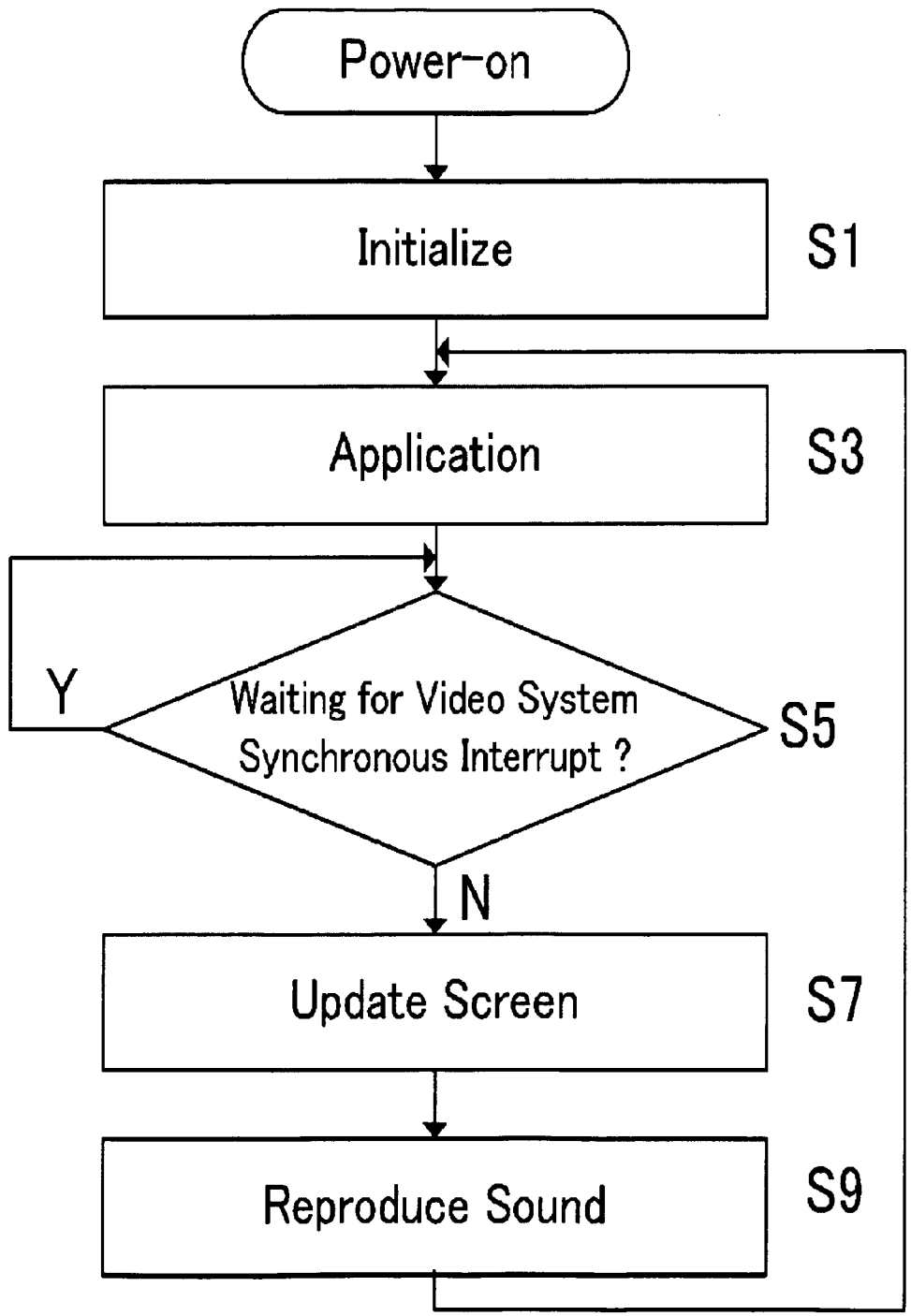
FIG. 30 is a flowchart showing the overall process flow which is executed by a multimedia processor 91.

FIG. 30 is a flowchart showing the overall process flow which is executed by the multimedia processor 91. Referring to FIG. 30, when the power switch 45 is turned on, the multimedia processor 91 performs the initialization process of the system in step S1. This process initializes (turns off) all flags and clears (sets to zero) all counters, which are used in the process shown in FIG. 31 as described below. Various registers are also initialized (a Vs register as described below is set to zero).

In step S3, the multimedia processor 91 performs processing in accordance with an application program stored in the memory 93. In step S5, the multimedia processor 91 waits until an interrupt based on a video system synchronous signal is generated. In other words, if the interrupt based on the video system synchronous signal is not generated, the processing of the multimedia processor 91 repeats the same step S5. If the interrupt based on the video system synchronous signal is generated, the processing thereof proceeds to step S7. For example, the interrupt based on the video system synchronous signal is generated at $1/60$ second intervals. In step S7 and step S9, the multimedia processor 91 performs the process of updating the screen displayed on the television monitor 100 and the process of reproducing sound in synchronism with the interrupt. Then, the process of the multimedia processor 21 returns to step S3.

An application program which controls the processing of step 3 includes a plurality of programs. One program of these programs is a program which determines whether or not the pedal 520R or 520L is pressed down with the foot. This process will be explained with reference to a flow chart. Incidentally, in the present embodiment, when the pedal 520R is pressed down, i.e., when the rotation member 530 rotates in the counter clockwise direction of the FIG. 6, the above counter of the multimedia processor 91 is counted up. On the other hand, when the pedal 520L is pressed down, i.e., when the rotation member 530 rotates in the clockwise direction of the FIG. 6, the above counter of the multimedia processor 91 is counted down.

Figure 31:
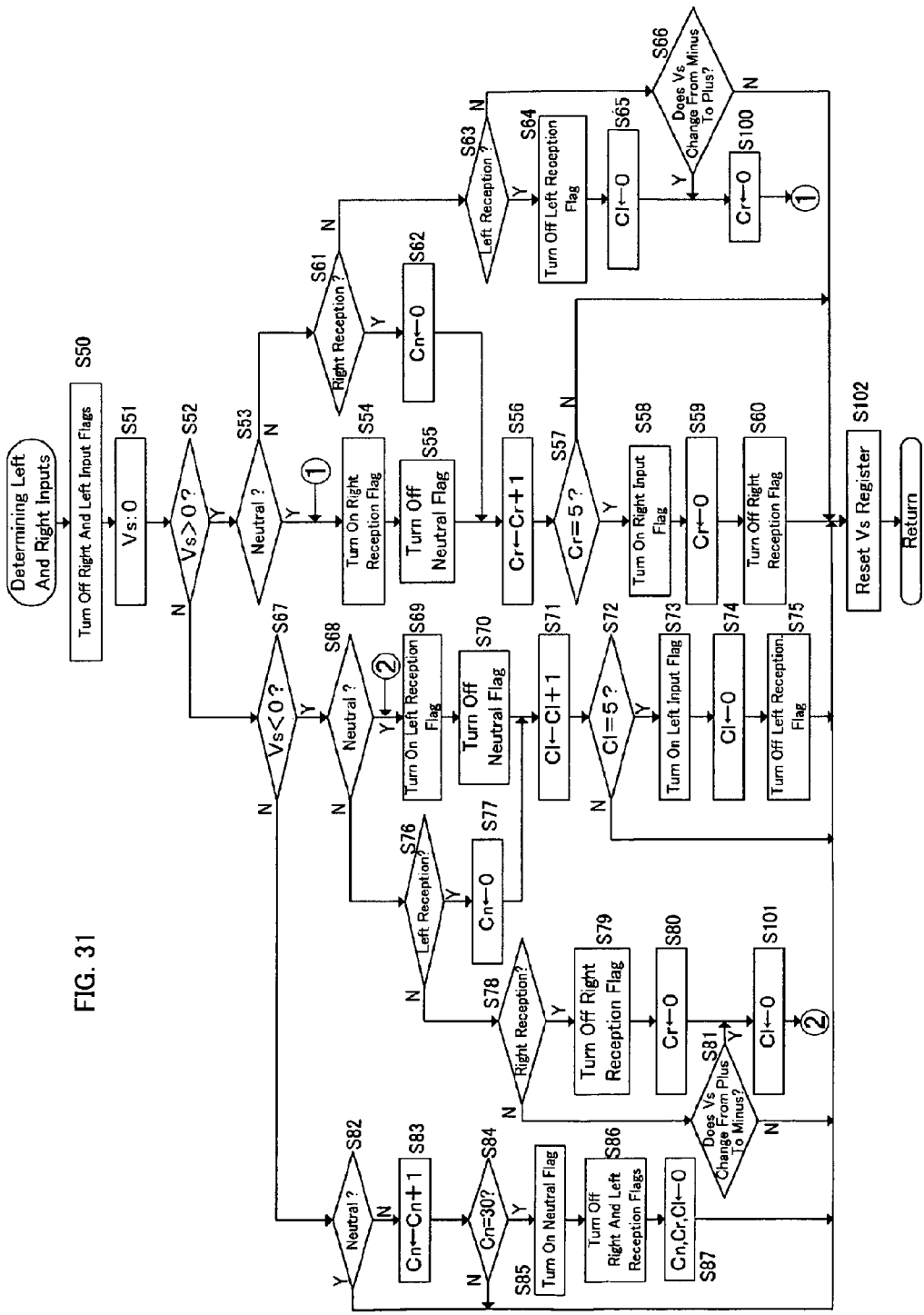
FIG. 31 is a flowchart showing the process of determining the left and right inputs which is one of the processes of an application program of step S3 of FIG. 30.

FIG. 31 is a flowchart showing the process of determining the left and right inputs which is one of the processes of the application program of step S3 of FIG. 30. Referring to FIG. 31, in step S50, the multimedia processor 91 turns off a left input flag which indicates that there is an input by the pedal 520L for a left foot, and a right input flag which indicates that there is an input by the pedal 520R for a right foot (they are not pressed down). In this case, the "input" means not just pressing down on the pedal 520L or 520R with the foot but determining by the multimedia processor 91 that the pedal 520L or 520R is pressed down with the foot. That is, it means that the software recognizes that the pedal 520L or 520R is pressed down with foot.

In step S51, the multimedia processor 91 reads a value Vs from the Vs register (not shown in the figure) and then compares it with zero. As described above, the absolute value of the value Vs (referred to as the "stepping velocity Vs" in the following description) held by the Vs register represents the stepping speed, and the sign thereof represents which of the pedals 520R and 520L is pressed down with the foot. In step S52, the process of the multimedia processor 91 proceeds to step S53 if the stepping velocity has the positive sign, otherwise proceeds to step S67.

In step S53, the multimedia processor 91 checks a neutral flag, the process proceeds to step S54 if it is turned on (the neutral state), conversely the process proceeds to step S61 if it is turned off. In this case, the neutral flag is a flag which indicates whether or not the pedals 520L and 520R remain at rest (the neutral state).

In step S54, the multimedia processor 91 turns on a right reception flag. It indicates that a determination process, which determines either the presence or absence of the input by the right pedal 520R, is running. In step S55, the multimedia processor 91 turns off the neutral flag. In step S56, the multimedia processor 91 increases a value of a counter Cr by one. The counter Cr counts the frequency of occurrence of the state which indicates Vs>0.

In step S57, the multimedia processor 91 determines whether or not the value of the counter Cr is equal to five, the process proceeds to step S58 if "YES", conversely proceeds to step S102 if "NO". In step S58, the multimedia processor 91 turns on the right input flag (there is an input by the pedal 520R).

In this way, if the state of Vs>0 is kept during the five video frames, the multimedia processor 91 determines that there is the input by the pedal 520R. In this case, the condition does not necessarily require that the state of Vs>0 is kept during the five consecutive video frames, and may include the state of Vs=0 therebetween. However, as described later, If the state of Vs=0 is kept during thirty consecutive video frames, the counter Cr is cleared (step S87). The processing shown in this flow chart is executed in synchronization with the interrupt based on the video system synchronous signal. Accordingly, in the case where the process of the step S56 is executed, each time the displaying screen, i.e., the video frame is updated, the value of the counter Cr is increased.

In step S59, the multimedia processor 91 clears the counter Cr. In step S60, the multimedia processor 91 turns off the right reception flag, and then proceeds to step S102. Accordingly, while the right input flag may be turned on before the right pedal 520R reaches the lowest point, in this case, it is possible to prevent that the process for determining the presence or absence of the input by the right pedal 520R is newly executed.

In step S61 after determining "NO" in step S53, the multimedia processor 91 checks the right reception flag, the process proceeds to step S62 if it is turned on, conversely proceeds to step S63 if it is turned off. In step S62, the multimedia processor 91 clears a counter Cn, and then proceeds to step S56. The counter Cn counts the frequency of consecutive occurrence of the state which indicates Vs=0. The reason for proceeding to step S56 is for being running the process for determining the presence or absence of the input by the right pedal 520R (while the value of the counter Cr exceeds zero, its value does not reach five.).

In step S63 after determining "NO" in step S61, the multimedia processor 91 checks a left reception flag, where indicates that a determination process is running, the process proceeds to step S64 if it is turned on, conversely proceeds to step S66 if it is turned off. The determination process determines either the presence or absence of the input by the left pedal 520L. In step S64, the multimedia processor 91 turns off the left reception flag. In step S65, the multimedia processor 91 clears a counter Cl, and then the process proceeds to step S100. The counter Cl counts the frequency of occurrence of the state which indicates Vs<0. In step S100, the multimedia processor 91 clears the counter Cr, and then proceeds to step S54.

When a current state indicates that Vs>0, the right reception flag is turned off, and the left reception flag is turned on, a previous state indicates that Vs<0 and the process for determining the presence or absence of the input by the pedal 520L is running. In other words, this means that one state changes to the other state. The one state is a state that the process for determining the presence or absence of the input by the pedal 520L is running while the pedal 520L is being pressed down with the foot. The other state is a state that the pedal 520R is being pressed down with the foot. Accordingly, the process proceeds to step S54 so as to determine the presence or absence of the input by the pedal 520R.

In step S66 after determining "NO" in step S63, the multimedia processor 91 determines whether or not the sign of the previous stepping velocity Vs is negative and the sign of the current stepping velocity Vs is positive, the process proceeds to steps S100 and S54 if the determination is "YES", conversely proceeds to step S102 if the determination is "NO".

In the case where a previous state indicates Vs<0, when a current state indicates that Vs>0, the right reception flag is turned off, and the left reception flag is turned off, the process for determining the presence or absence of the input by the pedal 520L is already completed previously. In other words, this means that one state changes to the other state. The one state is a state that the process for determining the presence or absence of the input by the pedal 520L is already completed while the pedal 520L is being pressed down with the foot. The other state is a state that the pedal 520R is being pressed down with the foot. Accordingly, the process proceeds to step S54 so as to determine the presence or absence of the input by the pedal 520R.

By the way, on the other hand, in step S67 after determining "NO" in step S52, the process of the multimedia processor 91 proceeds to step S68 if the stepping velocity Vs is negative, otherwise proceeds to step S82. In step S66, the multimedia processor 91 checks the neutral flag, the process proceeds to step S69 if it is turned on (a neutral state), conversely proceeds to step S76 if it is turned off.

In step S69, the multimedia processor 91 turns on a left reception flag, which indicates that a determination process is running. The determination process determines either the presence or absence of the input by the left pedal 520L. In step S70, the multimedia processor 91 turns off the neutral flag. In step S71, the multimedia processor 91 increases a counter Cl by one. The counter Cl counts the frequency of occurrence of the state which indicates Vs<0.

In step S72, the multimedia processor 91 determines whether or not the value of the counter Cl is equal to five, the process proceeds to step S73 if "YES", conversely proceeds to step S102 if "NO". In step S73, the multimedia processor 91 turns on the left input flag (there is an input by the pedal 520L).

In this way, if the state of Vs<0 is kept during the five video frames, the multimedia processor 91 determines that there is the input by the pedal 520L. In this case, the condition does not necessarily require that the state of Vs<0 is kept during the five consecutive video frames, and may include the state of Vs=0 therebetween. However, as described later, if the state of Vs=0 is kept during thirty consecutive video frames, the counter Cl is cleared (step S87). The processing shown in this flow chart is executed in synchronization with the interrupt based on the video system synchronous signal. Accordingly, in the case where the process of the step S71 is executed, each time the displaying screen, i.e., the video frame is updated, the value of the counter Cl is increased.

In step S74, the multimedia processor 91 clears the counter Cl. In step S75, the multimedia processor 91 turns off the left reception flag, and then proceeds to step S102. Accordingly, while the left input flag may be turned on before the left pedal 520L reaches the lowest point, in this case, it is possible to prevent that the process for determining the presence or absence of the input by the left pedal 520L is newly executed.

In step S76 after determining "NO" in step S68, the multimedia processor 91 checks the left reception flag, the process proceeds to step S77 if it is turned on, conversely proceeds to step S78 if it is turned off. In step S77, the multimedia processor 91 clears a counter Cn, and then proceeds to step S71. The counter Cn counts the frequency of consecutive occurrence of the state which indicates Vs=0. The reason for proceeding to step S71 is for being running the process for determining the presence or absence of the input by the left pedal 520L (while the value of the counter Cl exceeds zero, its value does not reach five.).

In step S78 after determining "NO" in step S76, the multimedia processor 91 checks the right reception flag, the process proceeds to step S79 if it is turned on, conversely proceeds to step S81 if it is turned off. In step S79, the multimedia processor 91 turns off the right reception flag. In step S80, the multimedia processor 91 clears the counter Cr, and then the process proceeds to step S101. In step S101, the multimedia processor 91 clears the counter Cl, and then proceeds to step S69.

When a current state indicates that Vs<0, the right reception flag is turned on, and the left reception flag is turned off, a previous state indicates that Vs>0 and the process for determining the presence or absence of the input by the pedal 520R is running. In other words, this means that one state changes to the other state. The one state is a state that the process for determining the presence or absence of the input by the pedal 520R is running while the pedal 520R is being pressed down with the foot. The other state is a state that the pedal 520L is being pressed down with the foot. Accordingly, the process proceeds to step S69 so as to determine the presence or absence of the input by the pedal 520L.

In step S81 after determining "NO" in step S78, the multimedia processor 91 determines whether or not the sign of the previous stepping velocity Vs is positive and the sign of the current stepping velocity Vs is negative, the process proceeds to steps S101 and S69 if the determination is "YES", conversely proceeds to step S102 if the determination is "NO".

In the case where a previous state indicates Vs>0, when a current state indicates that Vs<0, the right reception flag is turned off, and the left reception flag is turned off, the process for determining the presence or absence of the input by the pedal 520R is already completed previously. In other words, this means that one state changes to the other state. The one state is a state that the process for determining the presence or absence of the input by the pedal 520R is already completed while the pedal 520R is being pressed down with the foot. The other state is a state that the pedal 520L is being pressed down with the foot. Accordingly, the process proceeds to step S69 so as to determine the presence or absence of the input by the pedal 520L.

By the way, on the other hand, after determining "NO" in step S67, i.e., if Vs=0, in step S82, the multimedia processor 91 checks the neutral flag, the process proceeds to step S102 if it is turned on, conversely proceeds to step S83 if it is turned off. In step S83, the multimedia processor 91 increases the value of the counter Cn by one.

In step S84, the multimedia processor 91 determines whether or not the value of the counter Cn is equal to thirty, the process proceeds to step S85 if "YES", conversely proceeds to step S102 if "NO". In step S85, the multimedia processor 91 turns on the neutral flag. In this way, if the state of Vs=0 is kept during thirty consecutive video frames, the multimedia processor 91 determines that the pedals 520L and 520R remain stationary. The processing shown in this flow chart is executed in synchronization with the interrupt based on the video system synchronous signal. Accordingly, in the case where the process of the step S83 is executed, each time the displaying screen, i.e., the video frame is updated, the value of the counter Cn is increased.

In step S86, the multimedia processor 91 turns off the left reception flag and the right reception flag. In step S87, the multimedia processor 91 clears the counters Cn, Cr and Cl, and then proceeds to step S102.

Incidentally, as is obvious from the step S50, the result of the process of determining the left and right inputs during displaying a video frame (the states of the left input flag and the right input flag) is cleared (turned off) at the top of the process of determining the left and right inputs during displaying the next video frame. Accordingly, if any one of the left input flag and the right input flag is turned on to determine the presence of the input, even if the stepping motion with the same foot is not finished, the process of determining the presence or absence of the input by the foot is not executed.

In step S102, the multimedia processor 91 resets the Vs register. That is, the stepping velocity Vs as held in the Vs register is set to zero. In this way, each time the video frame is updated, the Vs register is reset. After step S102, the process returns to step S3 of FIG. 30.

Figure 32:
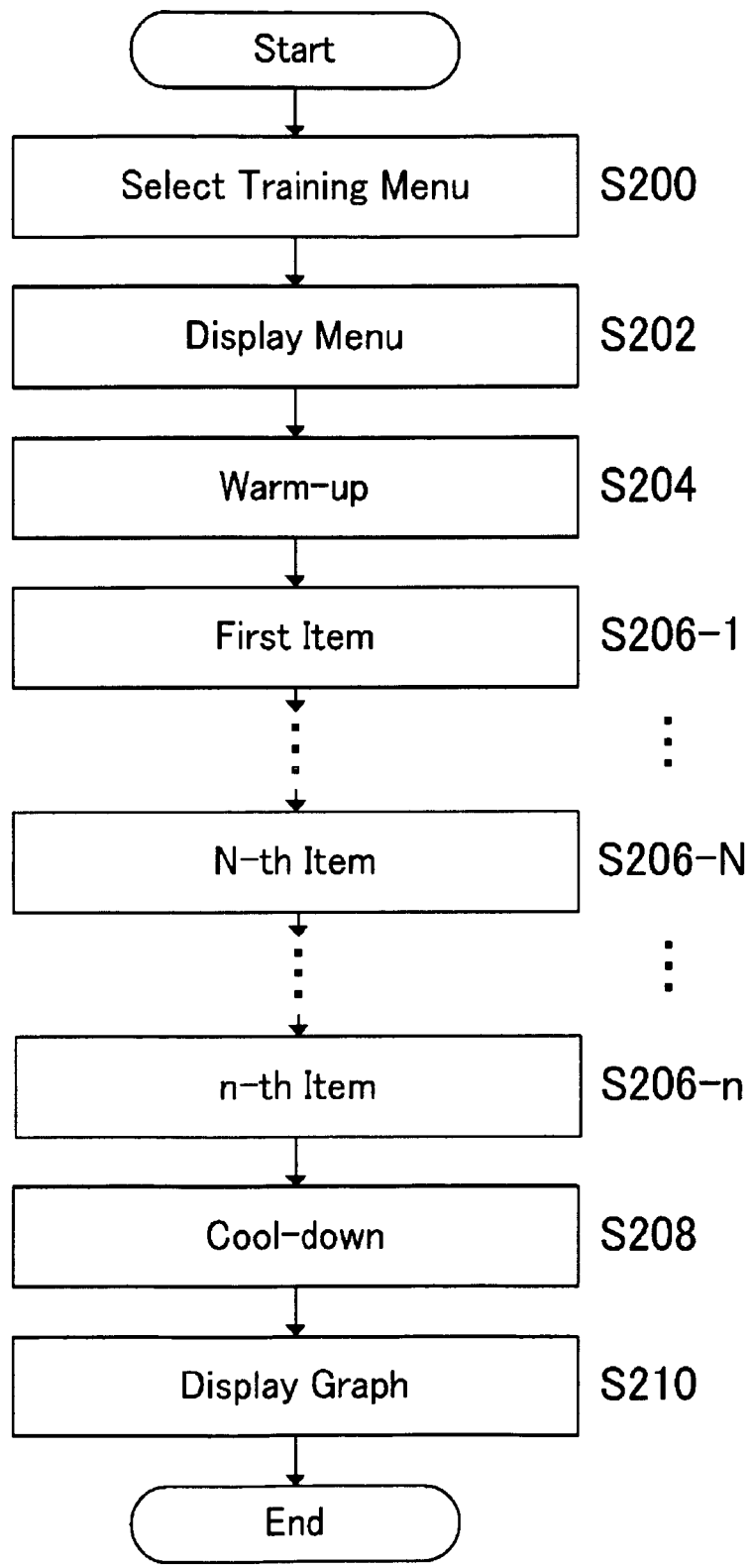
FIG. 32 is a state transition diagram for showing the exercise assistance process which is executed by the multimedia processor 91.

FIG. 32 is a state transition diagram showing the exercise assistance process which is executed by the multimedia processor 91. Referring to FIG. 32, the multimedia processor 21 selects a menu which is performed on the day from multiple kinds of menus based on the date information of RTC 29. In step S202, the multimedia processor 91 displays the menu selected in step S200 on the television monitor 100 (see FIG. 28).

Meanwhile, in the present embodiment, 19 items are provided corresponding to the FIG. 8 to FIG. 27. However, the screens of FIGS. 21 and 22 belong to the same item. Also, a warm-up and a cool-down are not included in the number of items. Any n items of the 19 items, which are located between the warm-up and the cool-down, are registered in each menu. A value of "n" is an integer which is one or more, the maximum value thereof is 19, and the value of "n" is independently set to each menu. Each of the first item to the n-th item as registered in the menu is generally referred as the N-th item.

In step S204, the multimedia processor 91 displays a screen for warming up in accordance with the menu as selected on the television monitor 100 (see FIG. 7). After the completion of processing for warming up, in step S206-N, the multimedia processor 91 displays a screen corresponding to the N-th item in accordance with the selected menu on the television monitor 100. After the completion of processing with regard to the N-th item, in step S206-(N+1), the multimedia processor 91 displays a screen corresponding to the N+1-th item in accordance with the selected menu on the television monitor 100. In this way, the multimedia processor 91 executes the items included in the selected menu sequentially from the first item to the n-th item.

After the completion of processing with regard to n-th item, in step S208, the multimedia processor 91 displays a screen for cooling down on the television monitor 100 (see FIG. 7). Then, after the processing for cooling down, in step S210, the multimedia processor 91 displays a graph (see FIG. 29) and ends the processing. However, before the end of the processing, the multimedia processor 91 stores the total exercise time on the day, the value of the total step counter Ts on the day, and the total calorie on the day in association with the date in the EEPROM 510.

Figure 33:
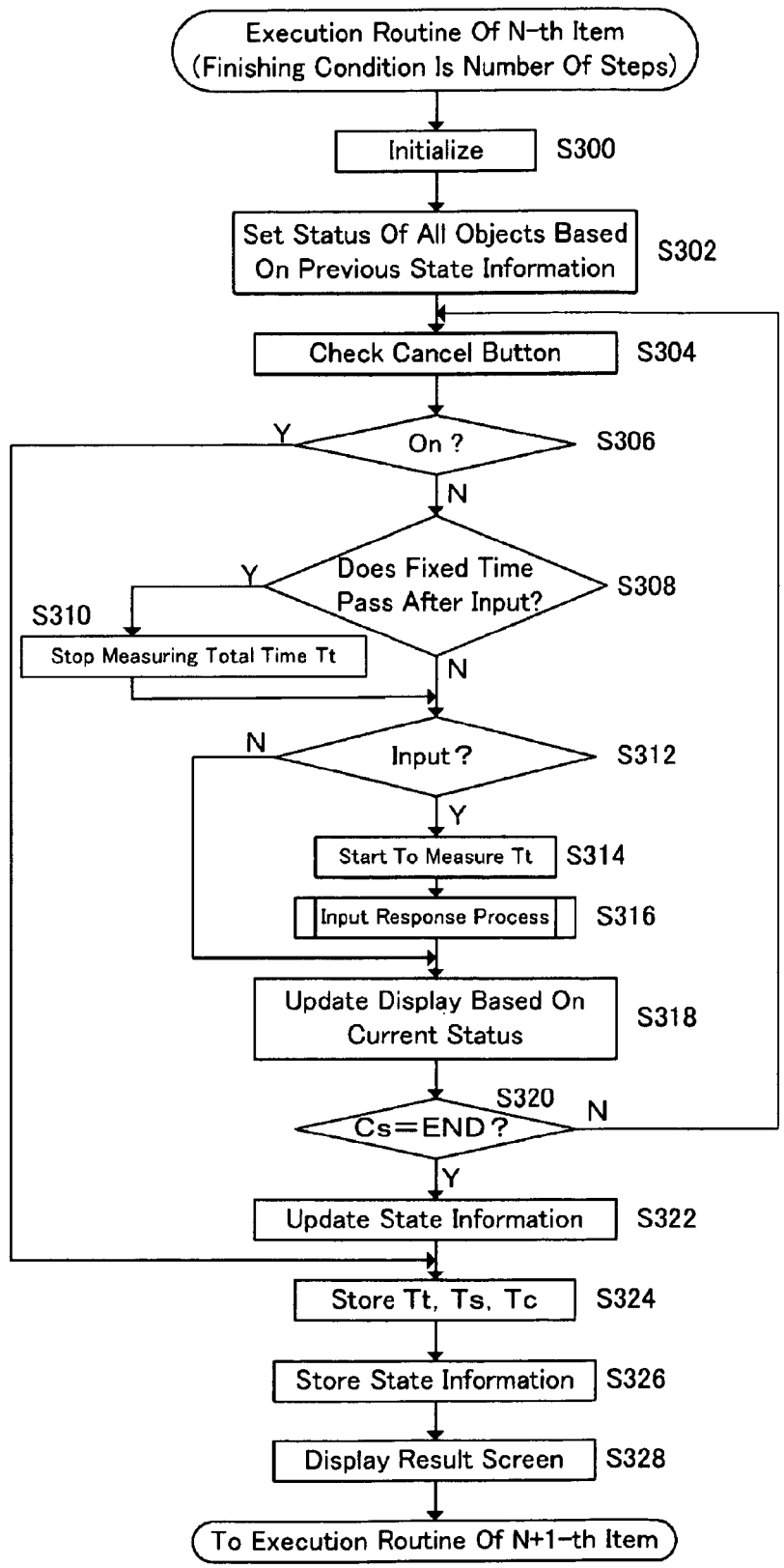
FIG. 33 is a flowchart for showing the execution routine corresponding to the N-th item in step S206-N of FIG. 32 (a finishing condition is the number of steps).

FIG. 33 is a flowchart for showing the execution routine corresponding to the N-th item in step S206-N of FIG. 32 (a finishing condition is the number of steps). The items whose finishing conditions are the number of steps are the items corresponding to FIG. 8, FIG. 9, FIG. 10, FIG. 14, FIG. 17, FIG. 20, FIGS. 21 and 22, FIG. 23, FIG. 24, and FIG. 26.

Referring to FIG. 33, in step S300, the multimedia processor 91 performs the initialization process for executing the routine. In step S302, the multimedia processor 91 sets status of all objects to be displayed based on state information at the time when the same item is previously finished.

Incidentally, a growth process of the plant object 200 of FIG. 9 includes the first to sixth stages. The above state information in this item indicates the stage in the growth process. Accordingly, the plant object 220 which grows by one stage than the previous time is displayed in accordance with step S302. Also, the item of FIGS. 21 and 22 includes the first stage (until the shape of the pottery is made of the clay and completed) and the second stage (from the completion of the shape of the pottery until the completion of the polish). The screen of FIG. 21 is an example of the first stage, and the screen of FIG. 22 is an example of the second stage. The above state information in this item indicates the stage. Accordingly, the display advanced by one stage is performed in accordance with step S302.

In step S304, the multimedia processor 91 checks the cancel key 39. In step S306, the multimedia processor 91 proceeds to step S324 if the cancel key 39 is turned on. Accordingly, if the cancel key 39 is depressed, this item is skipped. On the other hand, if the cancel key 39 is turned off, the multimedia processor 91 proceeds to step S308.

In step S308, the multimedia processor 91 determines whether or not a fixed time passes after a latest input of the inputs from the pedals 520R and 520L, and if it does not pass the processing proceeds to step S312, conversely if it passes the processing proceeds to step S310. In step S310, the multimedia processor 91 stops measuring a total time Tt and proceeds to step S312. The total time Tt represents the accumulation of the exercise time on the day.

In step S312, the multimedia processor 91 checks the right input flag and the left input flag (refer to FIG. 31), and if any one of them is turned on (the presence of the input), i.e., any one of the pedals 520R and 520L is pressed down, the process proceeds to step S314, otherwise, i.e., if both the right input flag and the left input flag are turned off (the absence of the input), the process proceeds to step S318.

If the measurement of the total time Tt is stopped, the multimedia processor 91 starts to measure it in step S314. In step S316, the multimedia processor 91 performs the predetermined processing in response to the input by the pedals 520R and 520L.

Figure 34:
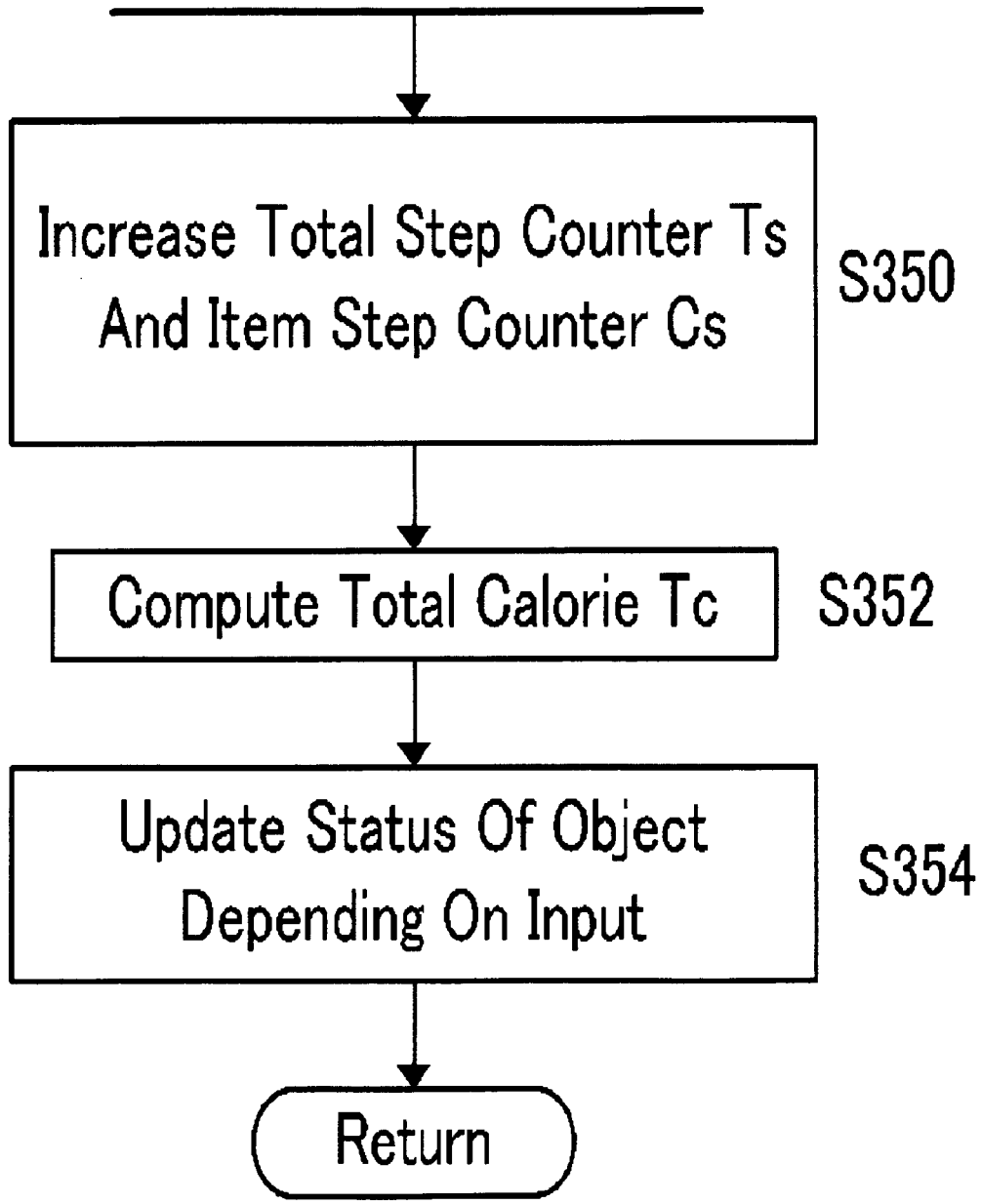
FIG. 34 is a flowchart for showing a first example of the input response process of step S316 of FIG. 33.

FIG. 34 is a flowchart for showing a first example of the input response process of step S316 of FIG. 33. This process is executed corresponding to the item of the FIG. 9 and the item of FIGS. 21 and 22. Referring to FIG. 34, in step S350, the multimedia processor 91 increases a total step counter Ts and an item step counter Cs. The total step counter Ts represents the accumulation of the number of steps on the day. The item step counter Cs represents the accumulation of the number of steps in the item.

In step S352, the multimedia processor 91 computes the total calorie Tc (=Ts*W*U) on the basis of the value of the total step counter Ts, the weight W of the user (kg), and the value U of a unit calorie consumption (kcal/kg*step). In step S354, the multimedia processor 91 updates status of the various objects which changes and/or appears in dependence on the inputs by the pedals 520R and 520L.

In the case of the item of FIG. 9, the status is updated in order that the flower object 216 appears and then disappears after passing the predetermined time, and the watering pot object 218 supplies the water object during the fixed time. Also, in the case of the item of FIGS. 21 and 22, the status is updated in order that the potter's wheel object 290 rotates during the fixed time, the clay object 288 grows by the certain amount, and the dish towel objects 294 moves during the fixed time. In common to the item of FIG. 9 and the item of FIGS. 21 and 22, the status is updated in order that the player character 210 moves the arms and legs so as to correspond to one step. The images are displayed in response to the inputs by the pedals 520R and 520L in accordance with step S354.

Figure 35:
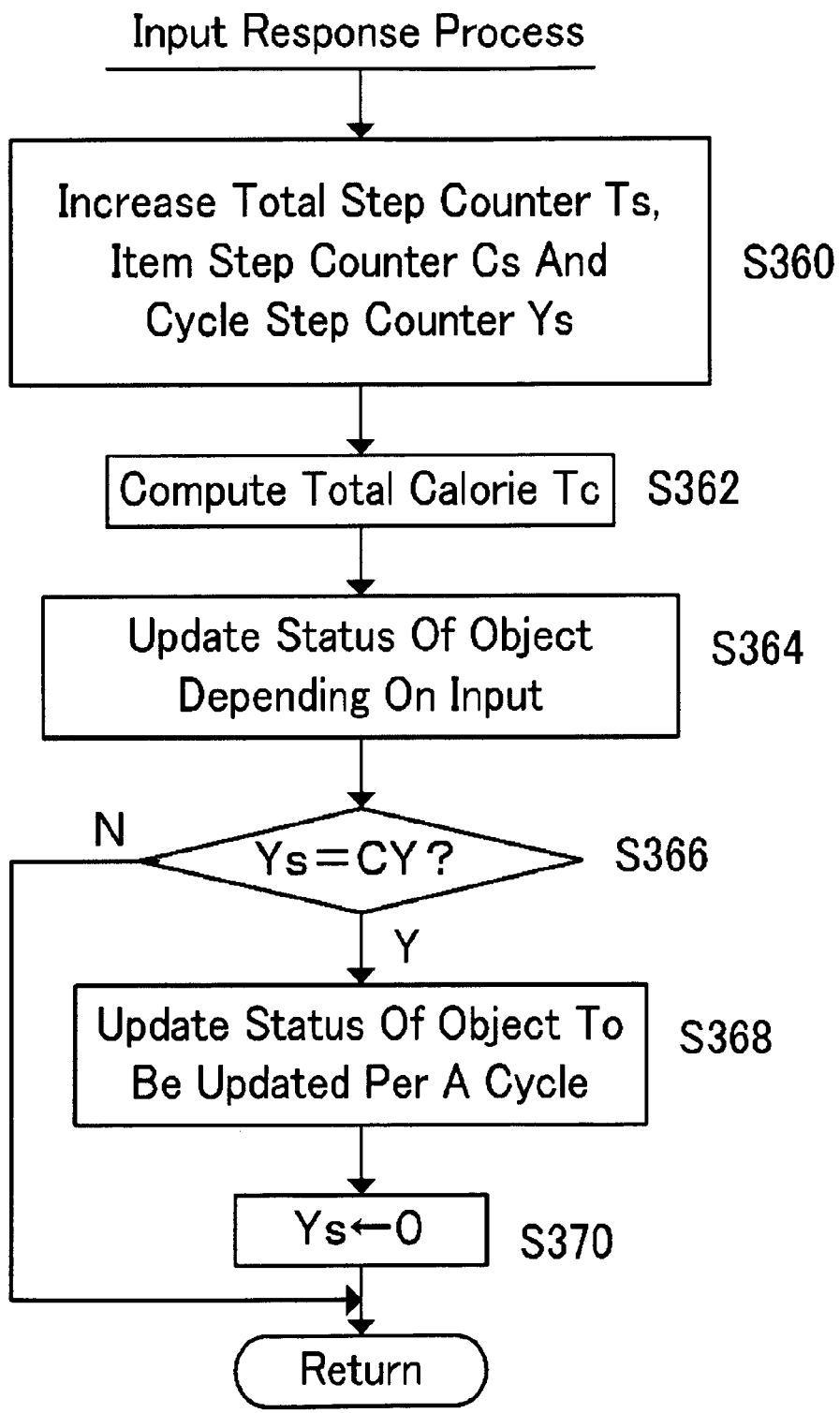
FIG. 35 is a flowchart for showing a second example of the input response process of step S316 of FIG. 33.

FIG. 35 is a flowchart for showing a second example of the input response process of step S316 of FIG. 33. This process is executed corresponding to the each item of the FIG. 8, FIG. 10, FIG. 14, FIG. 17, FIG. 20, FIG. 23, FIG. 24 and FIG. 26. Referring to FIG. 35, in step S360, the multimedia processor 91 increases a total step counter Ts, an item step counter Cs, and a cycle step counter Ys. The total step counter Ts and the item step counter Cs are the same as the corresponding one of FIG. 34. The cycle step counter Ys is a counter which is reset to 0 each time a predetermined number of inputs are performed.

In step S362, the multimedia processor 91 computes the total calorie Tc (=Ts*W*U) on the basis of the value of the total step counter Ts, the weight W of the user (kg), and the value U of the unit calorie consumption (kcal/kg*step). In step S364, the multimedia processor 91 updates status of the various objects which changes and/or appears in dependence on the inputs by the pedals 520R and 520L.

In the case of the item of FIG. 8, the status is updated in order that the firework object 214 appears and then disappears after passing the certain time. In the case of the item of FIG. 10, the status is updated in order that one bubble object 228 bursts. In the case of the item of FIG. 14, the status is updated in order that the water object 258 flows out of the water outlet object 254 during the certain time. In the case of the item of FIG. 17, the status is updated in order that the ice as shaved increases by the certain amount. Also, in the case of the item of FIG. 20, the status is updated in order that the beer server object 286 pours beer during the certain time. In the case of the item of FIG. 23, the status is updated in order that the creature object 298 appears and then disappears after passing the certain time. In the case of the item of FIG. 24, the status is updated in order that the creature object 302 jumps the barrier and runs away. In the case of the item of FIG. 26, the status is updated in order that the penguin object 310 dives into a sea. The status of the player character 210 is updated in the same manner as the FIG. 34. The images are displayed in response to the inputs by the pedals 520R and 520L in accordance with step S364.

In step S366, the multimedia processor 91 determines whether or not the value of the cycle step counter Ys is equal to the predetermined number CY, the process proceeds to step S368 if it is equal to the CY, otherwise returns. In step S368, the multimedia processor 91 updates the status of the object to be updated per a cycle. In this case, the predetermined number of the inputs corresponds to one cycle.

In the case of the item of FIG. 8, the status is updated in order that the spectacular firework object 214 appears and then disappears after passing the certain time. In the case of the item of FIG. 10, the status is updated in order that the bubble wrap object 226 appears newly. In the case of the item of FIG. 14, the status is updated in order that the "Shishi-odoshi" object 256 rotates. In the case of the item of FIG. 17, the status is updated in order that the shaved ice object 270 is completed and then deleted, and further then only the dish appears. Also, in the case of the item of FIG. 20, the status is updated in order that the jug object 284 is filled with the beer and then disappears, and then the empty jug object 284 appears. In the case of the item of FIG. 23, the status is updated in order that the whale object appears and then disappears. In the case of the item of FIG. 26, the status is updated in order that the predetermined number of penguin objects 310 which have the different color from the previous them line up on the cliff. Each time the predetermined number of the inputs by the pedals 520R and 520L are detected, the images are displayed in accordance with step S368. In step S370, the multimedia processor 91 clears the cycle step counter Ys.

Returning to FIG. 33, in step S318, the multimedia processor 91 updates the display based on the current status of each objects. In step S320, the multimedia processor 91 determines whether or not the value of the item step counter Cs is equal to the predetermined number "END", if it is equal to "END", the process proceeds to step S322 to end the process of this item, conversely if it is not equal to "END", the process returns to step S304. In step S322, the multimedia processor 91 updates the state information of the item. In the case of the item of FIG. 9, the growth stage as the state information is advanced by one stage. Also, in the case of the item of FIGS. 21 and 22, the state information is advanced from the first stage to the second stage.

In step S324, the multimedia processor 91 stores the total time Tt, the value of the total step counter Ts, and the total calorie Tc in the main RAM. In step S326, the multimedia processor 91 stores the state information in the main RAM. In step S328, the multimedia processor 91 displays a result screen and then proceeds to the execution routine corresponding to the next item.

Figure 36:
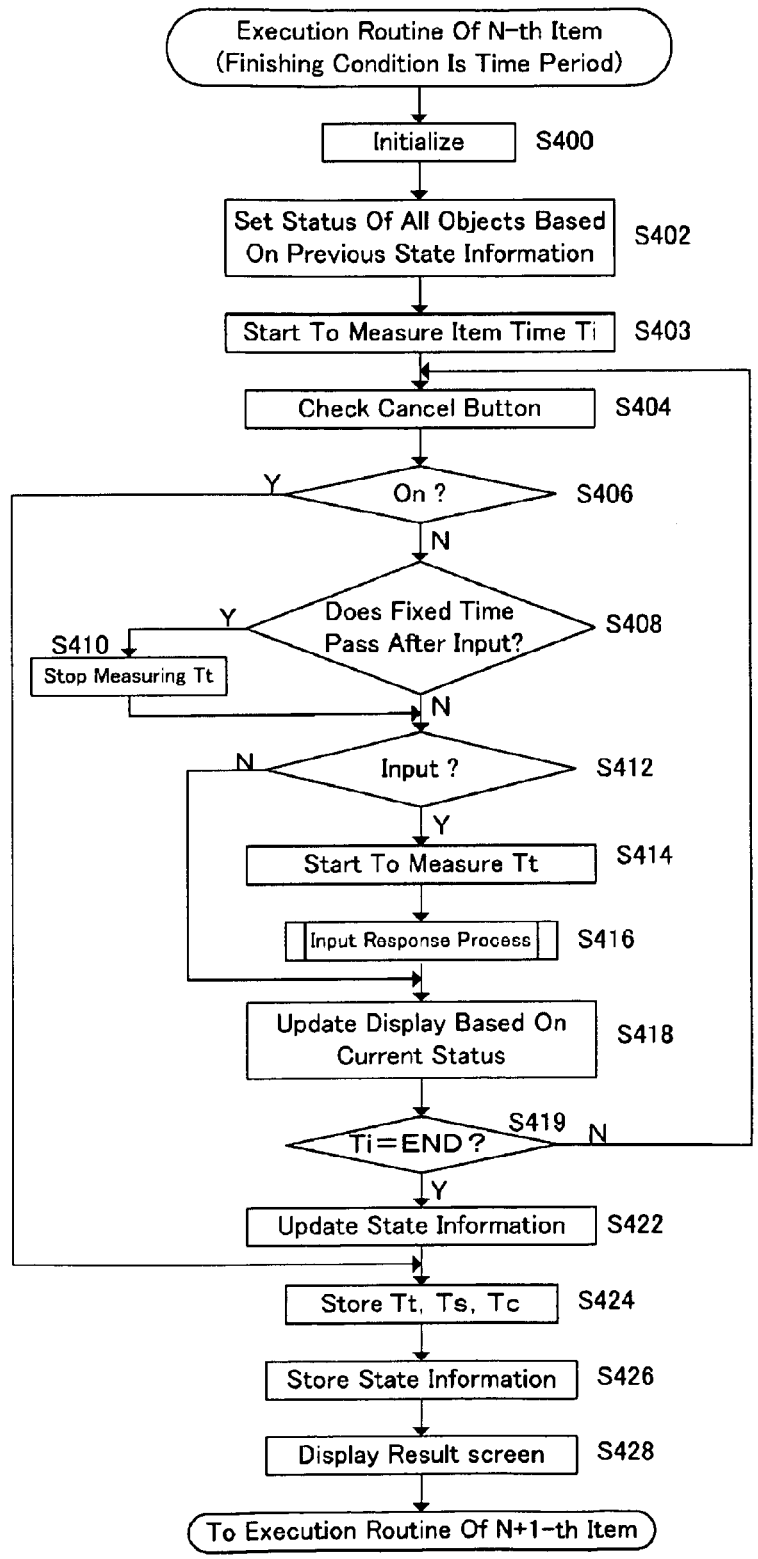
FIG. 36 is a flowchart for showing the execution routine corresponding to the N-th item in step S206-N of FIG. 32 (a finishing condition is a time period).

FIG. 36 is a flowchart for showing the execution routine corresponding to the N-th item in step S206-N of FIG. 32 (a finishing condition is a time period). The items whose finishing condition is a time period are the items corresponding to FIG. 12, FIG. 13, FIG. 15, FIG. 16, FIG. 18, FIG. 19, FIG. 25, and FIG. 27.

Referring to FIG. 36, in step S400, the multimedia processor 91 performs the initialization process for executing the routine. In step S402, the multimedia processor 91 sets status of all objects to be displayed based on the state information at the time when the same item is previously finished.

Incidentally, the fish object in the fish tank of FIG. 15 increases in accordance with the number of the inputs by the pedals 520R and 520L. Accordingly, in this item, the state information is information which indicates the previous number of the fish objects. Thus, the item can be started from the previous state by step S402.

In step S403, the multimedia processor 91 starts to measure an item time Ti. The item time Ti is an elapsed time of the item. The processes of steps S404, S406, S408, S410, S412 and S414 are respectively the same as the processes of steps S304, S306, S308, S310, S312 and S314 of FIG. 33, and therefore the explanation thereof is omitted.

Figure 37:
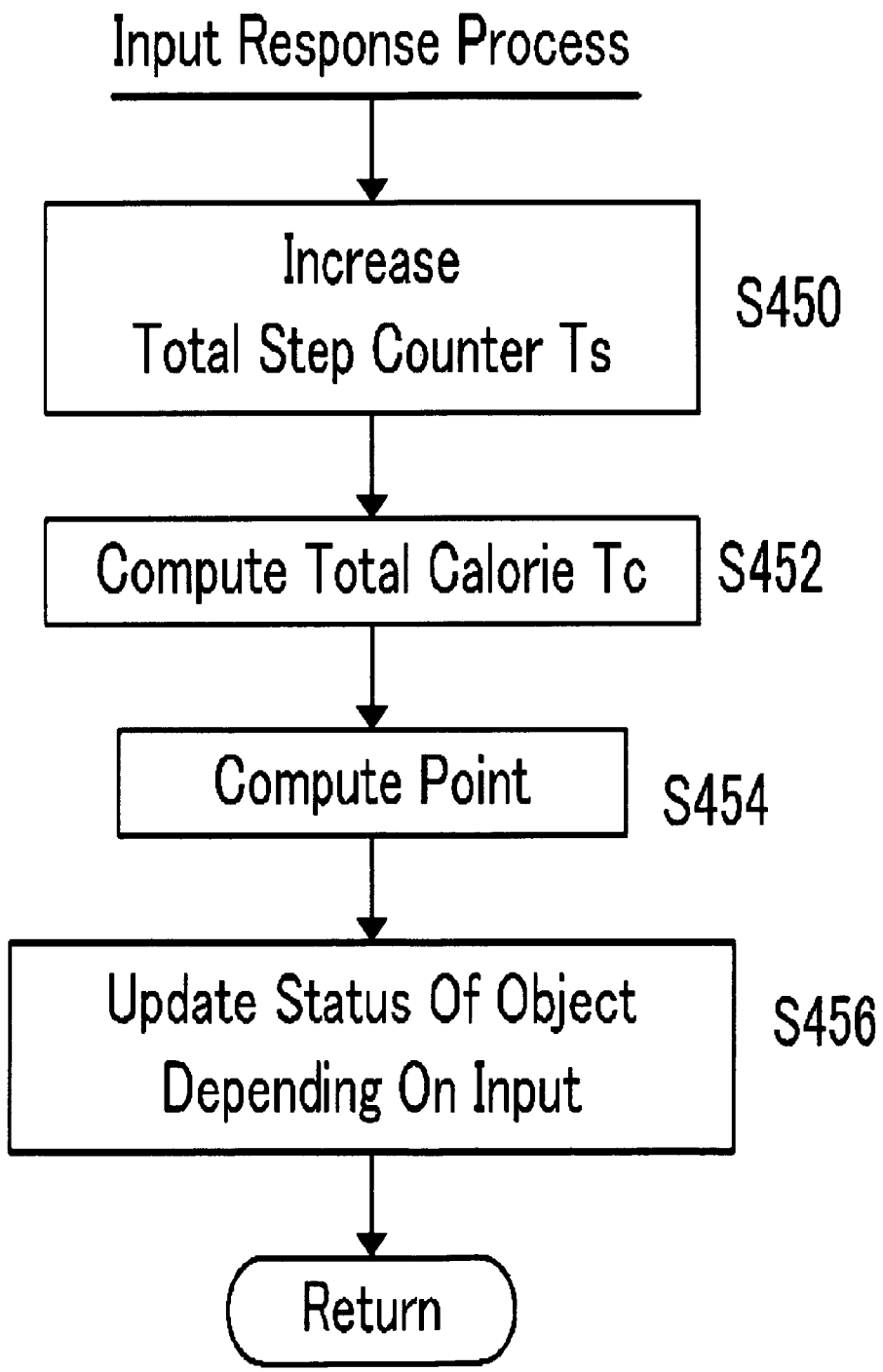
FIG. 37 is a flowchart for showing a first example of the input response process of step S416 of FIG. 36.

FIG. 37 is a flowchart for showing a first example of the input response process of step S416 of FIG. 36. This process is executed corresponding to the each item of the FIG. 12, FIG. 13 and FIG. 25. Referring to FIG. 37, in step S450, the multimedia processor 91 increases a total step counter Ts. The total step counter Ts represents the accumulation of the number of steps on the day.

In step S452, the multimedia processor 91 computes the total calorie Tc (=Ts*W*U) on the basis of the value of the total step counter Ts, the weight W of the user (kg), and the value U of the unit calorie consumption (kcal/kg*step). In step S454, the multimedia processor 91 executes the processing of calculating a score.

In the case of the item of FIG. 12, the score is calculated and added in accordance with the current position of the target cursor 244. In the case of the item of FIG. 13, the score is calculated and added in accordance with the position of the golf club object 250. In the case of the item of FIG. 25, the score is calculated and added in accordance with the current position of the cursor 308.

In step S456, the multimedia processor 91 updates status of the various objects which changes and/or appears in dependence on the inputs by the pedals 520R and 520L.

In the item of FIG. 12, the status is updated in order that the arrow object 246 appears and then sticks. In the item of FIG. 13, the status is updated in order that the golf ball object 248 flies. In the item of FIG. 25, the status is updated in order that the one domino object 304 appears. The status of the player character 210 is updated in the same manner as the FIG. 34. The images are displayed in response to the inputs by the pedals 520R and 520L in accordance with step S456.

Figure 38:
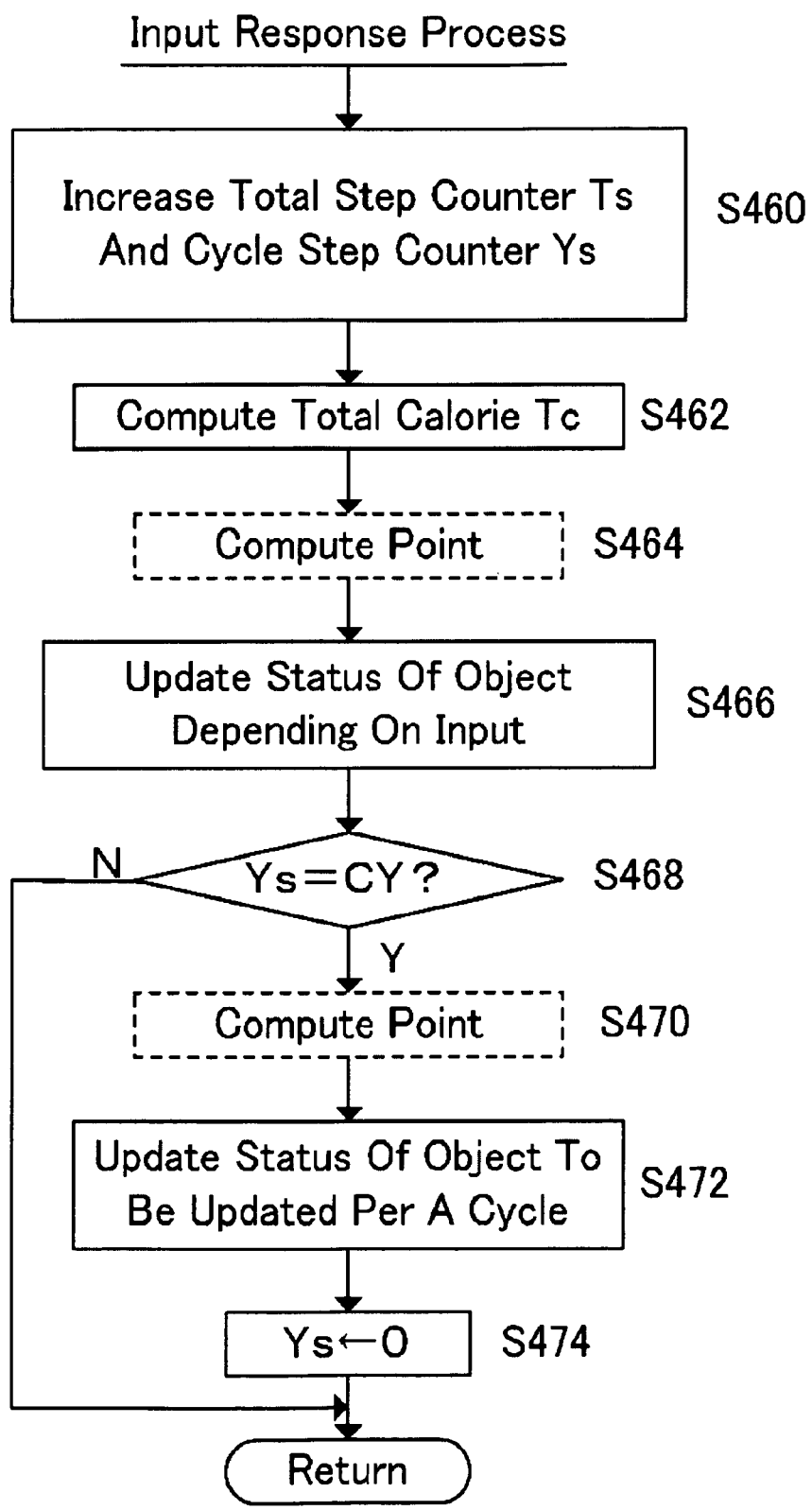
FIG. 38 is a flowchart for showing a second example of the input response process of step S416 of FIG. 36.

FIG. 38 is a flowchart for showing a second example of the input response process of step S416 of FIG. 36. This process is executed corresponding to the each item of the FIG. 15, FIG. 16, FIG. 18, FIG. 19 and FIG. 27. Referring to FIG. 38, in step S460, the multimedia processor 91 increases a total step counter Ts and a cycle step counter Ys. The total step counter Ts represents the accumulation of the number of steps on the day. The cycle step counter Ys is a counter which is reset to 0 each time a predetermined number of inputs is performed.

In step S462, the multimedia processor 91 computes the total calorie Tc (=Ts*W*U) on the basis of the value of the total step counter Ts, the weight W of the user (kg), and the value U of the unit calorie consumption (kcal/kg*step). The next step S464 is executed in the item of FIG. 16, and a certain point is added for each input in the step S464.

In step S466, the multimedia processor 91 updates status of the various objects which changes and/or appears in dependence on the inputs by the pedals 520R and 520L.

In the case of the item of FIG. 15, the status is updated in order that the bait object 262 appears and then drops. In the case of the item of FIG. 16, the status is updated in order that the Ferris wheel object 264 rotates by the certain angle. Also, in the case of the item of FIG. 18, the status is updated in order that a cycle, which consists of operations assigned the order of the rotation of the drum objects 272, 274 and 276, the stop of the drum object 272, the stop of the drum object 274, and the stop of the drum object 276, is repeated. Further, in the case of the item of FIG. 19, the status is updated in order that the dynamo object 280 emits light. In the case of the item of FIG. 27, the status is updated in order that the wavelet object 314 appears and then returns. The status of the player character 210 is updated in the same manner as the FIG. 34. The images are displayed in response to the inputs by the pedals 520R and 520L in accordance with step S466.

In step S468, the multimedia processor 91 determines whether or not the value of the cycle step counter Ys is equal to the predetermined number CY, the process proceeds to step S470 if it is equal to the CY, otherwise returns. The next step S470 is executed in the items of FIG. 18 and FIG. 27. In step S470, the multimedia processor 91 calculates and adds the point per a cycle. In this case, the predetermined number CY of inputs corresponds to one cycle.

In the case of the item of FIG. 18, when CY=4, i.e., all the drum objects 272, 274 and 276 rotate and then stop, the point is calculated and added. In the case of the item of FIG. 27, when the wavelet object 314 is generated by the predetermined number of times and then the wreckage objects 315 appear, the point is calculated and added. In step S472, the multimedia processor 91 updates the status of the object to be updated per a cycle.

In the case of the item of FIG. 15, the status is updated in order that the one fish appears. In the case of the item of FIG. 16, the status is updated in order that the electric spectaculars are spectacularly driven. In the case of the item of FIG. 19, the status is updated in order that one room is illuminated. In the case of the item of FIG. 27, the status is updated in order that the wreckage objects 315 appear. Each time the predetermined number of the inputs by the pedals 520R and 520L is detected, the images are displayed in accordance with step S472. In step S474, the multimedia processor 91 clears the cycle step counter Ys.

Returning to FIG. 36, in step S418, the multimedia processor 91 updates the display based on the current status of the each object. In step S419, the multimedia processor 91 determines whether or not the item time Ti is equal to a predetermined time "END", and if it is equal the process proceeds to step S422 to end the process of this item, conversely if it is not equal the process returns to step S404. In step S422, the multimedia processor 91 updates the state information of the item. In the case of the item of FIG. 15, the number of fishes as the state information is updated.

The processes of steps S424, S426, and S428 are respectively the same as the processes of steps S324, S326, and S328, and therefore the explanation thereof is omitted. Incidentally, in the process of the FIG. 36, in general, as the number of times of the inputs by the pedals 520R and 520L are larger, the point more increases.

Figure 39:
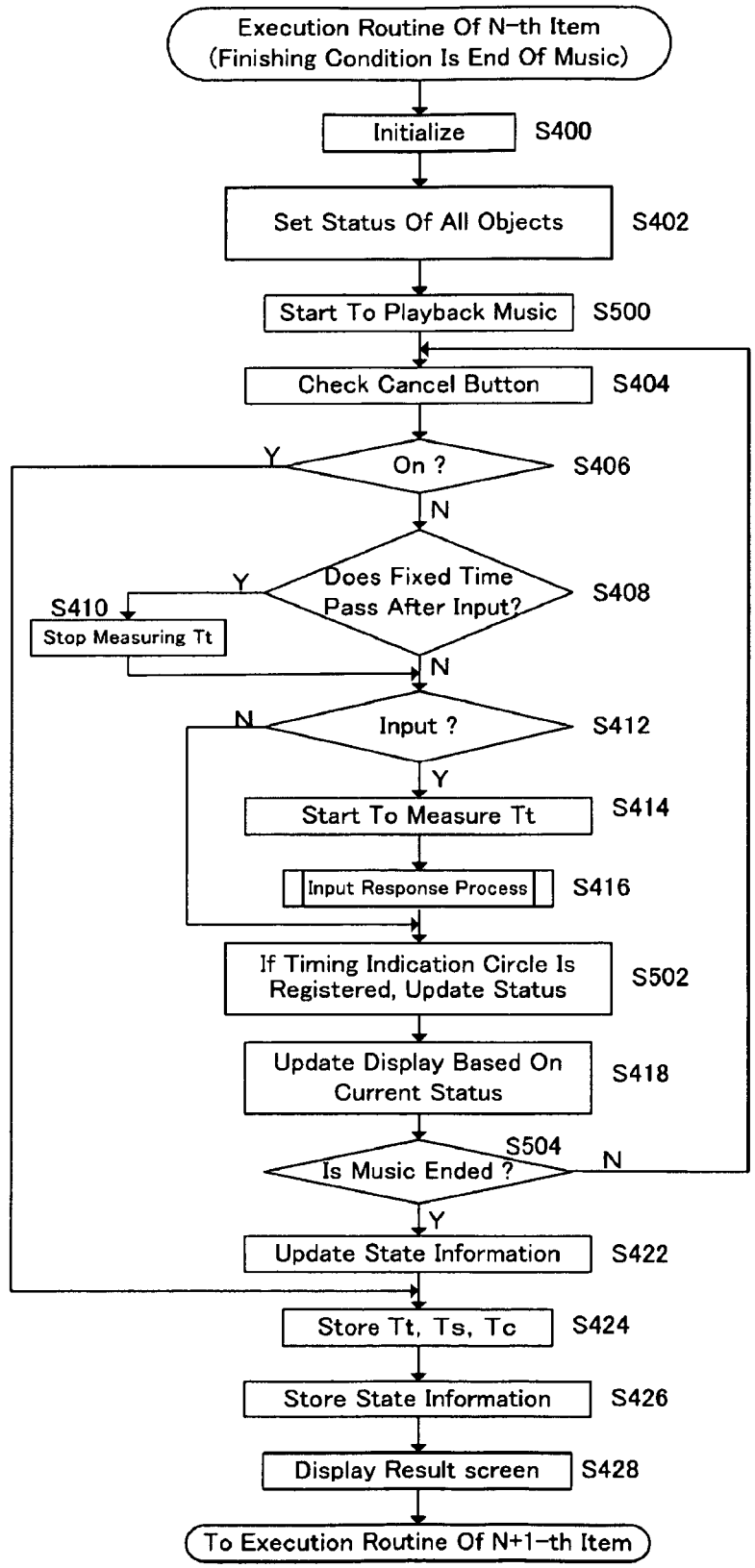
FIG. 39 is a flowchart for showing the execution routine corresponding to the N-th item in step S206-N of FIG. 32 (a finishing condition is an end of music).

FIG. 39 is a flowchart showing the execution routine corresponding to the N-th item in step S206-N of FIG. 32 (a finishing condition is the end of music). This process corresponds to the item of FIG. 11. Referring to FIG. 39, in step S500 in place of step S403 of FIG. 36, the multimedia processor 91 starts to playback music. Also, in step S504 in place of step S419 of FIG. 36, the multimedia processor 91 determines whether or not the music ends, the process proceeds to step S422 if it ends, conversely returns to step 404 if it does not end. Further, in step S502 before step S418, the multimedia processor 91 determines either the presence or absence of the registration of the timing indication circle 234, if there is the registration, the status of the timing indication circle 234 is undated. This registration process is performed in synchronization with the music. Incidentally, the process of step S416 is the same as that of FIG. 37.

By the way, as described above, the exercise assistance system in accordance with this embodiment enables the player to look at the various representations in response to his/her own stepping motion. In this case, the representation is not such representation as the feeling of the stepping motion approaches the feeling of the walking by using images which a computer generates so as to realistically represent actuality or controlling the loaded condition in accordance with highly physics operation (such representation as the scene moves in response to the stepping motion, or such representation as the character which is his/her double walks in the virtual space), but the representation which is unrelated to such motion as the walking, such as explosion of a firework and opening of a flower in response to the stepping motion as described above, so that it is possible to prevent the player from feeling odd on the ground of a gap between the real space and the virtual space.

As the result, the player can purely feel amusement with interactive element, such as occurrence and change of something in the virtual space in response to the own stepping motion, and therefore it is possible to ease or reduce tiredness and monotony which is caused by repetition of the stepping motion. For this reason, this enables the player to get exercise continually.

Also, since a large amount of computer processing is not required, it is possible to reduce the processing amount of the computer.

In addition, each time the player performs the stepping motion, circumstance and condition in the virtual space change in the most exercise assistance screens, and therefore it is possible to prevent the player from wearying even if the monotonous stepping motion is repeated.

Further, if the player performs the predetermined number of times of the stepping motion, in some exercise assistance screens, the player can enjoy the special representation and the more spectacular representation than the standard, and therefore it is possible to prevent the player from wearying even if the monotonous stepping motion is repeated.

Still further, such change of the representation enable the player to obtain a criterion and the like, such as the continuing state of the certain motion and degree of attainment of the aim as set. In addition, the criterion includes not only numerical values such as an exercising time, a calorie consumption, and the number of steps but also representations such as virtual images and sound which represents the burst of the five bubble wrap, ten times of reverberations of "Shishi-odoshi", the dancing corresponding to one music, or the like. As the result, the player can viscerally recognize the extent to which the player has gotten exercise even if the player concentrates on exercise.

Still further, if the player repeats the stepping motion, some exercise assistance screens enable the player to feel that things are completed in the virtual space by his/her effort such as completing the pottery by a gradual process, and running a light in a house by a gradual process. As the result, it is possible to assist the player which wants to keep the motivation for exercising.

Still further, if the player neglects the exercise for a few days and after that resumes the exercise, in some exercise assistance screen, the representation for having the player reflect on his/her idleness , such as the bolting of the fish which the player is feeding and the non-growing of the plant, is displayed. As the result, it is possible to give the motivation for continuously daily getting exercise to the player.

Still further, in some exercise assistance screens, instead of merely repeating the stepping motion, the player can exercise in accordance with the indication timing or in synchronization with the music. As the result, the player can get exercise while enjoying.

Still further, in some exercise assistance screens, if the player quickly performs the stepping motion, the representation, in which the circumstance and condition in the virtual space change in accordance with the quickness, is displayed. Accordingly, the player can exercise while enjoying even if he/she exercises heavily with the quick motion, and enjoy the different representation from the standard by controlling the overall pacing of the motion.

Second Embodiment

Figure 40:
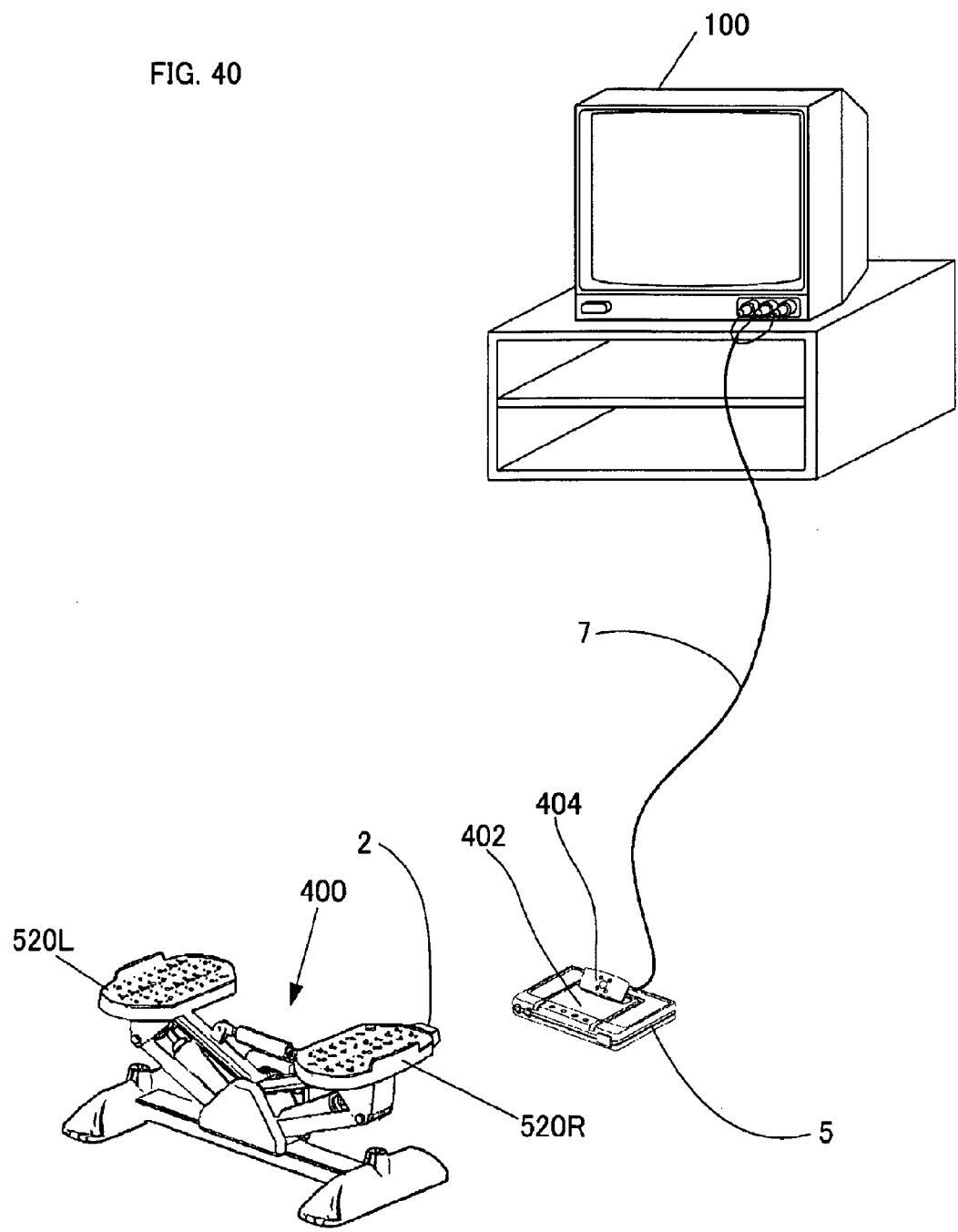
FIG. 40 is a view showing the overall configuration of an exercise assistance system (an information processing system) in accordance with a second embodiment of the present invention.

FIG. 40 is a view showing the overall configuration of an exercise assistance system (an information processing system) in accordance with a second embodiment of the present invention. As shown in FIG. 40, this exercise assistance system is provided with a stepper 400, a retroreflective member 2, a cartridge 402 with an imaging unit 404, an adaptor 5, and a television monitor 100. The cartridge 402 is inserted into the adaptor 5. Also, the adaptor 5 is connected with the television monitor 100 by an AV cable 7.

Figure 41:
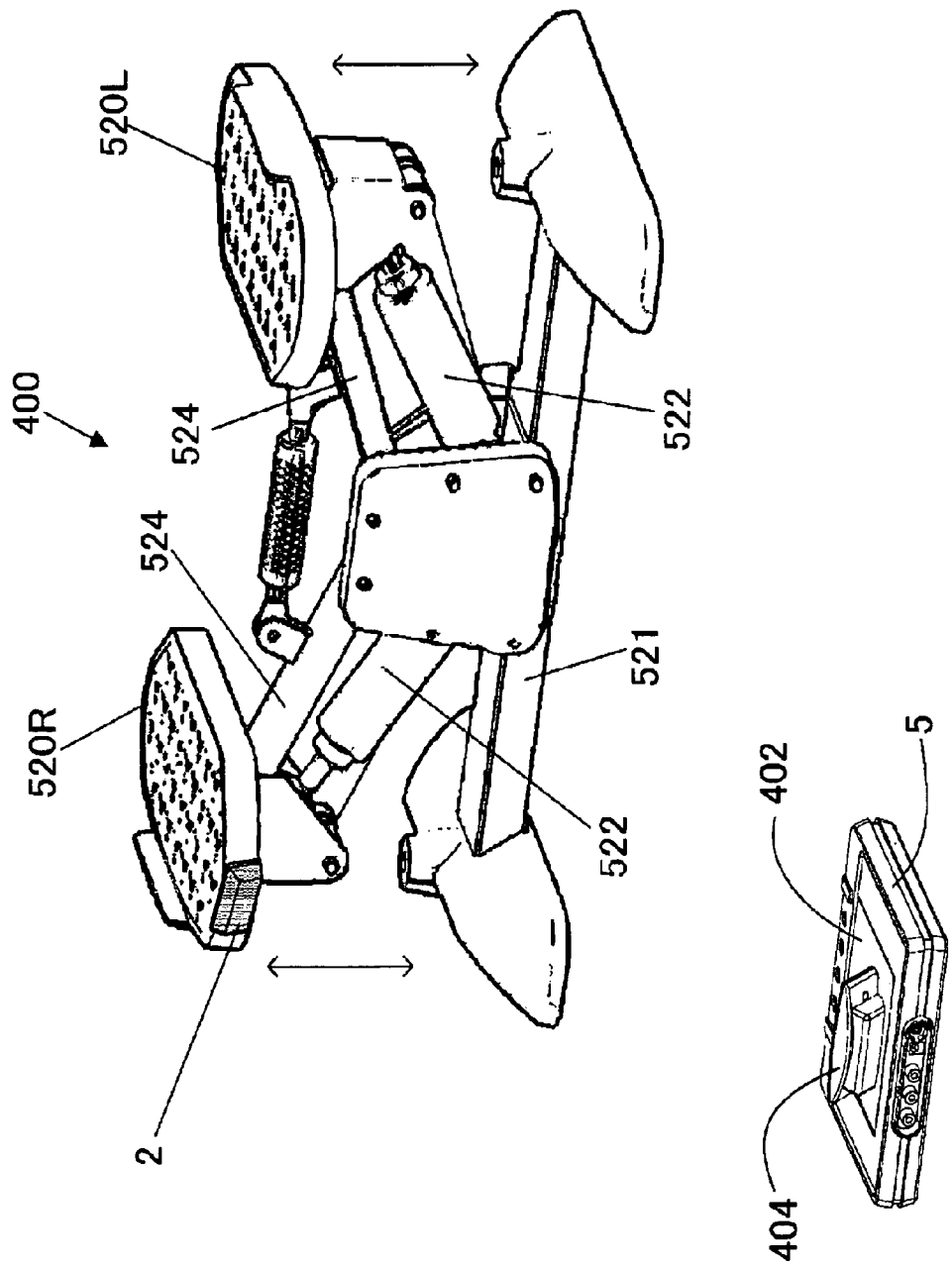
FIG. 41 is a view for showing the condition of a retroreflective member 2 as attached to the stepper 400 of FIG. 40.

FIG. 41 is a view for showing the condition of the retroreflective member 2 as attached to the stepper 400 of FIG. 40. Referring to FIG. 41, the stepper 400 is formed by removing the detection unit 500 from the stepper 1 of FIG. 3. The other parts are the same as the stepper 1, and therefore the explanation is omitted.

In what follows, such terms as "a toe side of a pedal 520L", "a toe side of a pedal 520R", "a heel side of a pedal 520L", and "a heel side of a pedal 520R", may be used. In this case, the "toe side" and "heel side" respectively indicate the toe side and heel side when the player places the left and right feet on the pedals 520L and 520R.

The retroreflective member 2 is attached on the side surface of the pedal 520R for the right foot in the toe side using a double-faced tape (not shown in the figure) and the like. This retroreflective member 2 is formed by attaching the retroreflective sheet on the surface of an approximately rectangular parallelepiped member. This approximately rectangular parallelepiped member has a large rectangle surface and a small rectangle surface which are parallel to each other, two small trapezoids which are arranged face to face, and two large trapezoids which are arranged face to face. The retroreflective sheet is attached on each surface other than the large rectangle surface, and the above double-faced tape is attached on this large rectangle surface. In this case, this retroreflective member 2 may be cover with a transparent plastic cover.

The adapter 402 in which the cartridge 402 is inserted is placed on the position where the retroreflective member 2 falls within the photographing range of the imaging unit 404 even if the pedals 520L and 520R move up and down.

Figure 42:
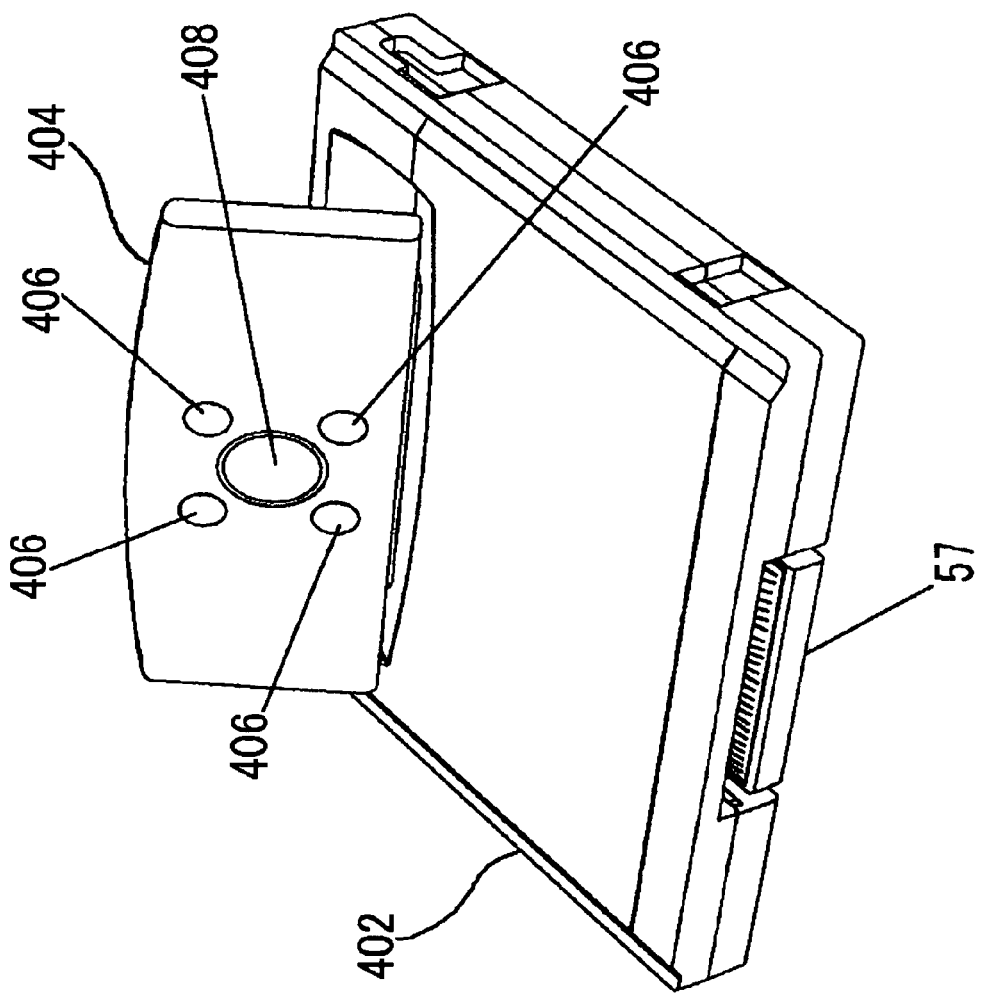
FIG. 42 is a perspective view of the cartridge 402 of FIG. 40.

FIG. 42 is a perspective view of the cartridge 402 of FIG. 40. As shown in FIG. 42, the cartridge 402 consists of a body in the form of a flat rectangular parallelepiped and the imaging unit 404. The connector 57 is formed on the front side of the body of the cartridge 402. The imaging unit 404 is fixed on the upper surface of the body of the cartridge 402. In this case, the imaging unit 404 is fixed in such a manner that the surface thereof inclines by a predetermined angle (e.g., 40 degrees) to the surface of the cartridge 402. The imaging unit 404 is provided with a circular infrared filter 408 which is located in the center of the surface thereof, and there are four infrared light emitting diodes 406 which are located around the infrared filter 408. An image sensor 410 to be described below is located behind the infrared filter 408.

Figure 43:
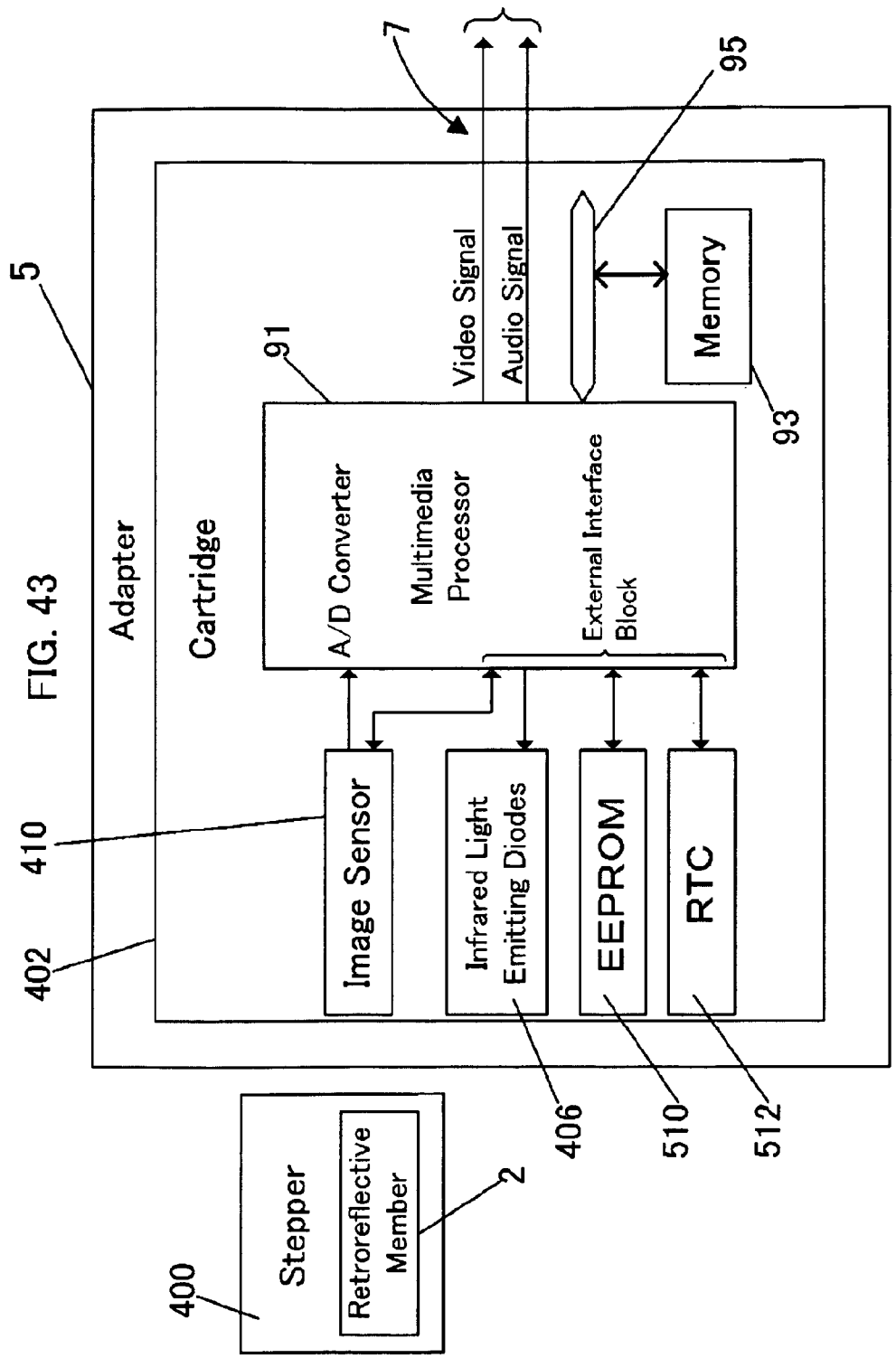
FIG. 43 is a block diagram for showing the electric configuration of the cartridge 402 of FIG. 40.

FIG. 43 is a schematic diagram showing the electric configuration of the cartridge 402 of FIG. 42. As shown in FIG. 43, the cartridge 402 includes a multimedia processor 91, the image sensor 410, the infrared emitting diodes 406, a memory 93, an EEPROM 510, an RTC 512, and a bus 95.

The multimedia processor 91 can access the memory 93 through the bus 95. Accordingly, the multimedia processor 91 can perform programs stored in the memory 93, and read and process the data stored in the memory 93. The programs for executing the various processes, image data, sound data and the like are written to in this memory 93 in advance.

The external interface block of the multimedia processor 91 is an interface with peripheral devices (the image sensor 410 and the infrared light emitting diodes 406 in the case of the present embodiment). The ADC of the multimedia processor 91 serves to convert an analog signal, which is input from an analog input device (the image sensor 410 in the case of the present embodiment), into a digital signal.

The multimedia processor 91 drives the four infrared light emitting diodes 406 intermittently to intermittently flash the infrared light and thereby stroboscopic photography is realized. The infrared light emitted by the infrared light emitting diodes 406 is reflected by the retroreflective member 2 attached to the stepper 400 and is input the image sensor 410 through the infrared filter 408. Accordingly, the image sensor 410 outputs a picture signal including the image of the retroreflective member 2 to the multimedia processor 91 (when the infrared light is emitted). Since the infrared light emitting diodes 406 are intermittently driven, the image sensor 410 outputs a picture signal even in a non-emission period of infrared light.

These analog picture signals output from the image sensor 410 are converted into digital picture signals by the ADC incorporated in the multimedia processor 91. The multimedia processor 91 calculates the difference between the digital picture signal with infrared light illumination and the digital picture signal without infrared light illumination, and then analyzes the periodic movement of the retroreflective member 2 on the basis of this differential signal "DI" (differential picture "DI"). It is possible to eliminate, as much as possible, noise of light other than the light reflected from the retroreflective member 2 by obtaining the difference so that the retroreflective member 2 can be detected with a high degree of accuracy.

The multimedia processor 91 performs graphics processing, sound processing, and the other operation based on the analysis result of the periodic movement of the retroreflective member 2, and then outputs a video signal and an audio signal. The video signal and the audio signal generated by the multimedia processor 91 are supplied to the television monitor 100 through the adaptor 5 and the AV cable 7 in order to display a video image corresponding to the video signal on the television monitor 100 and output a sound corresponding to the audio signal from a speaker thereof (not shown in the figure). Meanwhile, the adaptor 5 supplies the video signal generated by the multimedia processor 91 to the AV cable 7 with doing nothing, and amplifies the audio signal to supply it to the AV cable 7.

FIG. 44 is an explanatory view for showing the analytical method of the periodic movement in accordance with the present embodiment. FIG. 44(a), FIG. 44(c) and FIG. 44(e) show views from the toe side of the pedals 520L and 520R of the stepper 400, and therefore the retroreflective member 2 is drawn. FIG. 44(a) shows a view where the pedals 520L and 520R horizontally stand still. FIG. 44(c) shows a view where the player presses down on the pedal 520L with the left foot from the state of FIG. 44(a). FIG. 44(e) shows a view where the player presses down the pedal 520R with the right foot from the state of FIG. 44(c). The player repeats such stepping motion using the stepper 400. Such stepping motion can be said as periodic motion. In this case, while it is said that the player performs the periodic motion, it is also said that the stepper 400 performs the periodic motion in response to the periodic motion of the player.

Figure 44A:
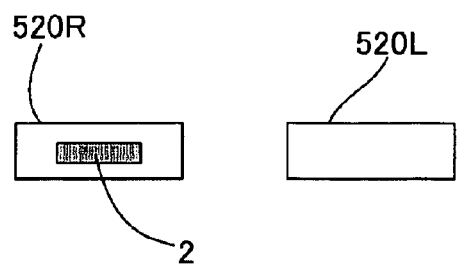
FIG. 44 is an explanatory view for showing the analytical method of the periodic movement in accordance with the present embodiment.
Figure 44B:
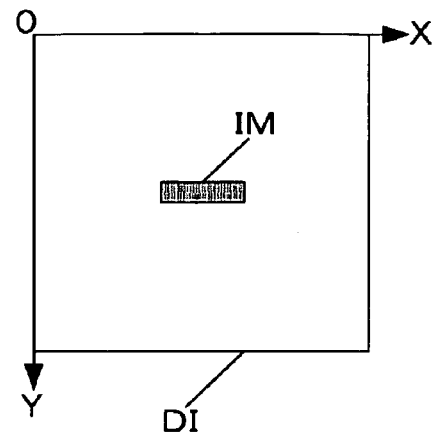
Figure 44C:
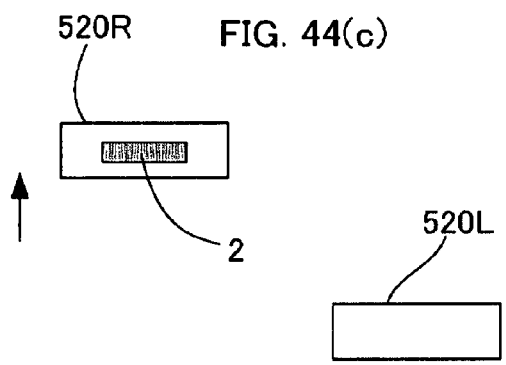
Figure 44D:
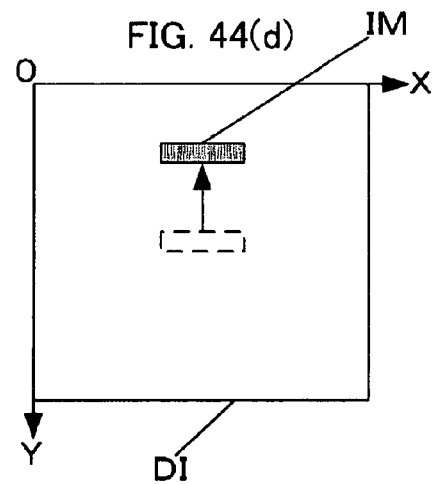
Figure 44E:
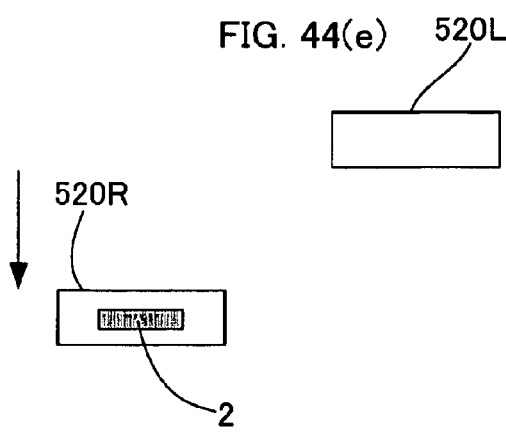
Figure 44F:
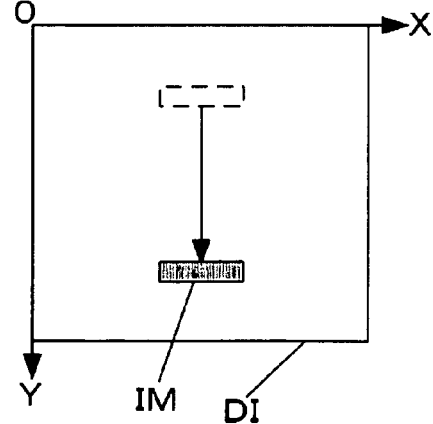

FIG. 44(b), FIG. 44(d) and FIG. 44(f) show differential pictures DI acquired when the imaging unit 404 photographs the retroreflective member 2 of states, which are shown in FIG. 44(a), FIG. 44(c) and FIG. 44(e) respectively, using stroboscopic photography. When the retroreflective member 2 changes from the state shown in FIG. 44(a) to the state shown in FIG. 44(c) (the stepping motion with the left foot), as shown in FIGS. 44(b) and 44(d), the image IM of the retroreflective member 2 moves in the negative direction of the Y axis in the differential picture DI. That is, since the retroreflective member 2 is attached to the pedal 520R for the right foot, when the player steps with the left foot, the retroreflective member 2 moves vertically upward. As the result, the image IM moves in the negative direction of Y axis.

When the retroreflective member 2 changes from the state shown in FIG. 44(c) to the state shown in FIG. 44(e) (the stepping motion with the right foot), as shown in FIGS. 44(d) and 44(f), the image IM of the retroreflective member 2 moves in the positive direction of the Y axis in the differential picture DI. That is, since the retroreflective member 2 is attached to the pedal 520R for the right foot, when the player steps with the right foot, the retroreflective member 2 moves vertically downward. As the result, the image IM moves in the positive direction of Y axis.

Accordingly, when the image IM of the retrorefletive member 2 moves in the negative direction of Y axis, the multimedia processor 91 can realize that the stepping motion is carried out by the left foot, i.e., the pedal 520L is pressed down. On the other hand, when the image IM of the retrorefletive member 2 moves in the positive direction of Y axis, the multimedia processor 91 can realize that the stepping motion is carried out by the right foot, i.e., the pedal 520R is pressed down.

As described above, the multimedia processor 91 realizes by which of the right foot and left foot the stepping motion is performed, i.e., which of the pedal 520L and pedal 520R is pressed down, based on the photographed result of the periodic movement of the retroreflective member 2 attached to the pedal 520R of the stepper 400, i.e., the differential picture DI (analysis of the periodic motion).

Needless to say, the retroreflective member 2 may be attached to the pedal 520L for the left foot. In this case, when the player presses down with the left foot, the retroreflective member 2 moves vertically downward. As the result the image IM thereof moves in the positive direction of Y axis. On the other hand, when the player presses down with the right foot, the retroreflective member 2 moves vertically upward. As the result the image IM thereof moves in the negative direction of Y axis. Accordingly, in this case, when the image IM of the retrorefletive member 2 moves in the positive direction of Y axis, the multimedia processor 91 can realize that the stepping motion is performed by the left foot, i.e., the pedal 520L is pressed down. On the other hand, when the image IM of the retrorefletive member 2 moves in the negative direction of Y axis, the multimedia processor 91 can realize that the stepping motion is performed by the right foot, i.e., the pedal 520R is pressed down.

Next, the process performed by the multimedia processor 91 in accordance with the second embodiment will be explained with reference to a flow chart. The overall process flow which is executed by the multimedia processor 91 in accordance with the second embodiment is the same as that of the flow chart of FIG. 30.

FIG. 45 is a flowchart showing the photographing process which is one of the processes of the application program of step S3 of FIG. 30. Referring to FIG. 45, the multimedia processor 91 turns on the infrared light emitting diodes 406 in step S510. In step S512, the multimedia processor 91 acquires, from the image sensor 410, picture data which is obtained with infrared light illumination, and stores the picture data in the main RAM.

In this case, for example, a CMOS image sensor of 32 pixels×32 pixels is used as the image sensor 410 of the present embodiment. Accordingly, the image sensor 410 outputs pixel data of 32 pixels×32 pixels as the picture data. This pixel data is converted into digital data by the ADC and stored in the main RAM as elements of two-dimensional array P1[X][Y].

In step S514, the multimedia processor 91 turns off the infrared light emitting diodes 406. In step S516, the multimedia processor 91 acquires, from the image sensor 410, picture data (pixel data of 32 pixels×32 pixels) which is obtained without infrared light illumination, and stores the picture data in the main RAM. In this case, the pixel data is stored in the internal main RAM as elements of two-dimensional array P2[X][Y].

In this way, the stroboscopic photography is performed. Also, in two-dimensional coordinate system which specifies a position of each pixel constituting a picture from the image sensor 410, it is assumed that the horizontal axis is X-axis and the vertical axis is Y-axis. Since the image sensor 410 of 32 pixels×32 pixels is used in the case of the present embodiment, X=0 to 31 and Y=0 to 31. In this respect, the differential picture DI also is applied in the same manner. Meanwhile, the pixel data is a value of luminance.

By the way, the multimedia processor 91 calculates the differential picture DI based on the photographed result of the photographing routine, and then extracts a target point from the image IM of the retroreflective member 2, which is appeared in the differential picture IM. Then, the multimedia processor 91 calculates the velocity vector Vy in the Y-axis direction based on the Y coordinate Yp of the previous target point and the Y coordinate Yc of the current target point. The details are as follows.

Figure 46:
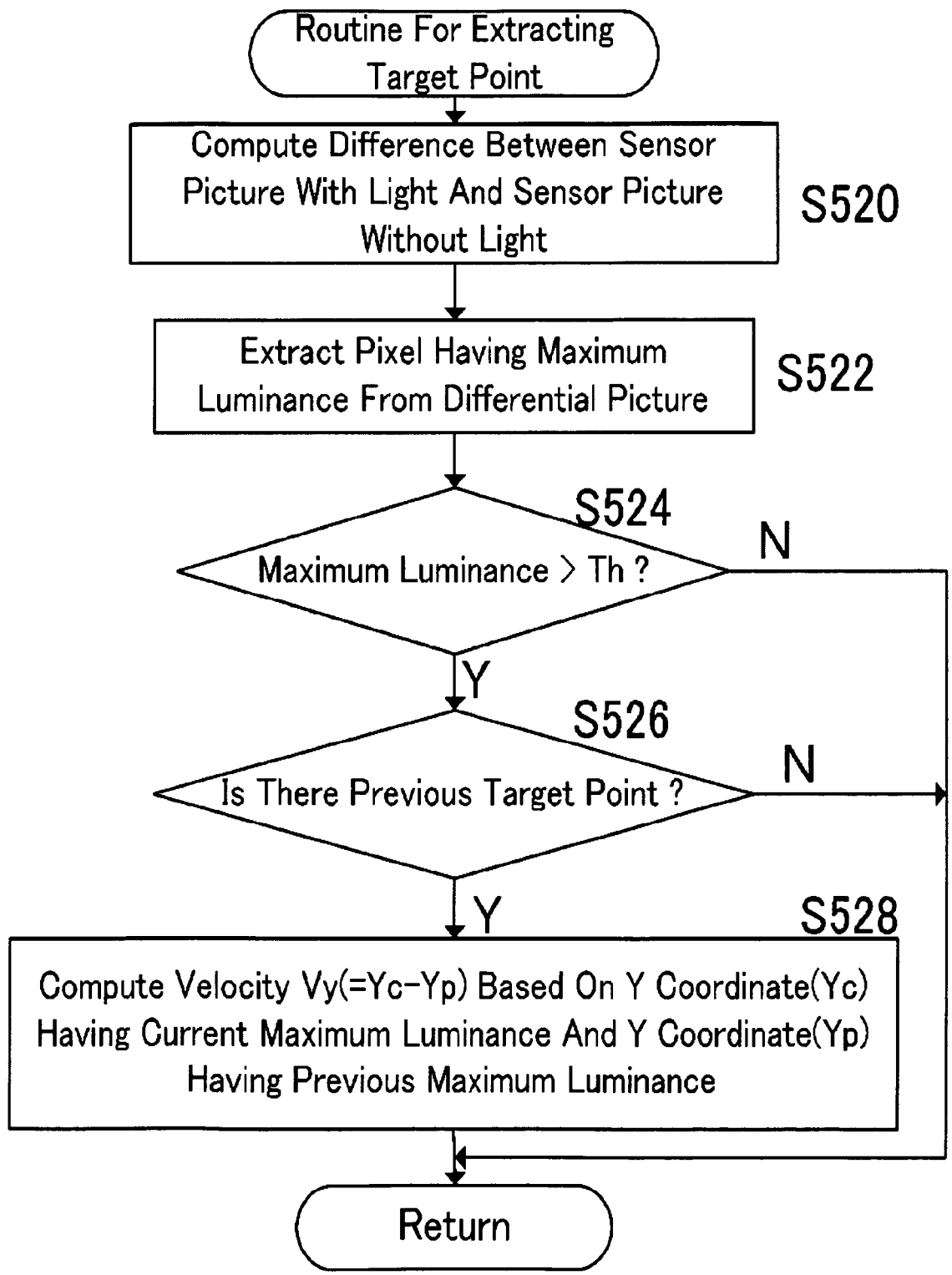
FIG. 46 is a flowchart showing the process of extracting the target point which is one of the processes of the application program of step S3 of FIG. 30.

FIG. 46 is a flowchart showing the process of extracting a target point which is one of the processes of the application program of step S3 of FIG. 30. Referring to FIG. 46, in step S520, the multimedia processor 91 calculates differential pixel data between the pixel data with infrared light illumination (i.e., elements of the array P1[X][Y]) and the pixel data without infrared light illumination (i.e., elements of the array P2[X][Y]), and the differential pixel data is assigned to two-dimensional array Dif[X][Y].

In what follows, the element of the array P1[X][Y] (i.e., the pixel data with infrared light illumination), the element of the array P2[X][Y] (i.e., the pixel data without infrared light illumination), and the element of the array Dif[X][Y] (i.e., the differential pixel data) might be referred as the pixel data P1[X][Y], the pixel data P2[X][Y], and the differential pixel data Dif[X][Y] respectively.

In step S522, the multimedia processor 91 extracts the differential pixel data having the maximum luminance from all the differential pixel data Dif [X][Y] obtained in step S520. Then, in step S524, the multimedia processor 91 compares the maximum luminance to the predetermined threshold value Th, if the maximum luminance exceeds the predetermined threshold value Th, the pixel having the maximum luminance is set to the current target pixel, and the process proceeds to step S526, otherwise returns.

Incidentally, in the case where the retroreflective member 2 appears in the differential picture IM, the luminance of the area thereof is larger than that of the other area, and therefore the area corresponding to the pixels which have the luminance exceeding the predetermined threshold value Th as defined empirically is regarded as the image IM of the retroreflective member 2. Then, the pixel having the maximum luminance among the pixels forming the image IM is defined as the target point of the retroreflective member 2.

In step S526, the multimedia processor 91 determines whether or not the target point is extracted in the previous process, the process proceeds to step S528 if the target point is extracted, otherwise returns. In step S528, the multimedia processor 91 calculates the velocity vector Vy (=Yc−Yp) of the target point in the Y axis direction based on the current target point, i.e., the Y coordinate Yc of the pixel having the current maximum luminance, and the previous target point, i.e., the Y coordinate Yp of the pixel having the previous maximum luminance.

The second embodiment determines the presence or absence of the input by the pedals 520R and 520L using the velocity vector Vy. By the way, the first embodiment determines the presence or absence of the input by the pedals 520R and 520L using the stepping velocity Vs held in the Vs register.

The process of determining the left and right inputs in accordance with the second embodiment is the same as that of the flow chart of FIG. 31. However, in FIG. 31 and the description thereof, replace "the stepping velocity vector Vs" with "the velocity vector Vy". Also, in the second embodiment, there is not step S102.

By the way, the state transition of the exercise assistance process which is executed by the multimedia processor 91 in accordance with the second embodiment is the same as that of FIG. 32. That is, the difference between the first embodiment and the second embodiment is only the detection technique of the input by the pedals 520L and 520R (on the basis of the output from the rotary encoder 501, or the photographed result of the image sensor 410). Accordingly, the second embodiment has similar advantages as the first embodiment.

In addition, in accordance with the second embodiment, if the user owns the adapter 5, the cartridge 402, the retroreflective member 2, and the television monitor 100, it is possible to display the video image in accordance with the reciprocating movement (the reciprocating movement as the input) on the television monitor 100 only by attaching the retroreflective member 2 to the stepper 400 which is already owned by the user without purchasing the stepper newly. Accordingly, for example, in the case where there is the stepper remained to be placed in the stockroom for wearying, it is possible to display the video image on the television monitor 100, which assists the user to continuously perform the stepping exercise, only by attaching the retroreflective member 2 to the stepper. In this way, the user need not newly prepare and purchase a dedicated stepper, and therefore it is possible to reduce economic burden on a user. That is, if an object to be detected performs reciprocatory movement which is included within targeted scope of the computer program executed by the multimedia processor 91, the object is not necessarily dedicated.

Also, since reciprocatory motion, i.e., regular motion is detected and analyzed, in comparison with detection and analysis of arbitrary motion which is not regular, it is possible to reduce the processing amount by hardware and/or software, and costs thereof, and further establish high-speed processing. That is, it is possible to establish the system using the hardware and software performances of which are relatively low. The same is true for the first embodiment.

Meanwhile, the present invention is not limited to the above embodiments, and a variety of variations and modifications may be effected without departing from the spirit and scope thereof, as described in the following exemplary modifications.

(1) As described above, while the stepper 1 or 400 is employed as an exercise machine, other exercise machine may be employed, and it is not necessarily an exercise machine which has the player perform the stepping motion.

(2) As described above, while one kind of motion of the player (the stepping motion) is detected, multiple kinds of motion of the player may be detected.

(3) As described above, while the television monitor 100 is employed as a display device, the display device is not limited thereto.

(4) As described above, while the steppers 1 and 400, the cartridges 3 and 402, the adapter 5, and the television monitor 100 are a independent device respectively in order to enable to use a device which has already at home, and enable to expand and/or change representation by exchanging the cartridge 3 and 402, some or all of these devices may be integrally constituted.

(5) An object displayed on the screen can be changed in accordance with the rotation velocity (the stepping velocity) of the rotation member 530 of FIG. 6. That is, presence or absence of effect is not determined only by whether or not the stepping motion is detected, even if the stepping motion is detected, it is possible to generate the different effect in accordance with the stepping velocity. The same is true for the first and second embodiments, it is also possible to display a video image in accordance with the magnitude of the stepping velocity Vs or Vy.

(6) As shown in FIG. 41 described above, while the retroreflective member 2 is attached to the toe side of the pedal 520R, the retroreflective member 2 may be attached to any position where moves. In this case, the retroreflective member 2 must be located within the photographing range of the imaging unit 404 of the cartridge 402. Naturally, the location of the adapter 5 into which the cartridge 402 is inserted can also be change optionally in accordance with the location of the retroreflective member 2.

Figure 47:
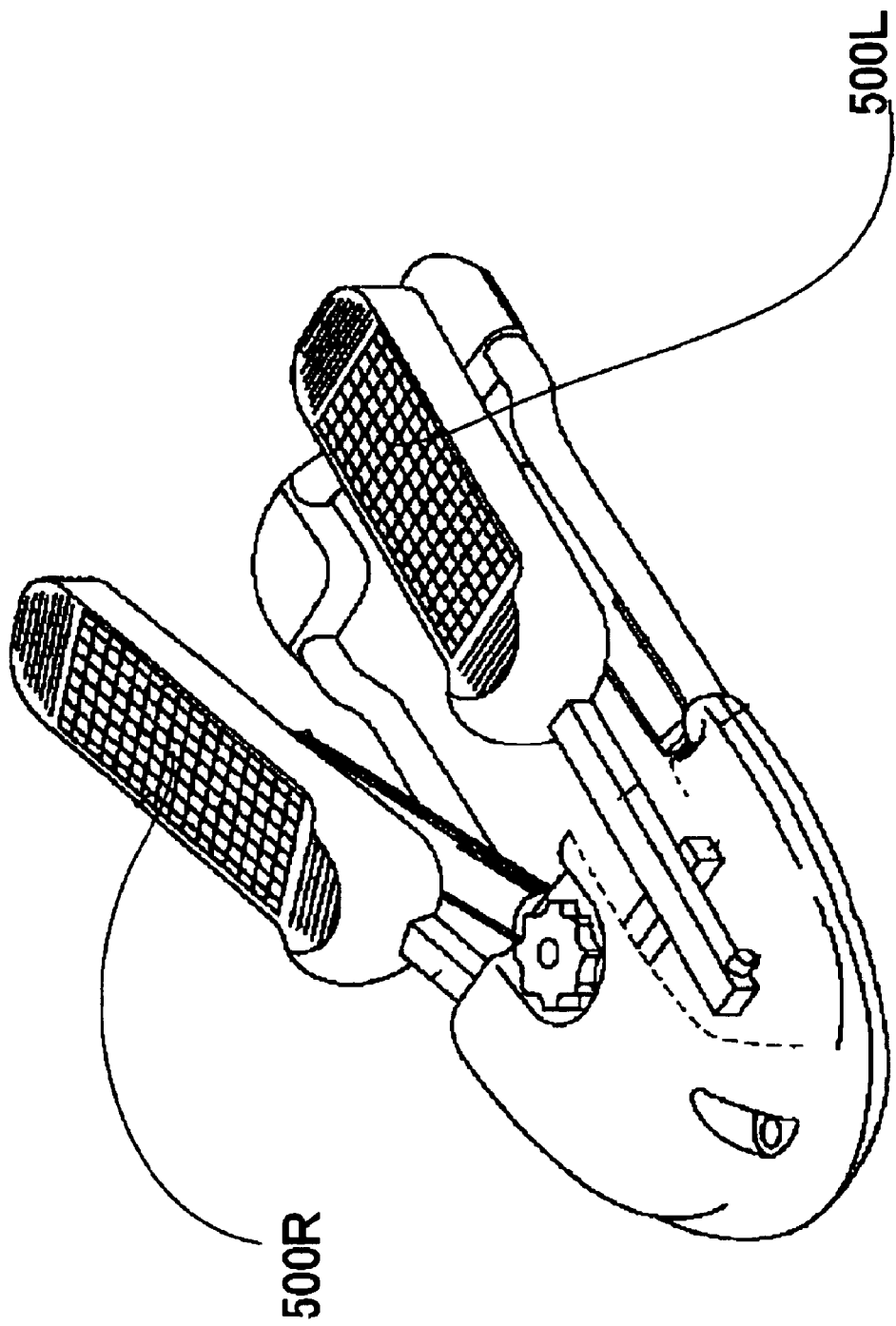
FIG. 47 is a perspective view for showing the appearance of a conventional stepper.

For example, in the case of such a stepper as to be provided with the axis in the toe side, such as the stepper of FIG. 47, the retroreflective member 2 is attached on the right side surface of the heel side of the pedal 500R, and the adapter 5 into which the cartridge 402 is inserted is located in the right side of the stepper. Incidentally, the term "right" indicates a direction from the player. In this way, it is preferred to attach the retroreflective member 2 to a part whose movement is large depending on the constitution of the stepper.

(7) As described above, the reciprocating movement of the stepper 1 or 400 is taken as an example of a periodic movement, and therefore the reciprocating movement is detected and analyzed. However, a machine which performs the movement to be detected and analyzed is not limited to a stepper on the condition that it makes the periodic movement. For example, a retroreflective member is attached to a rotational axis of a pedal of a cycling machine which makes circular movement as a type of recurrence movement, and is photographed by the imaging unit 4, and then detection and analysis of the circular movement may be performed. For example, the circular movement of a pedal of a cycling machine may be detected and analyzed by the rotary encoder 501. Also, for example, it is not limited to a machine which has a moving part in itself, such as a stepper and a cycling machine, the retroreflective member is attached to an article which is held and so on by a person and whereby makes reciprocating movement, such an iron dumbbell, and is photographed by the imaging unit 4, and then detection and analysis of the reciprocating movement may be performed. In this case, it is not limited to the reciprocating movement on the condition that it makes the periodic movement.

(8) As described above, while the retroreflective member 2 is attached to the stepper 400, i.e., a machine, the player may also hold or wear a retroreflective member. Even in that case, a region where it is held or worn must be a region capable of making the periodic movement, and be located within the photographing range of the imaging unit 404. In addition, it is preferred that the region whose movement is large holds or wears it. For, example, in the case of the usage of the stepper 400 of FIG. 40, a retroreflective member can be worn on the right ankle of the player. Also, in the case where the player holds or wears the retroreflective member, a machine such as the stepper 1 is not necessarily required. For, example, in the case of the stepping exercise, if a retroreflective member is attached to the ankle, the stepping motion without a load can be detected and analyzed. In this case, the position to which the retroreflective member is attached is not particularly limited on the condition that the region of the body makes the periodic motion. However, it need be attached to the region of the body which makes periodic motion which is included within targeted scope of the computer program executed by the multimedia processor 91.

(9) As described above, the shape of the retroreflective member 2 of FIG. 41 is employed. However, a shape of a retororeflective member is not limited to it, and therefore the shape may be optionally change in accordance with a type of periodic motion to be detected and analyzed, construction and a type of a machine, a photographing range, and/or a region of a body which makes periodic motion, or the like. Also, a retroreflective sheet may be use as it is instead of employing spatial construction.

(10) As described above, though the retroreflective member 2 is attached on the object to be detected (namely, the pedal 520R of the stepper 400) in order to be easy to detect, it is not necessarily required to attach the retroreflective member 2 dependently on power of the image sensor 410 and the multimedia processor 91.

(11) As described above, while the type where the cartridge 3 is inserted in the adapter 5 is applied, these may be integrally constituted.

While the present invention has been described in detail in terms of embodiments, it is apparent that those skilled in the art will recognize that the invention is not limited to the embodiments as explained in this application. The present invention can be practiced with modification and alteration within the spirit and scope of the present invention as defined by the appended any one of claims.

The invention claimed is:

1. A movement detecting apparatus configured to detect movement of an exercise machine including a first pedal on which one foot of a player is placed, and a second pedal on which the other foot is placed, the exercise machine being configured to make the player press down on the first pedal and the second pedal in a right-left alternate manner under a load, the movement detecting apparatus comprising:
   an imaging unit configured to photograph the first pedal; and
   a determining unit configured to determine that the first pedal is pressed down in response to an image of the first pedal in a picture obtained by the imaging unit moving vertically downward, and determine that the second pedal is pressed down in response to the image of the first pedal moving vertically upward.

2. The movement detecting apparatus as claimed in claim 1, wherein the determining unit performs a first determining process where it is determined that the first pedal is pressed down in response to the image of the first pedal moving vertically downward by a predetermined number of times, and a second determining process where it is determined that the second pedal is pressed down in response to the image of the first pedal moving vertically upward by the predetermined number of times.

3. The movement detecting apparatus as claimed in claim 2, wherein in response to the image of the first pedal moving vertically upward before moving vertically downward by the predetermined number of times, the determining unit ends the first determining process and starts the second determining process, and
   wherein in response to the image of the first pedal moving vertically downward before moving vertically upward by the predetermined number of times, the determining unit ends the second determining process and starts the first determining process.

4. The movement detecting apparatus as claimed in claim 2, wherein in response to the determining unit determining that the first pedal is pressed down, the determining unit ends the first determining process even if motion of pressing down on the first pedal is not finished, and
   wherein in response to the determining unit determining that the second pedal is pressed down, the determining unit ends the second determining process even if motion of pressing down on the second pedal is not finished.

5. The movement detecting apparatus as claimed in claim 1 further comprising:
   a retroreflective member being attached to the first pedal; and
   a light emitting unit configured to intermittently emit light,
   wherein the imaging unit photographs the retroreflective member when the light emitting unit emits the light, and photographs the retroreflective member in response to the light emitting unit does not emit the light, and
   wherein the determining unit determines whether or not the first pedal is pressed down and whether or not the second pedal is pressed down on the basis of a differential picture between a picture obtained by the imaging unit when the light emitting unit emits the light and a picture obtained by the imaging unit in response to the light emitting unit does not emit the light.

6. The movement detecting apparatus as claimed in claim 1 further comprising:
   a display controlling unit configured to display a video image on a display device in accordance with a result of determining whether or not the first pedal is pressed down and whether or not the second pedal is pressed down.

7. The movement detecting apparatus as claimed in claim 1 further comprising:
   a memory;
   a detection unit configured to detect periodic movement in accordance with a result of determining whether or not the first pedal is pressed down and whether or not the second pedal is pressed down;
   a processing unit configured to
      detect when the periodic movement occurs a predetermined number of times, display a first representation when the predetermined number of times of the periodic movement is detected, store, into the memory, state information, corresponding to the first representation, in association with a date, end display of the first representation, and responsive to the date stored in the memory, conditionally display a second representation depending on whether the periodic movement of the exercise machine is not detected within a predetermined time.

8. The information processing apparatus as claimed in claim 7 wherein the predetermined time period is 3 days.

9. The information processing apparatus as claimed in claim 7 wherein the first representation includes N objects, and the second representation includes less than N objects.

10. The information processing apparatus as claimed in claim 7 wherein each object is a depiction of a fish.

11. The information processing apparatus as claimed in claim 7 wherein the state information includes N.

12. The information processing apparatus as claimed in claim 7 wherein the state information includes a detected number of times of occurrence of the periodic movement.

13. A movement detecting method for detecting movement of an exercise machine including a first pedal on which one foot of a player is placed, and a second pedal on which the other foot is placed, the exercise machine being configured to make the player press down on the first pedal and the second pedal in a right-left alternate manner under a load, the movement detecting method comprising the steps of:

photographing the first pedal by an imaging device;

determining by a computer that the first pedal is pressed down in response to an image of the first pedal in a picture obtained by the imaging device moving vertically downward; and determining by the computer that the second pedal is pressed down in response to the image of the first pedal moving vertically upward.

14. The movement detecting method as claimed in claim 13, wherein the step of determining with regard to the first pedal including the step of:

performing a first determining process where it is determined that the first pedal is pressed down in response to the image of the first pedal moving vertically downward by a predetermined number of times, and wherein the step of determining with regard to the second pedal including the step of:

performing a second determining process where it is determined that the second pedal is pressed down in response to the image of the first pedal moving vertically upward by the predetermined number of times.

15. The movement detecting method as claimed in claim 14 further comprising the steps of:

in response to the image of the first pedal moving vertically upward before moving vertically downward by the predetermined number of times, by the computer, ending the first determining process to start the second determining process; and in response to the image of the first pedal moving vertically downward before moving vertically upward by the predetermined number of times, by the computer, ending the second determining process to start the first determining process.

16. The movement detecting method as claimed in claim 14, wherein the step of determining with regard to the first pedal further including the step of:

in response to determining that the first pedal is pressed down, ending the first determining process even if motion of pressing down on the first pedal is not finished, and wherein the step of determining with regard to the second pedal further including the step of:

in response to determining that the second pedal is pressed down, ending the second determining process even if motion of pressing down on the second pedal is not finished.

17. The movement detecting method as claimed in claim 13 further comprising:

emitting light intermittently by a light emitting device, the step of photographing by the imaging device including the steps of:

photographing a retroreflective member attached to the first pedal in response to the light emitting device emits the light; and photographing the retroreflective member in response to the light emitting device does not emit the light, wherein the step of determining with regard to the first pedal including the step of:

determining whether or not the first pedal is pressed down on the basis of a differential picture between a picture obtained by the imaging device when the light emitting device emits the light and a picture obtained by the imaging device when the light emitting device does not emit the light, and wherein the step of determining with regard to the second pedal including the step of:

determining whether or not the second pedal is pressed down on the basis of the differential picture.

18. The movement detecting method as claimed in claim 13 further comprising:

displaying a video image on a display device by the computer in accordance with a result of the step of determining with regard to the first pedal and a result of the step of determining with regard to the second pedal.

19. A non-transitory tangible computer readable medium embodying a computer program for enabling a computer to perform a process, which detects movement of an exercise machine including a first pedal on that one foot of a player is placed, and a second pedal on which the other foot is placed, the exercise machine being configured to make the player press down on the first pedal and the second pedal in a right-left alternate manner under a load, the process comprising the steps of:

determining that the first pedal is pressed down in response to an image of the first pedal in a picture obtained by photographing the first pedal by an imaging device moving vertically downward; and determining that the second pedal is pressed down in response to the image of the first pedal moving vertically upward.

20. The non-transitory tangible computer readable medium as claimed in claim 19, wherein the step of determining with regard to the first pedal including the step of:

performing a first determining process where it is determined that the first pedal is pressed down in response to the image of the first pedal moving vertically downward by a predetermined number of times, and wherein the step of determining with regard to the second pedal including the step of:

performing a second determining process where it is determined that the second pedal is pressed down in response to the image of the first pedal moving vertically upward by the predetermined number of times.

21. The non-transitory tangible computer readable medium as claimed in claim 20, the process further comprising the steps of:
in response to the image of the first pedal moving vertically upward before moving vertically downward by the predetermined number of times, ending the first determining process to start the second determining process; and
in response to the image of the first pedal moving vertically downward before moving vertically upward by the predetermined number of times, ending the second determining process to start the first determining process.

22. The non-transitory tangible computer readable medium as claimed in claim 20, wherein the step of determining with regard to the first pedal further including the step of:
in response to determining that the first pedal is pressed down, ending the first determining process even if motion of pressing down on the first pedal is not finished, and
wherein the step of determining with regard to the second pedal further including the step of:
in response to determining that the second pedal is pressed down, ending the second determining process even if motion of pressing down on the second pedal is not finished.

23. The non-transitory tangible computer readable medium as claimed in claim 19, wherein the step of determining with regard to the first pedal including the step of:
determining whether or not the first pedal is pressed down on the basis of a differential picture between a picture obtained by photographing a retroreflective member attached to the first pedal by the imaging device when a light emitting device emits light and a picture obtained by the imaging device when the light emitting device does not emit the light, and
wherein the step of determining with regard to the second pedal including the step of:
determining whether or not the second pedal is pressed down on the basis of the differential picture.

24. The non-transitory tangible computer readable medium as claimed in claim 19 the process further comprising:
displaying a video image on a display device in accordance with a result of the step of determining with regard to the first pedal and a result of the step of determining with regard to the second pedal.

* * * * *